Sept. 14, 1965

A. L. GROVES ETAL 3,205,740

GLASS PARTITIONING APPARATUS

Filed June 16, 1961

EXAMPLE OF
DEFECT PATTERN

| DEFECT | Z | S |
|---|---|---|
| a | 6 | 22 |
| b | 8 | 47 |
| c | 25 | 17 |
| d | 25 | 43 |
|  | 26 | 43 |
|  | 26 | 42 |
|  | 27 | 42 |
|  | 28 | 42 |
|  | 28 | 41 |
|  | 29 | 41 |
|  | 29 | 40 |
|  | 30 | 40 |
|  | 30 | 39 |
|  | 31 | 39 |
|  | 31 | 38 |
| e | 33 | 53 |
| f | 44 | 35 |
| g | 45 | 36 |

PROGRAMMED SIZES

| SIZE | Z | S | S RANK PER Z | Z × S VALUE |
|---|---|---|---|---|
| 9×6 | 9 | 6 | 2 | 6 |
| 9×9 |  | 9 | 1 | 8 |
| 20×10 | 20 | 10 | 3 | 10 |
| 20×11 |  | 11 | 2 | 11 |
| 20×13 |  | 13 | 1 | 13 |
| 35×7 | 35 | 7 | 3 | 7 |
| 35×15 |  | 15 | 2 | 15 |
| 35×29 |  | 29 | 1 | 29 |

INVENTORS
ARCHIE L. GROVES
GEORGE W. SHERWIN

Wolfe, Hubbard, Voit & Osann
ATTORNEYS

Sept. 14, 1965         A. L. GROVES ETAL         3,205,740
                   GLASS PARTITIONING APPARATUS
Filed June 16, 1961                          25 Sheets-Sheet 3
Fig. 5
FIRST CUT FROM LEADING EDGE
| TRIAL NO | TRIAL z | TRIAL s | AVAILABLE WIDTHS LARGER THAN ANY S | S FITS | ACCUMULATED VALUE | CHOSEN TRIAL |
|---|---|---|---|---|---|---|
| 1 | 35 | 7,15,29 | 16 | 1(15) | | |
| | | | 15 | 1(15) | 37 | |
| | | | 9 | 1(7) | | |
| 2 | 20 | 13,11,10 | 21 | 1(11) 1(10) | | |
| | | | 24 | 1(13) 1(11) | 58 | ✓ |
| | | | 15 | 1(13) | | |
| 3 | 9 | 8,6 | 21 | 3(6) | | |
| | | | 24 | 3(8) | 56 | |
| | | | 15 | 1(8) 1(6) | | |
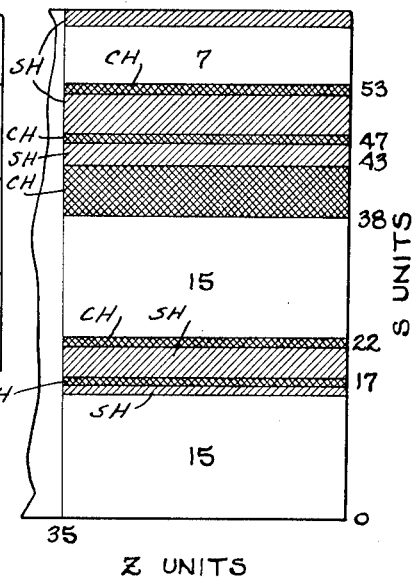
Fig. 6
TRIAL Z CUT   (1)
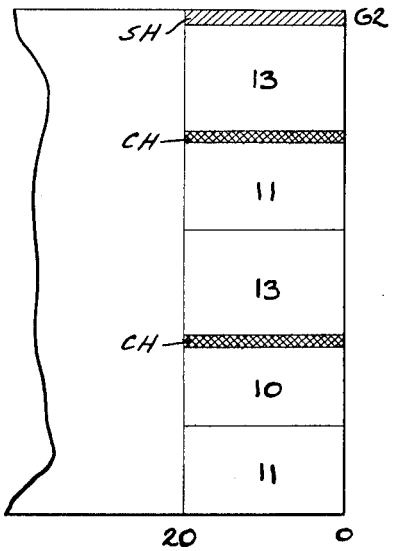
Fig. 7
TRIAL Z CUT  (2) CHOSEN
Fig. 8
TRIAL Z CUT  (3)
INVENTORS
ARCHIE L. GROVES
GEORGE W. SHERWIN
Wolfe, Hubbard, Voit & Osann
ATTORNEYS Sept. 14, 1965 A. L. GROVES ETAL 3,205,740
GLASS PARTITIONING APPARATUS
Filed June 16, 1961 25 Sheets-Sheet 4

INVENTORS
ARCHIE L. GROVES
GEORGE W. SHERWIN
Wolfe, Hubbard, Voit & Osann
ATTORNEYS Sept. 14, 1965  A. L. GROVES ETAL  3,205,740

GLASS PARTITIONING APPARATUS

Filed June 16, 1961  25 Sheets-Sheet 8

INVENTOR
ARCHIE L. GROVES
GEORGE W SHERWIN

Wolfe, Hubbard, Voit & Osann
ATTORNEY

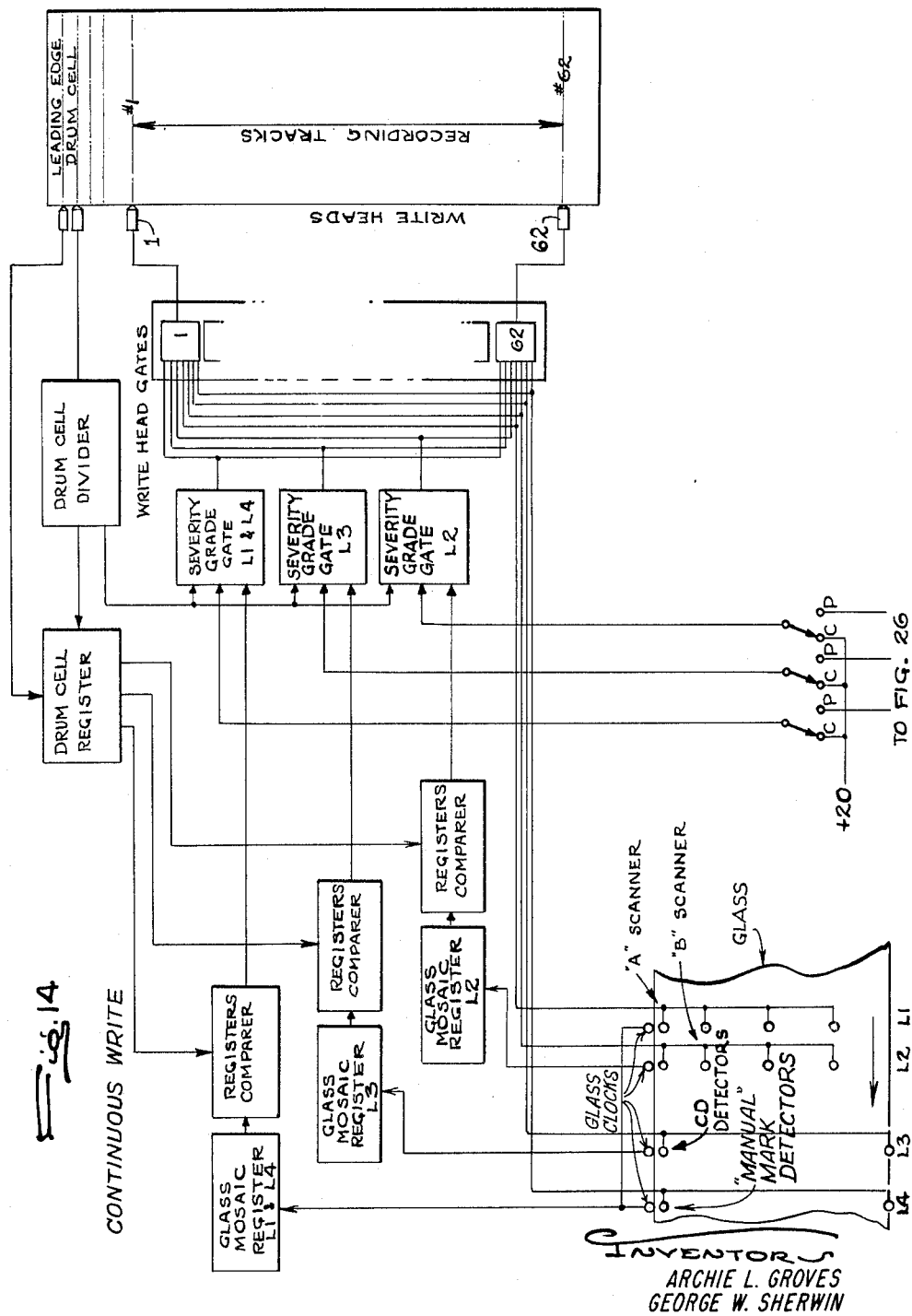

Sept. 14, 1965  A. L. GROVES ETAL  3,205,740
GLASS PARTITIONING APPARATUS
Filed June 16, 1961  25 Sheets-Sheet 10
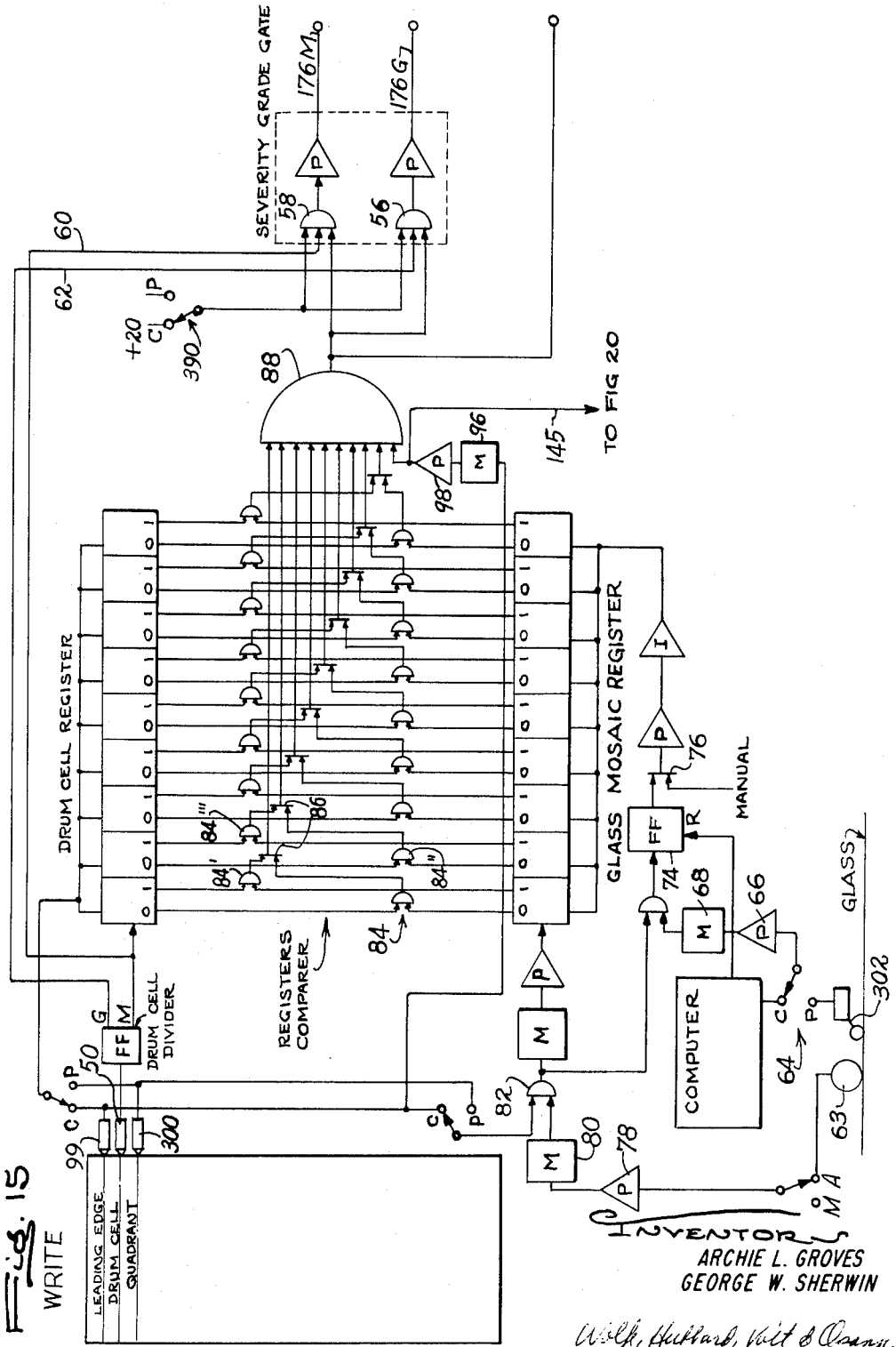
INVENTORS
ARCHIE L. GROVES
GEORGE W. SHERWIN
ATTORNEY

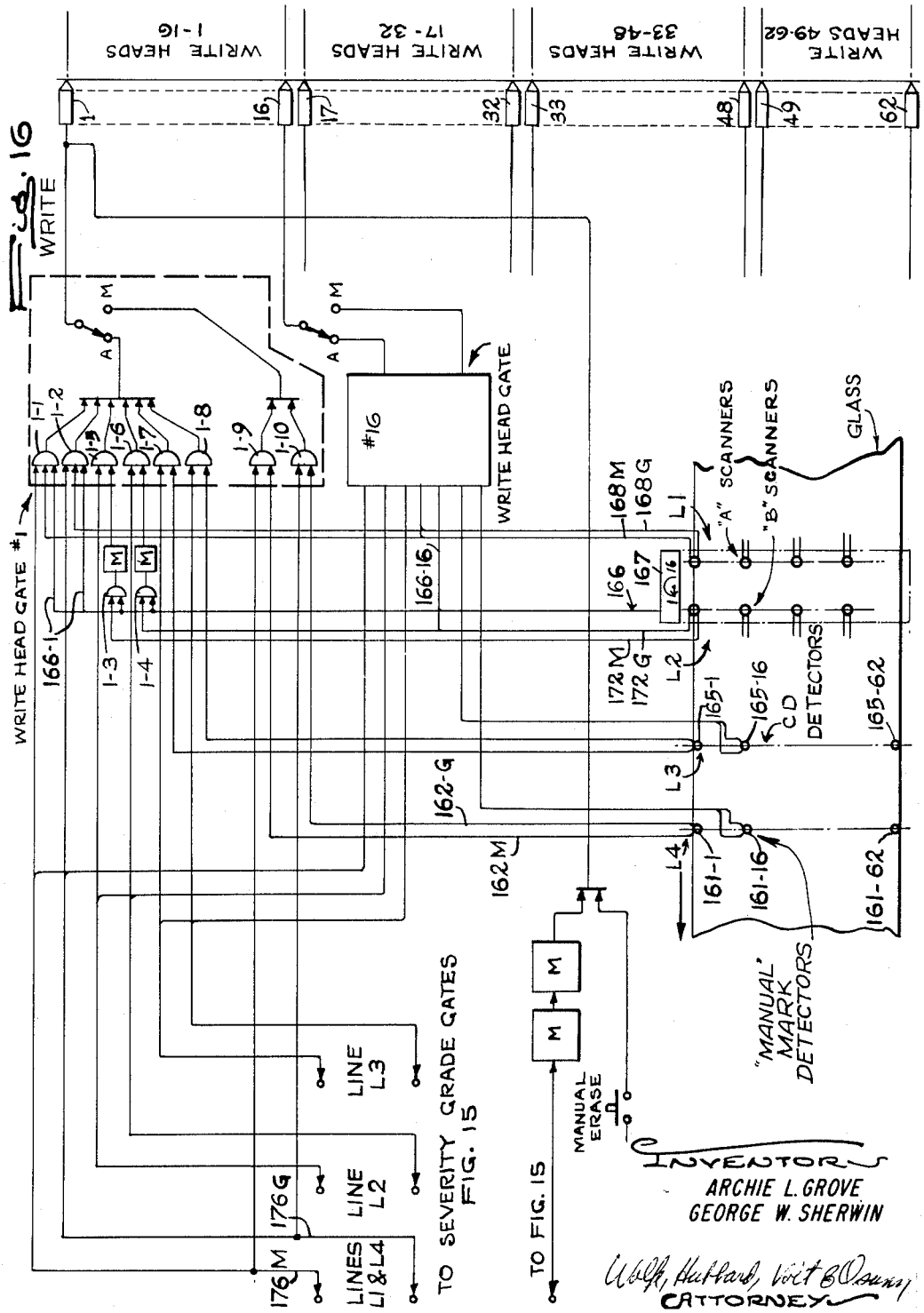

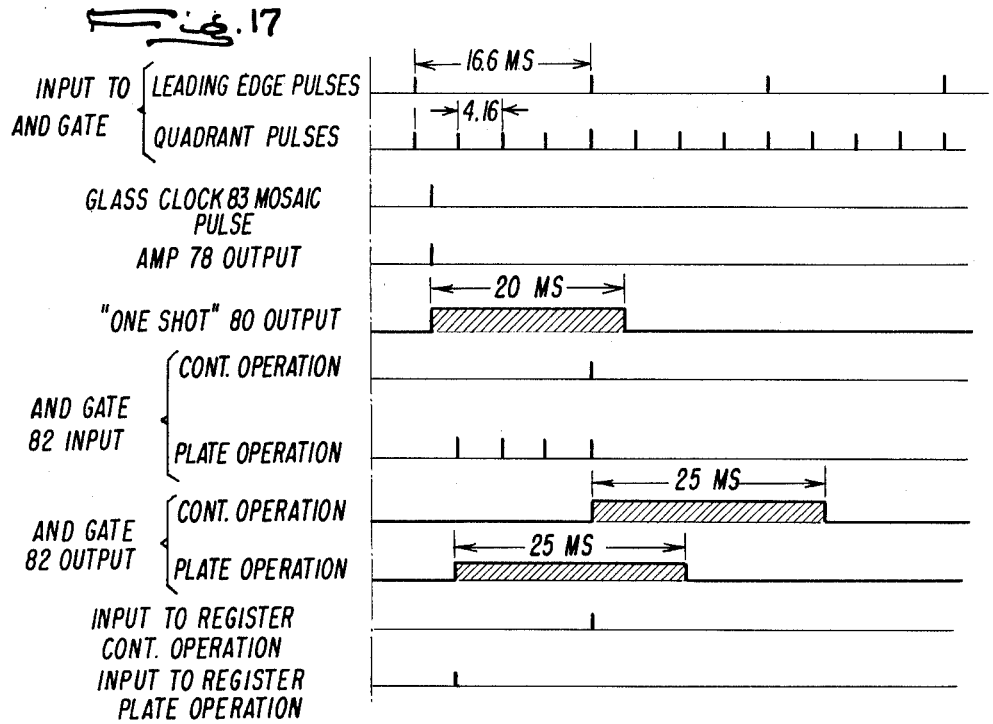
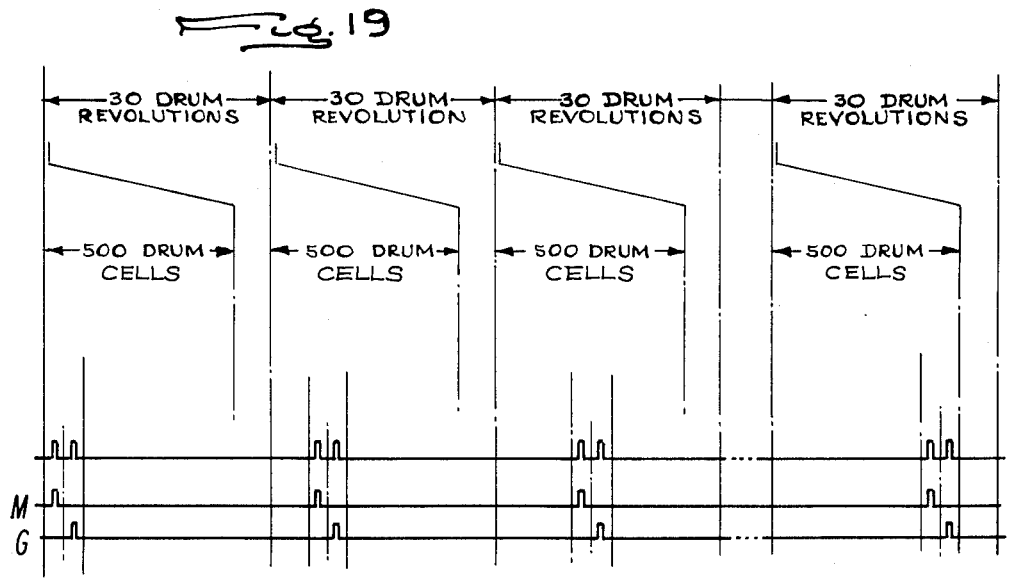

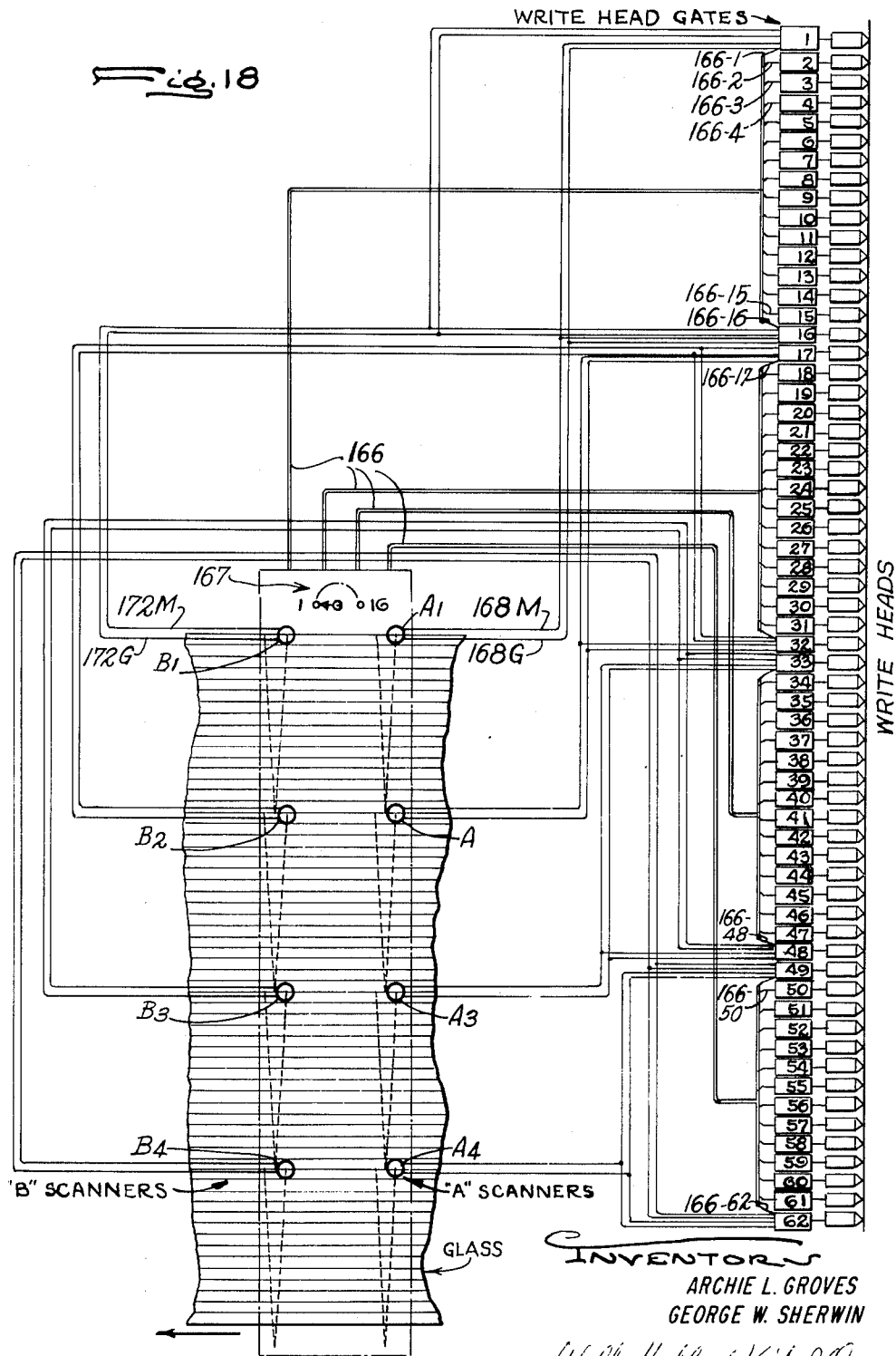

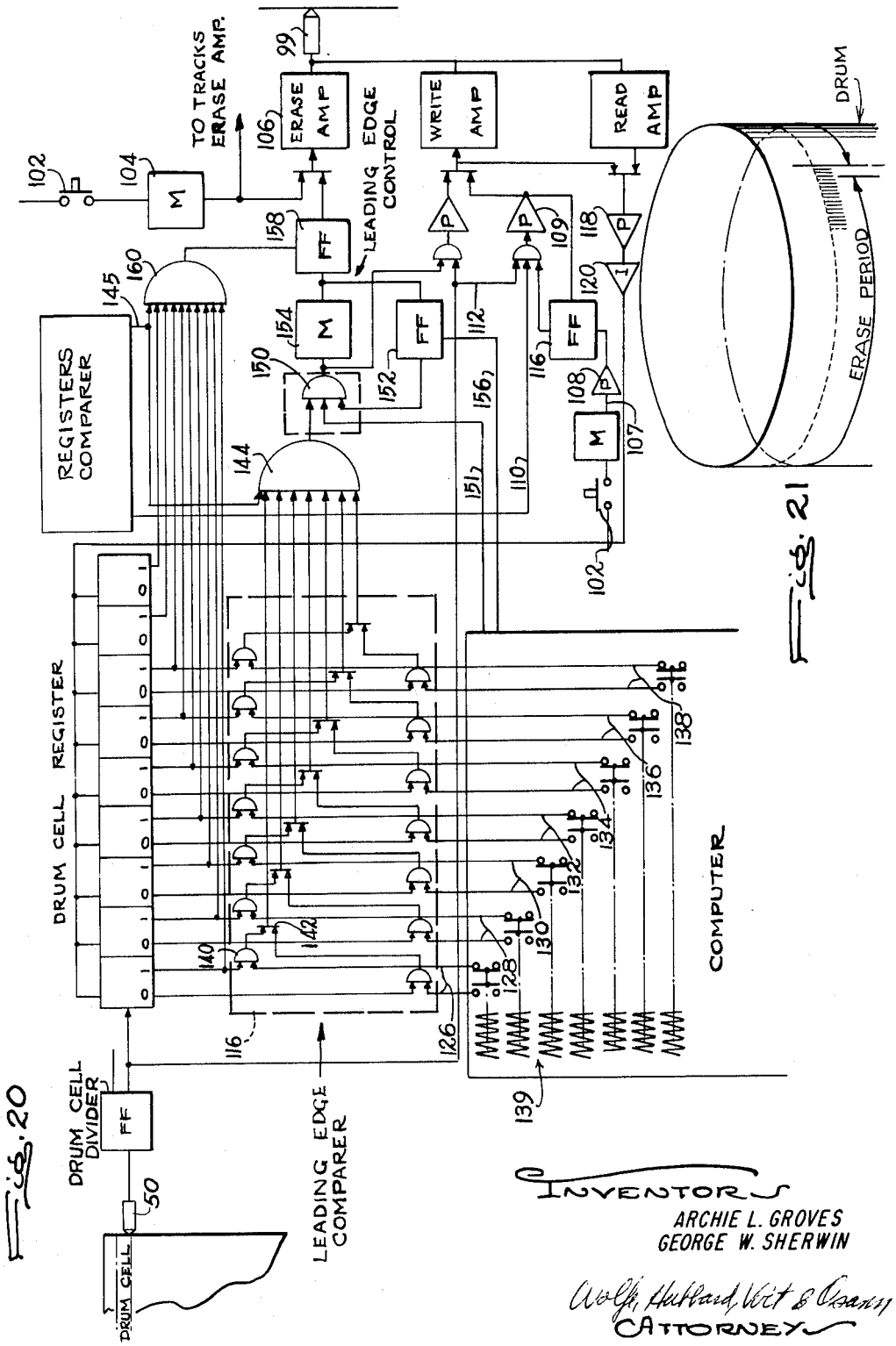

Sept. 14, 1965

A. L. GROVES ETAL 3,205,740

GLASS PARTITIONING APPARATUS

Filed June 16, 1961

INVENTORS
ARCHIE L. GROVES
GEORGE W. SHERWIN

ATTORNEY

PLATE WRITE AND ERASE

INVENTORS
ARCHIE L. GROVES
GEORGE W. SHERWIN

Sept. 14, 1965  A. L. GROVES ETAL  3,205,740
GLASS PARTITIONING APPARATUS
Filed June 16, 1961  25 Sheets-Sheet 19
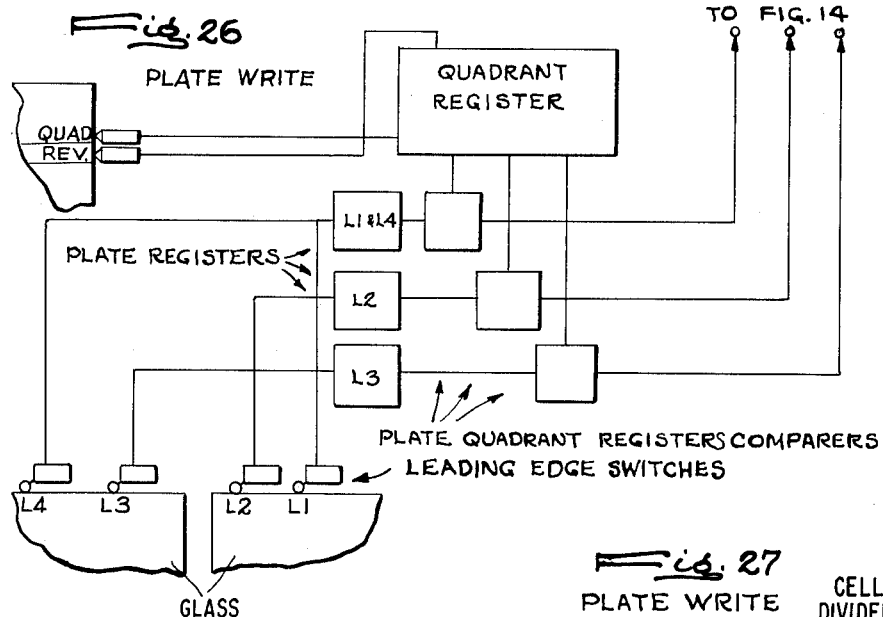
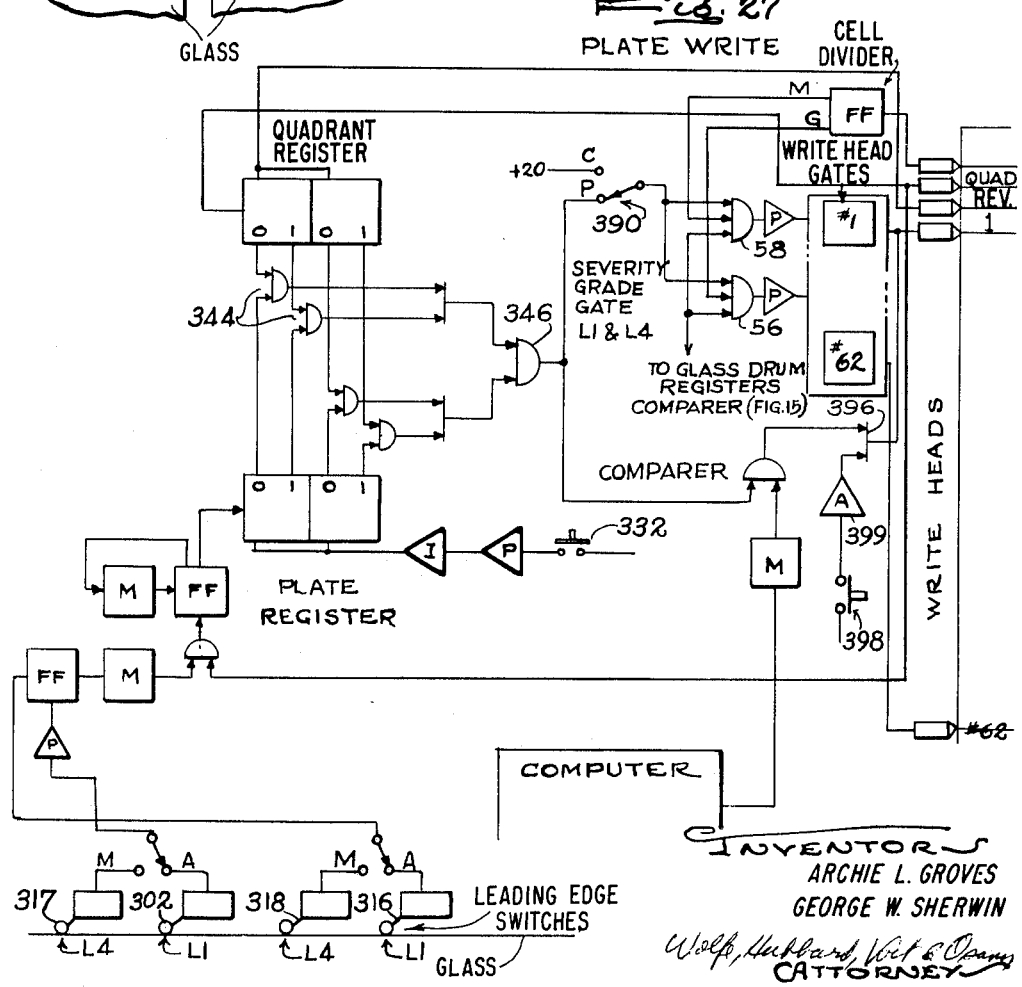
INVENTORS
ARCHIE L. GROVES
GEORGE W. SHERWIN
ATTORNEY

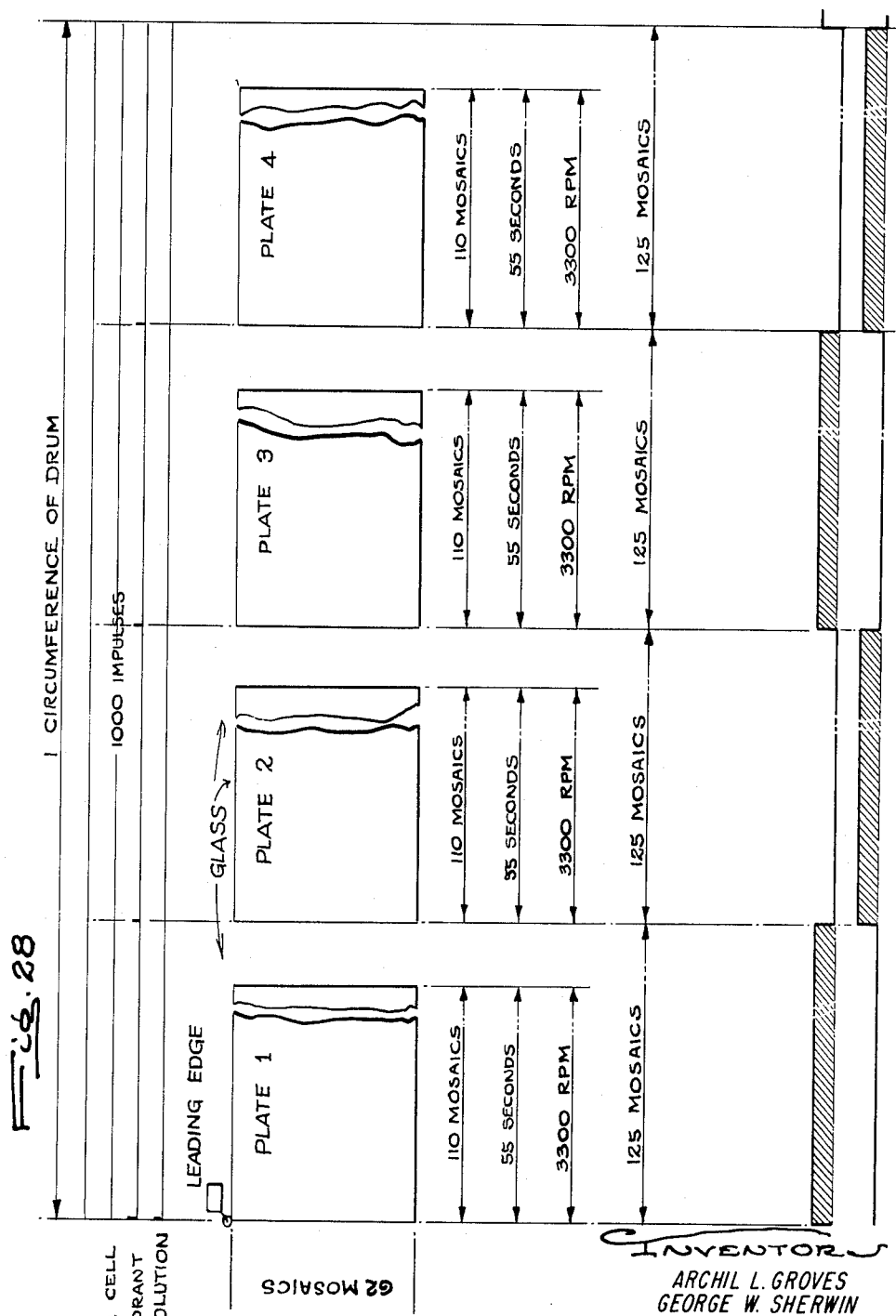

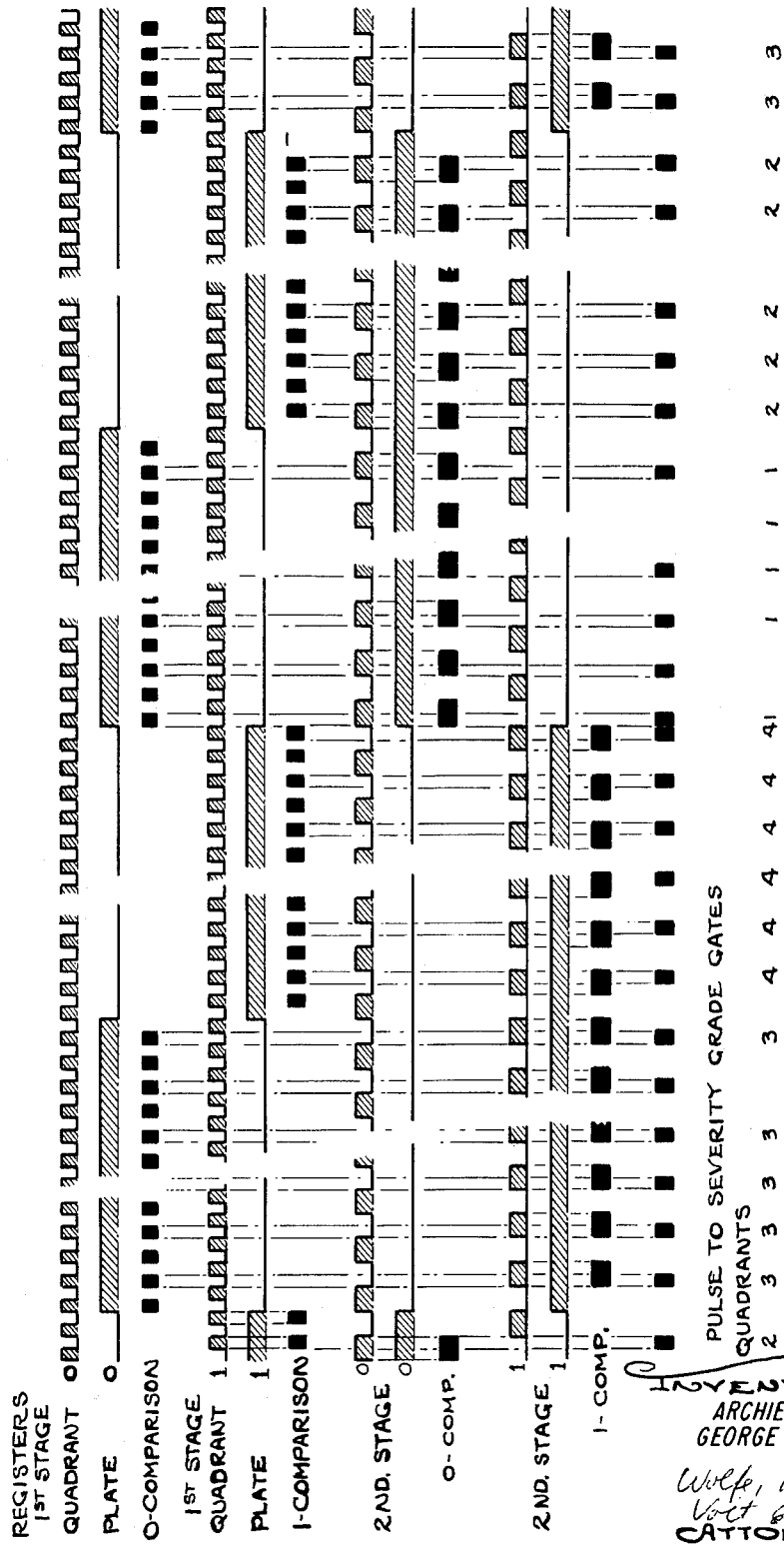

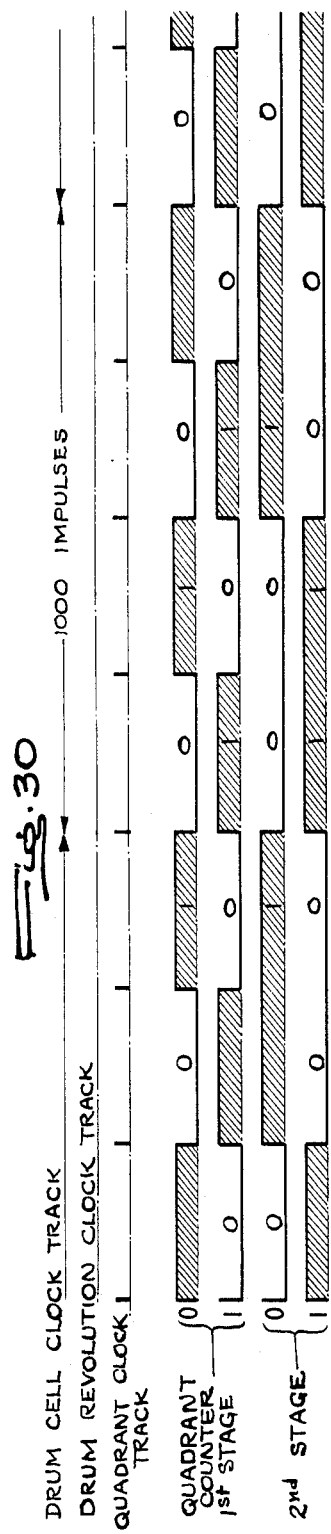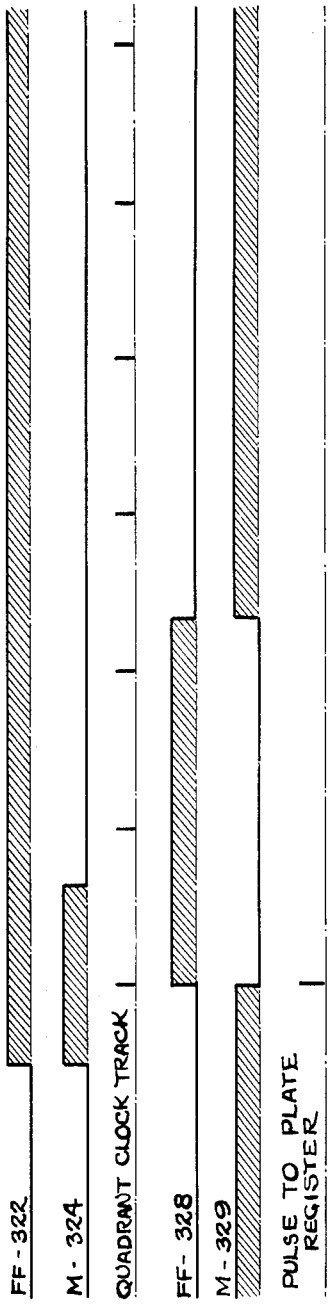
Fig. 30
INVENTORS
ARCHIE L. GROVES
GEORGE W. SHERWIN
ATTORNEYS

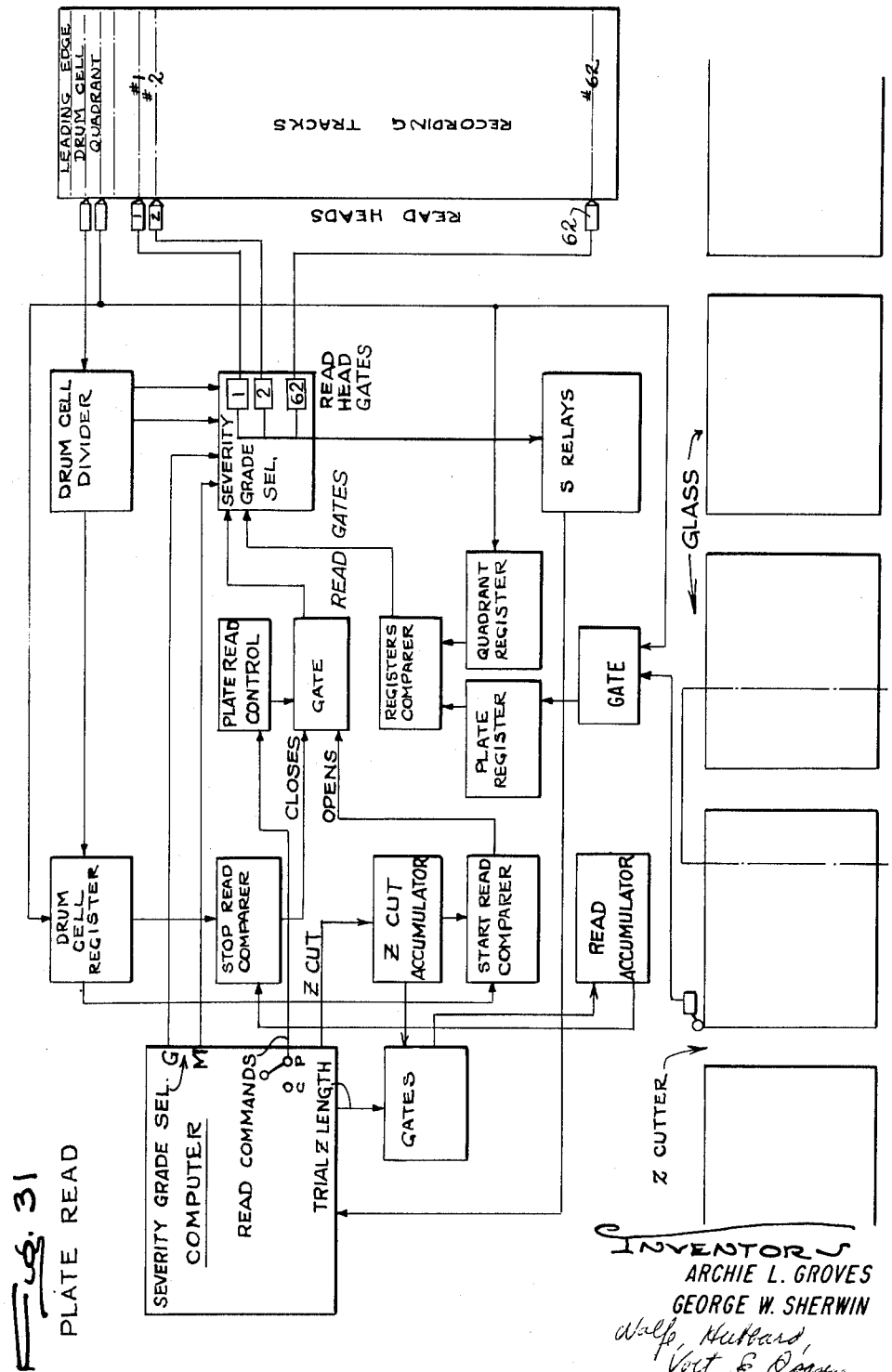

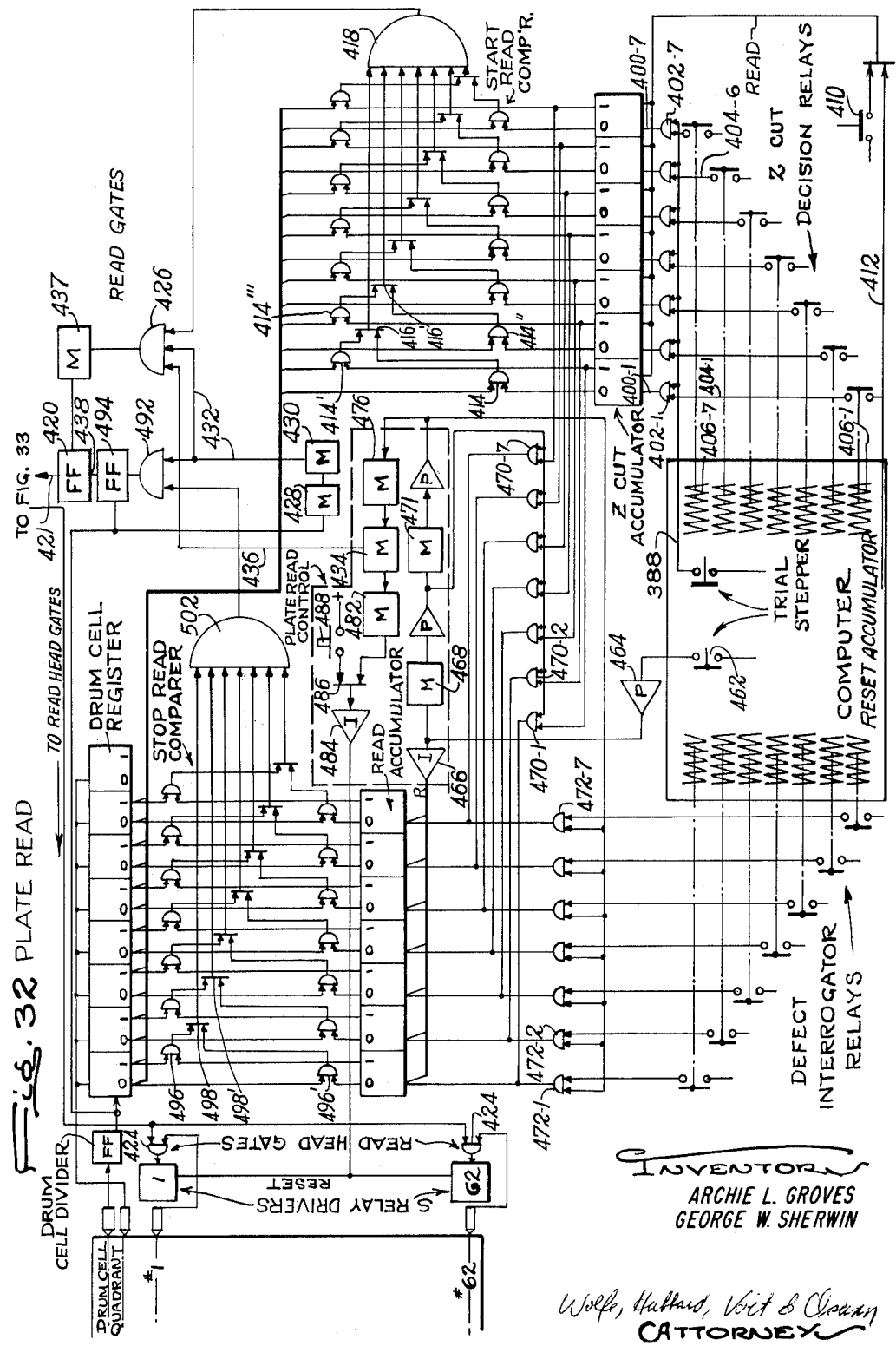

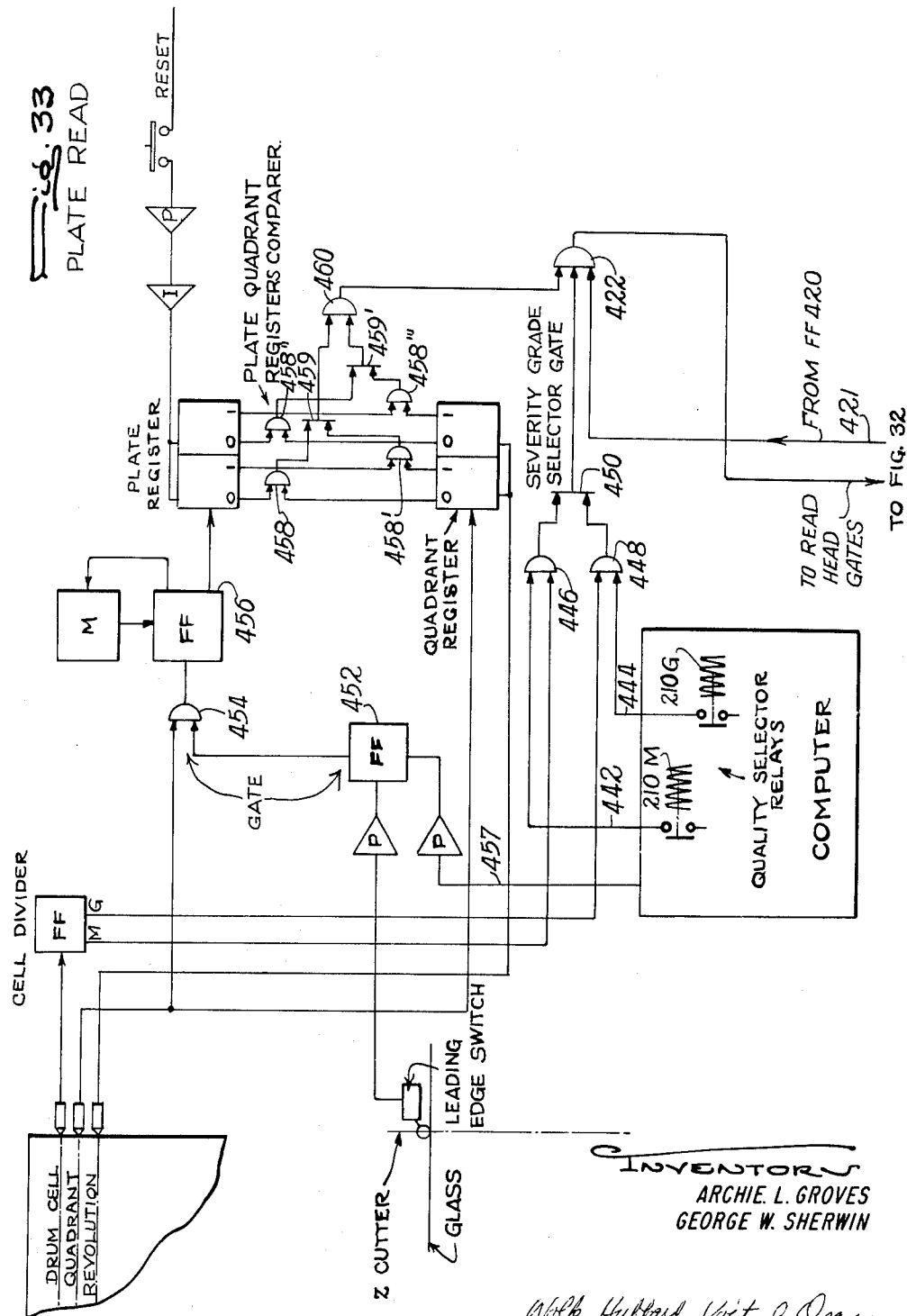

United States Patent Office 3,205,740
Patented Sept. 14, 1965

3,205,740
GLASS PARTITIONING APPARATUS
Archie L. Groves, Cheswick, and George W. Sherwin, Allison Park, Pa., assignors to Pittsburgh Plate Glass Company, Pittsburgh, Pa., a corporation of Pennsylvania
Filed June 16, 1961, Ser. No. 117,665
27 Claims. (Cl. 83—71)

The invention relates generally to partitioning plate glass after inspection in a continuous glass manufacturing process and, more particularly, to erasable storage of glass defect data derived by inspection, which is utilized in cutting the glass into salable sizes.

Glass inspection apparatus has heretofore been proposed for producing defect location information in glass made in a continuous process by direct optical examination of the glass for defective areas or for defect marks previously placed on the glass by skilled inspectors. Computer apparatus is also known for correlating defect location information and desired glass sizes, and producing cutting decisions in pace with the continuous production of the glass.

It is the principal object of this invention to provide apparatus for recording defect location data derived by such glass inspection apparatus at the glass line so that this data is repeatedly available to the computer apparatus in a form usable for computation purposes within the minimum time requirement imposed by the continuous flow of glass and the speed in which cutting computations can be made.

A further object is to provide defect storage apparatus which accommodate a variety of types of glass inspection apparatus providing both location and severity grade defect information.

Still a further object is to provide storage capacity for continuous production of glass in the form of a continuous ribbon or closely spaced plates at line speeds up to 200 inches per minute.

Another object is to provide storage apparatus having read out means providing defect information to the computer apparatus covering both location and severity grade at a speed sufficient to supply data for a demand program accommodating the output of a large glass factory.

Another object is to provide defect storage apparatus accommodating an asynchronous system where the glass production line speed may be variable.

Other features, objects, and advantages of the invention will become apparent from the following detailed description illustrated in the accompanying drawings, in which:

FIG. 5 is a table illustrating the trial partitions of the sheet of FIG. 2 leading to a choice of a particular set of cutting commands;

Figure 9:
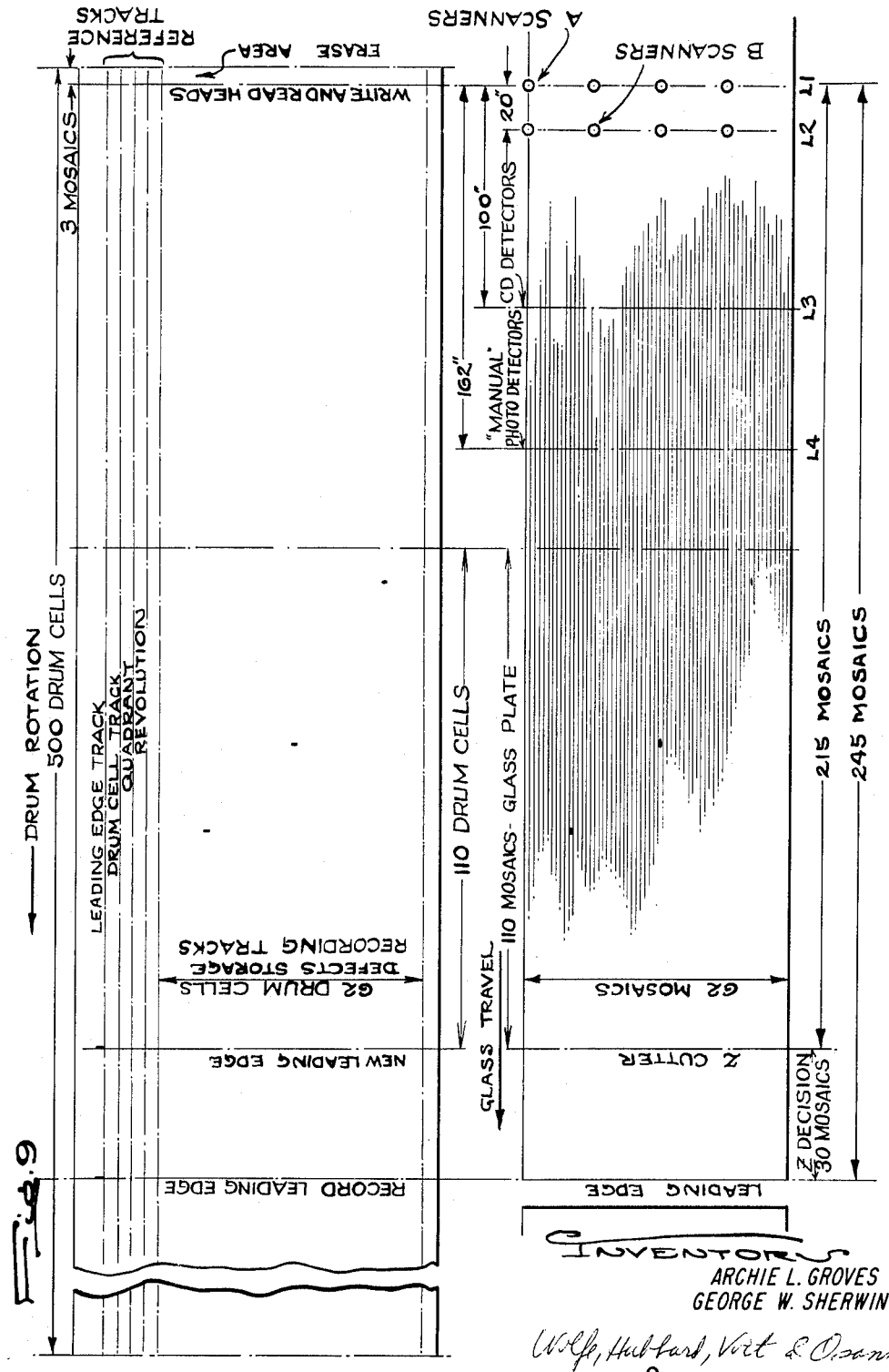
Figure 10:
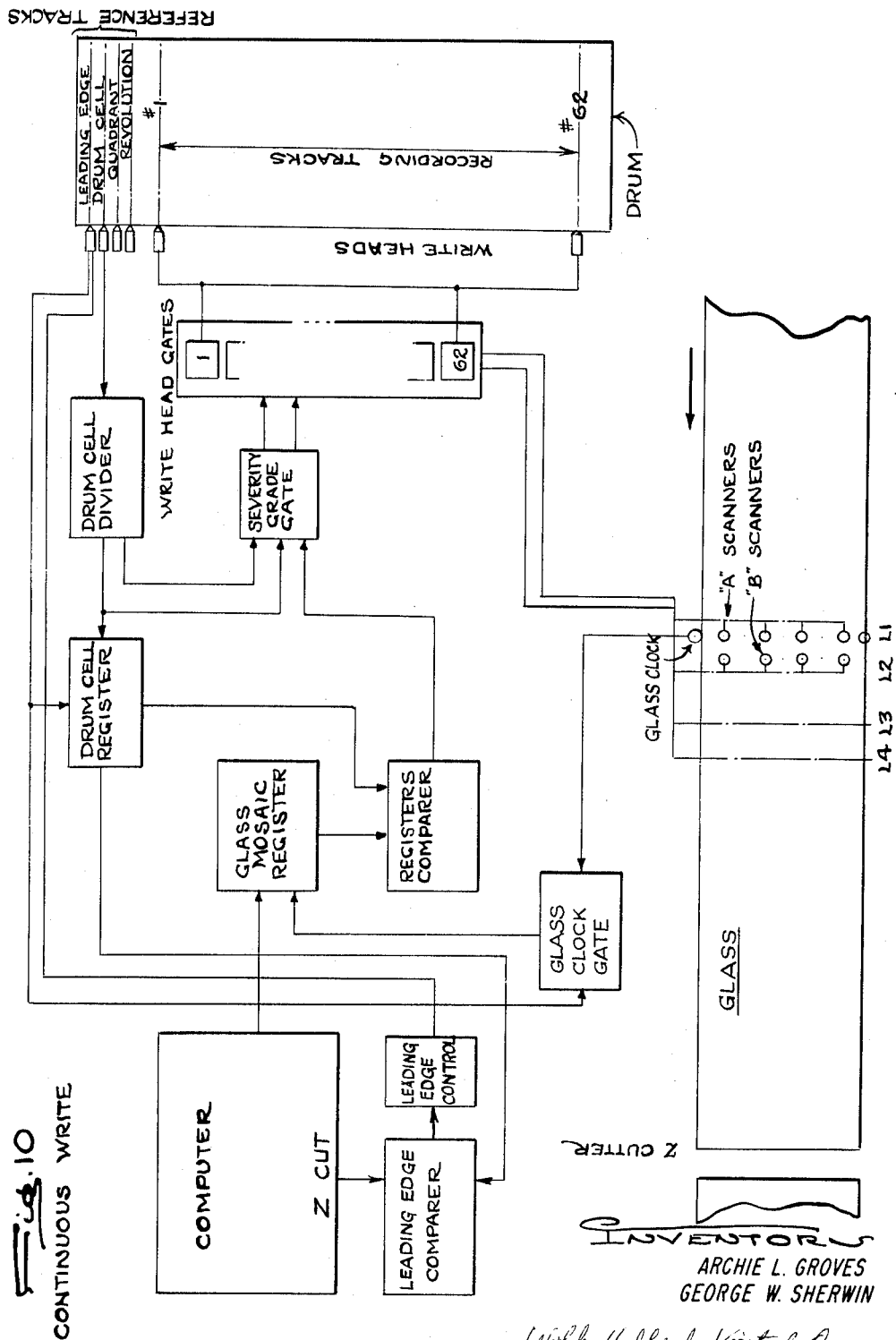
Figure 11:
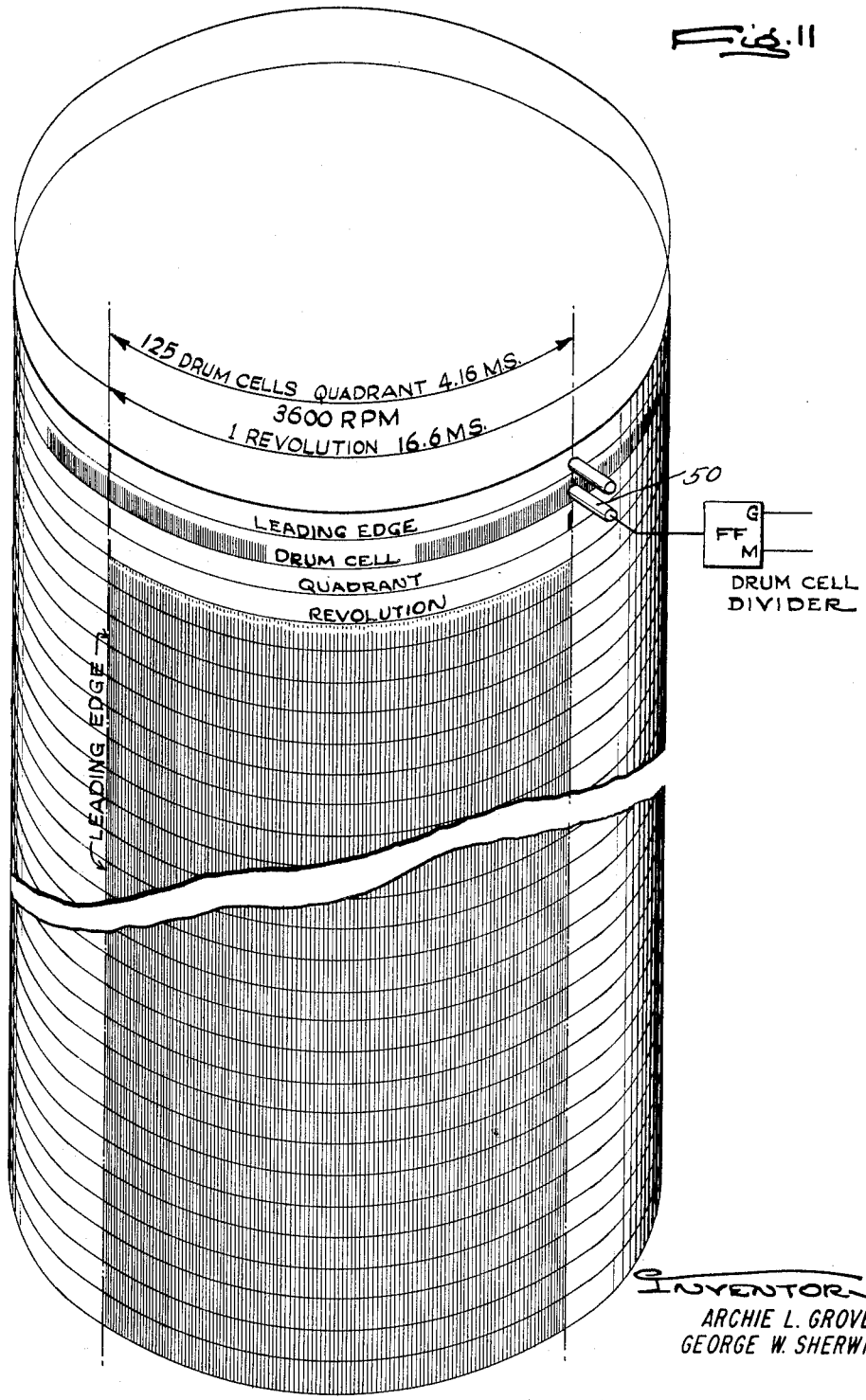
Figure 12:
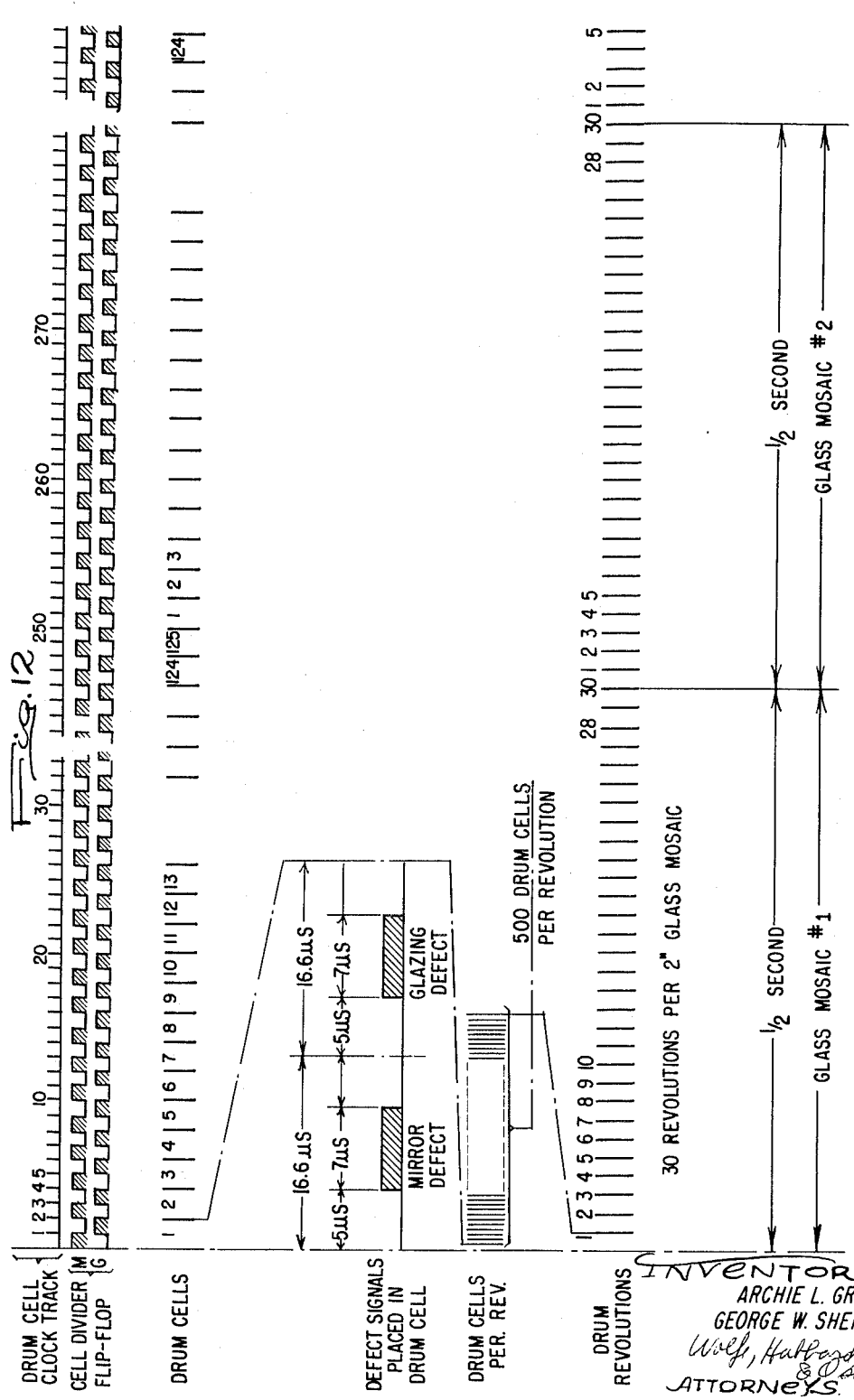
Figure 13:
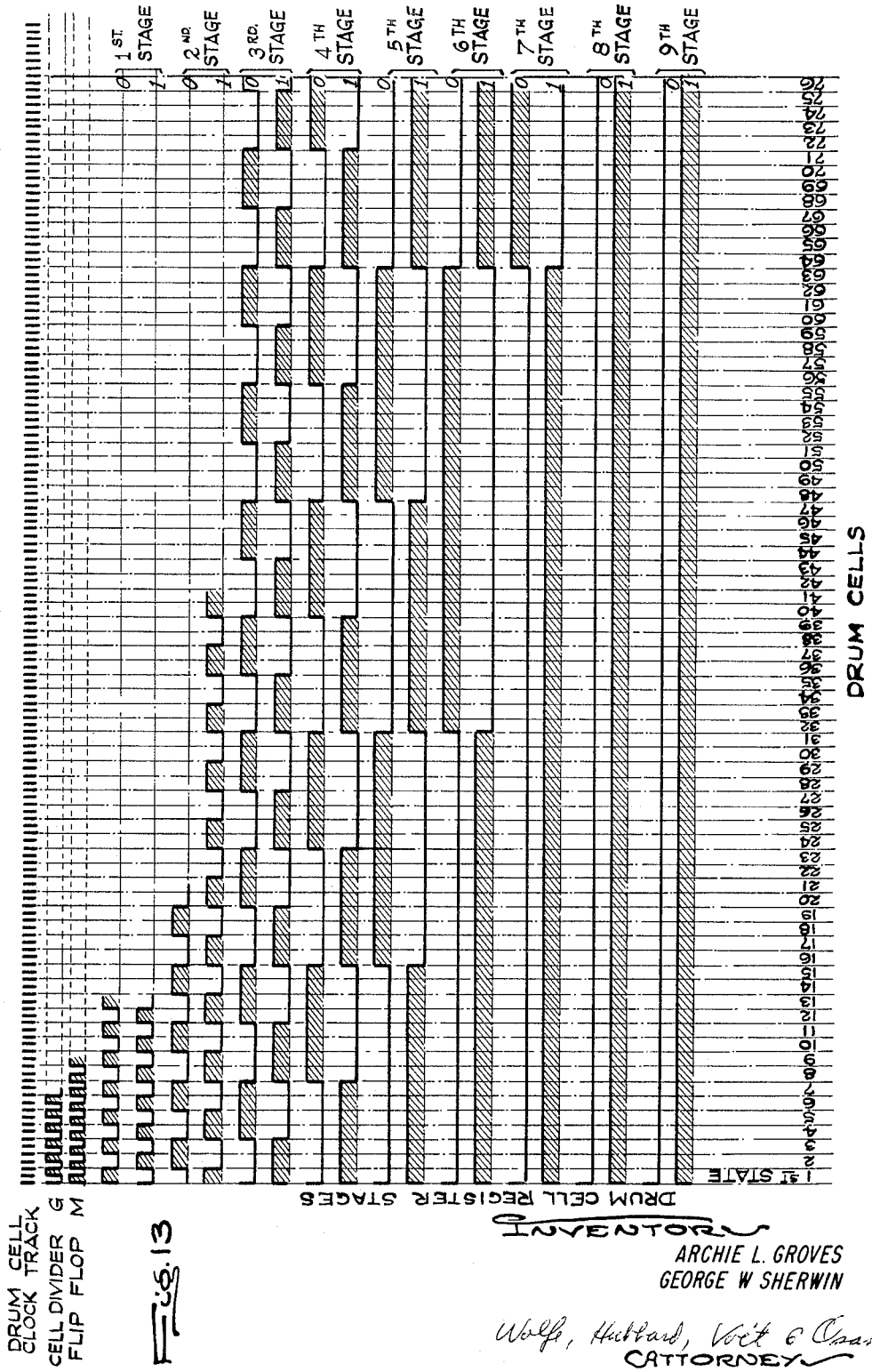
Figure 22:
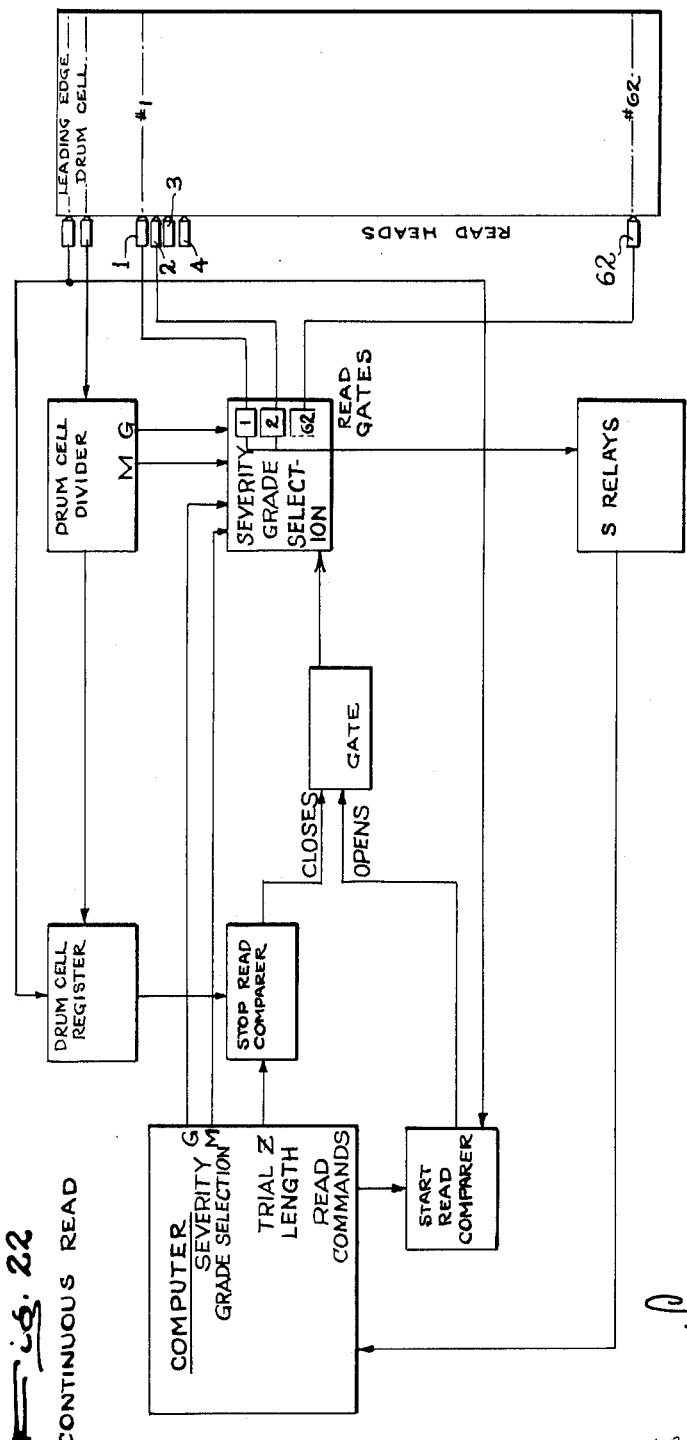
Figure 23:
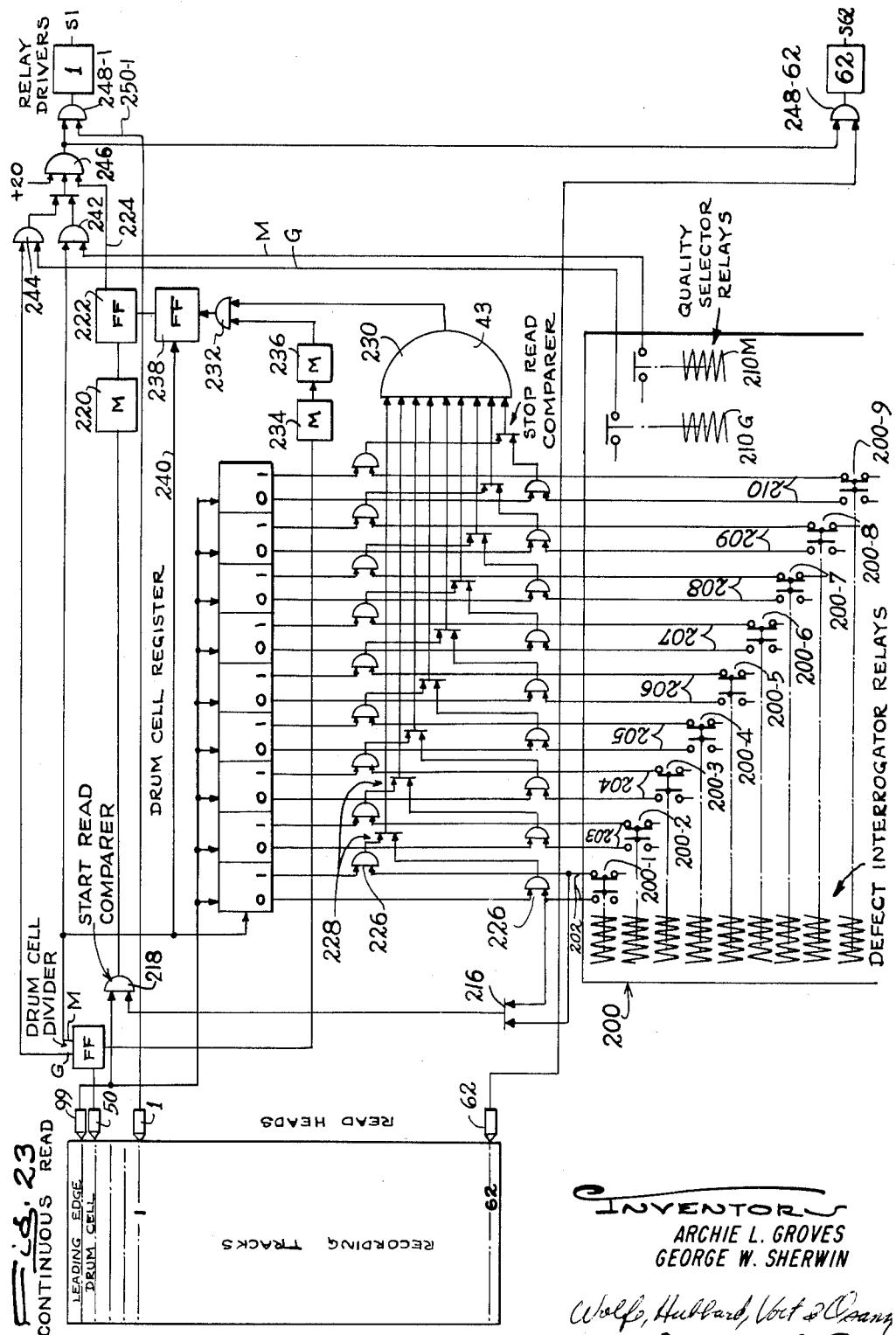
Figure 24:
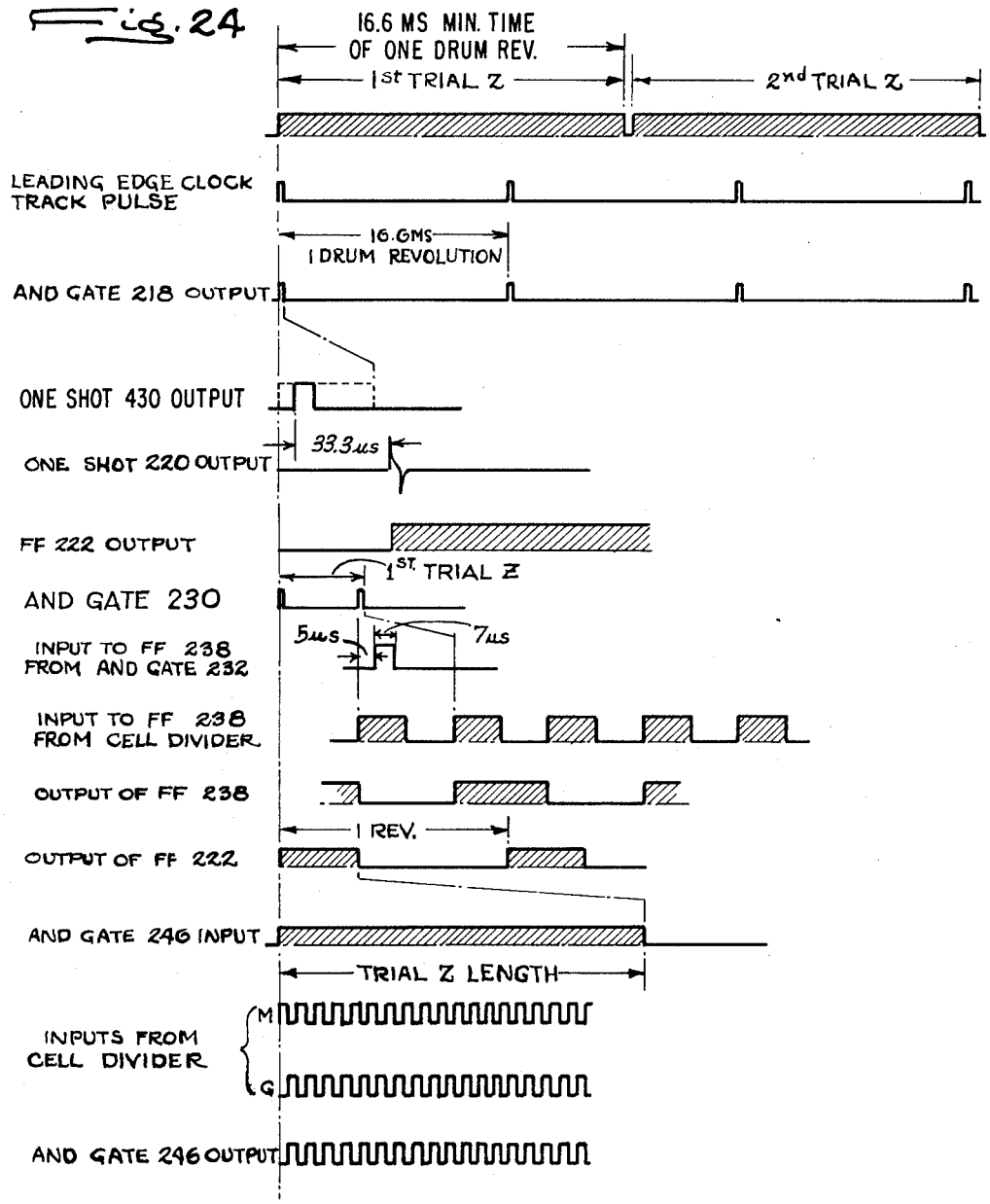
Figure 25:
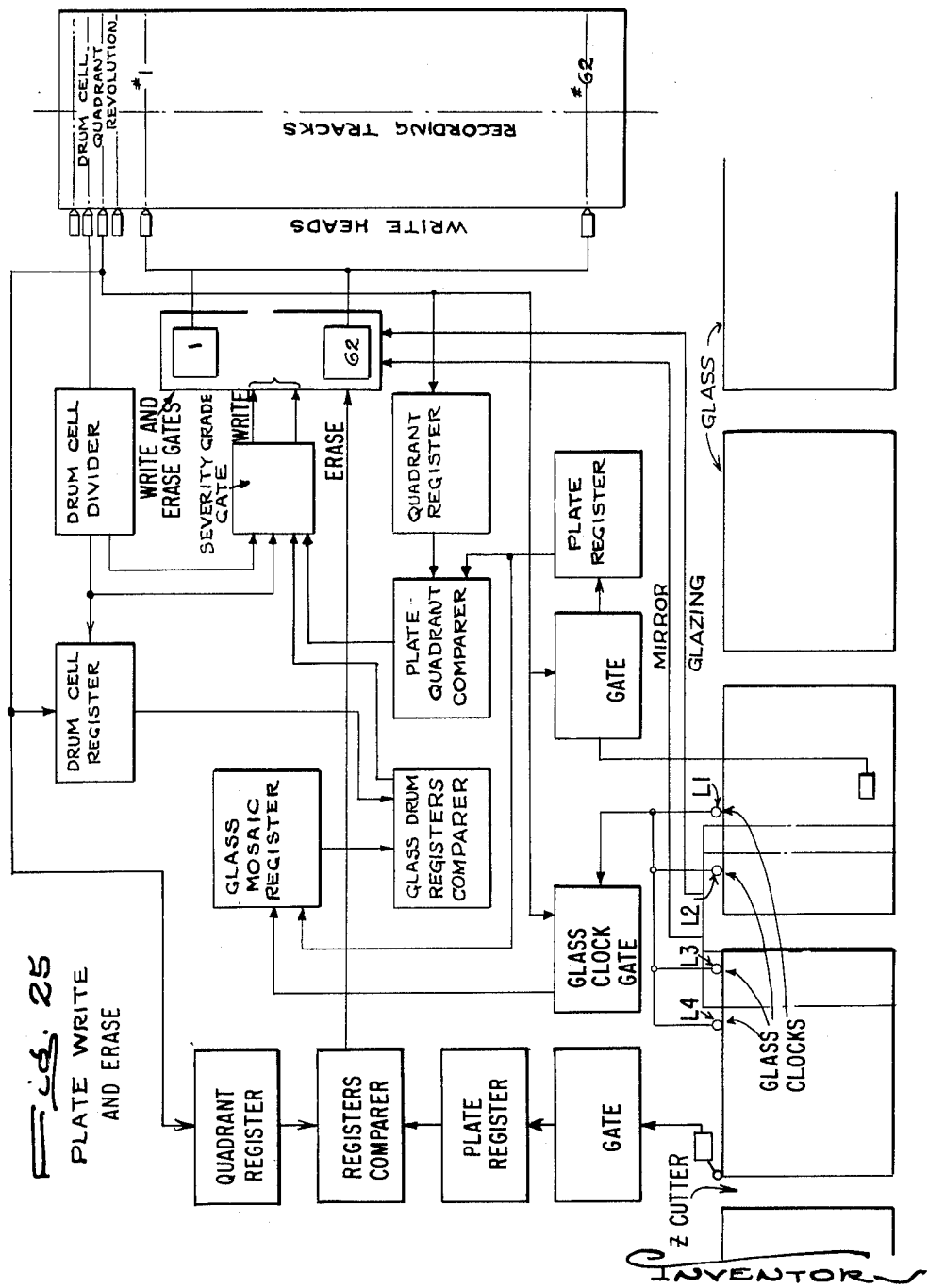

FIGS. 6–8 graphically portray the trial partitions that establish the table of FIG. 5;

FIG. 9 furnishes a development of the drum surface with defect signals recorded in the drum cells corresponding to the defective mosaics in a further example of the leading portion of a glass sheet;

FIG. 10 is a block diagram of the defect storage unit components used in recording defect signals derived by inspection of a continuous glass ribbon on the line;

FIG. 11 is a perspective of the magnetic drum illustrating the recording and reference tracks and the division of the recording surface of the drum into quadrants and drum cells;

FIG. 12 is a timing diagram illustrating the time relationship between drum cells and glass mosaics;

FIG. 13 is a timing diagram illustrating the states of the drum cell register flip-flop stages;

FIG. 14 is a block diagram showing the defect storage unit components in continuous ribbon-write operation for all inspection lines;

FIGS. 15 and 16 when arranged edge to edge form a circuit diagram illustrating the major components of the defect storage unit set for continuous ribbon-write operation;

FIG. 17 is a timing diagram illustrating the signals of a gate circuit of FIG. 15;

FIG. 18 is a schematic circuit diagram illustrating the connections from the A and B scanning heads on inspection lines L1 and L2 to the write head gates;

FIG. 19 is a timing diagram illustrating the output pulses of the register's comparer;

FIG. 20 is a circuit diagram illustrating components used to erase and record the leading edge signal on the leading edge reference track;

FIG. 21 is an illustration of a fragment of the drum schematically showing the leading edge track erase period;

FIG. 22 is a block diagram of the defect storage unit components used in continuous ribbon-read operation;

FIG. 23 is a circuit diagram illustrating certain components shown in the block diagram of FIG. 22;

FIG. 24 is a timing diagram of signals in the circuit of FIG. 23;

FIG. 25 is a block diagram showing the defect storage unit components in plate-write operation;

FIG. 26 is a block diagram showing the components for all lines, in plate-write operation;

FIG. 27 is a circuit diagram illustrating components of the unit set for plate-write operation;

FIG. 28 is a timing diagram illustrating the division of the drum surface into quadrants;

FIG. 29 is a further timing diagram illustrating the states of the plate and quadrant register flip-flops and the output signals of the comparer therefor;

FIG. 30 is a further timing diagram illustrating the relationship of signals in a gate circuit of FIG. 27;

FIG. 31 is a block diagram of the components of the defect storage unit set for plate-read operation; and FIGS. 32 and 33 when arranged edge to edge form a circuit diagram illustrating the major components used in plate-read operation.

While the invention is susceptible of various modifications and alternative constructions, an illustrative form of the invention has been shown in the drawings and will be described in considerable detail. It should be understood, however, that there is no intention to limit the invention to the form disclosed, on the contrary, the invention is to cover all modifications, alternative constructions and equivalents falling within the spirit and scope of the invention as expressed in the appended claims.

I. GENERAL ORGANIZATION

A. *Glass partitioning*

Upon more specific reference to the drawings it will be seen that the invention is applied to apparatus employed in the manufacture of plate glass in the form of a continuous ribbon, or sheets of a fixed length. Generally, the industrial apparatus illustrated provides means for partitioning the glass into salable sizes, excluding the defect containing portions. To this end, as illustrated more particularly in FIGURE 1, which comprises an overall schematic representation of the apparatus, the glass is conveyed from a source, from right to left in FIGURE 1, by means of a roller conveyor to a cutting apparatus for making a transverse cut across the glass ribbon width, herein called a Z cut, and a set of second cuts, herein called S cuts, to slit or slice the cut-off Z length into smaller widths. For making the Z cuts, there may be employed the cutting apparatus shown in application Serial No. 787,510, filed January 19, 1959, by Charles O. Huffman, William F. Galey, and George W. Misson, entitled "Glass Cutting Apparatus," now Patent No. 3,107,834. Marks indicating the S locations for the S cuts may be marked on the individual Z lengths of glass after cut by the Z cutter by marking apparatus including devices for applying marks to the glass, such as that shown in application Serial No. 850,460, filed November 2, 1959, by William F. Galey and George W. Misson, entitled "Glass Partitioning Process and Apparatus." The S cuts may be made on the S marks by cutting apparatus shown in application Serial No. 769,223, filed October 23, 1958, by Charles O. Huffman, William F. Galey, and George W. Misson, entitled "Glass Cutting Apparatus," now Patent No. 3,146,926. Such S cutting apparatus may be arranged in any desired manner downstream of the marking apparatus, for example, side lines may be employed as shown for shunting different Z lengths to separate S cutting apparatus, thereby speeding up the cutting operation to maintain pace with the glass manufacture.

The Z and S cuts, as shown in FIGS. 2 to 8, are made according to cutting determinations evolved by computation to partition the glass into smaller defect-free rectangular pieces excluding the defect-containing areas. While the expression "defect-free" is used herein, it is recognized that no portion of the glass is fully defect-free, and by this expression is meant free from defects of such severity as would lower the quality of those areas of the glass as might contain them to below a certain specified ("glazing" or "mirror") grade. Necessarily, therefore, "defect-free" also requires the standard being applied: that is, free from "mirror" or "glazing" defects.

In the present industrial apparatus, computations are made automatically by a computer supplied with defect location information. A computer having means particularly suited to making the requisite computations is shown in the application of William F. Galey, Joseph A. Galotta, and Forrest K. Umbel, Serial No. 850,360, filed November 2, 1959, entitled "Length and Area Partitioning Methods and Apparatus." This computer is supplied with defect-location information and determines the cuts to be made at a speed such that the glass may be cut according to the cutting determinations in pace with its continuous production movement along the conveyor to the glass cutting apparatus. The cutting determinations are made following a logic involving fitting or piecing out different combinations of various programmed grades and sizes from the usable defect-free areas of the continuous ribbon of glass or of the individual glass plates. The computer may be installed in any convenient location near to or remote from the production line to be supplied with defect location information and is connected to transmit commands to the glass cutting apparatus through suitable connections.

For making the computations by means of which the cutting determinations are evolved, the computer is supplied upon its command with information as to defects in the glass. To provide such defect information, the glass may be inspected either manually or by automatic inspection apparatus. In accordance with the present invention, this defect information is recorded in a defect storage apparatus which may be located either at the computer installation, or elsewhere, and produces a secondary record to store the defect location information so that it is available to the computer as required. In carrying out the present invention, an erasable record is made of the defect location information on a magnetic drum, and means are provided for read-out of such information into the computer at its command to make the cutting determinations.

Before proceeding with a detailed description of the defect storage apparatus of this invention, a brief explanation is being given of the two-cut logic on which the partitioning calculations are based, followed by a brief description of the operation and features of the computer described in detail in the above-identified application. A brief description is also given of the industrial apparatus in connection with which the storage apparatus and computer are described, including the glass line and associated apparatus for glass inspection upstream and glass cutting downstream.

Figure 1:
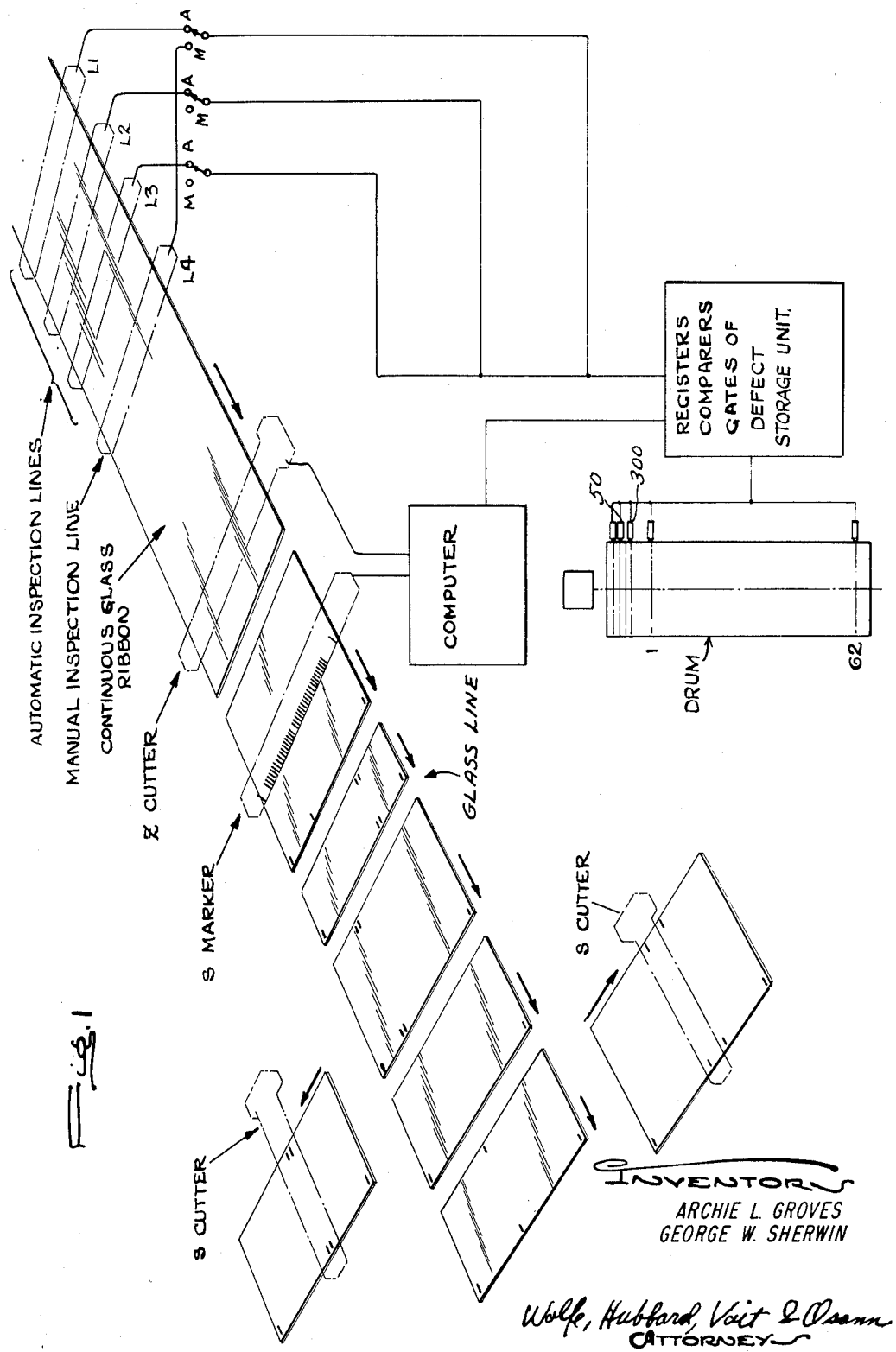
FIGURE 1 is a semischematic view of a glass factory inspection and cutting system incorporating the defect storage unit of the present invention.

Still referring to FIGURE 1, the glass sheet may be quarter-inch plate produced as a continuous ribbon or as individual plates over ten feet wide at a rate in the vicinity of over 200 lineal inches per minute. The Z cut made by the Z cutter is the first cut of each operation and the set of S cuts, the locations for which are applied to the Z lengths by the S marker, follow to slit or slice the cut off Z pieces into smaller widths and thus eliminate the defects. This is the two-cut logic.

Figures 2, 3, 4:
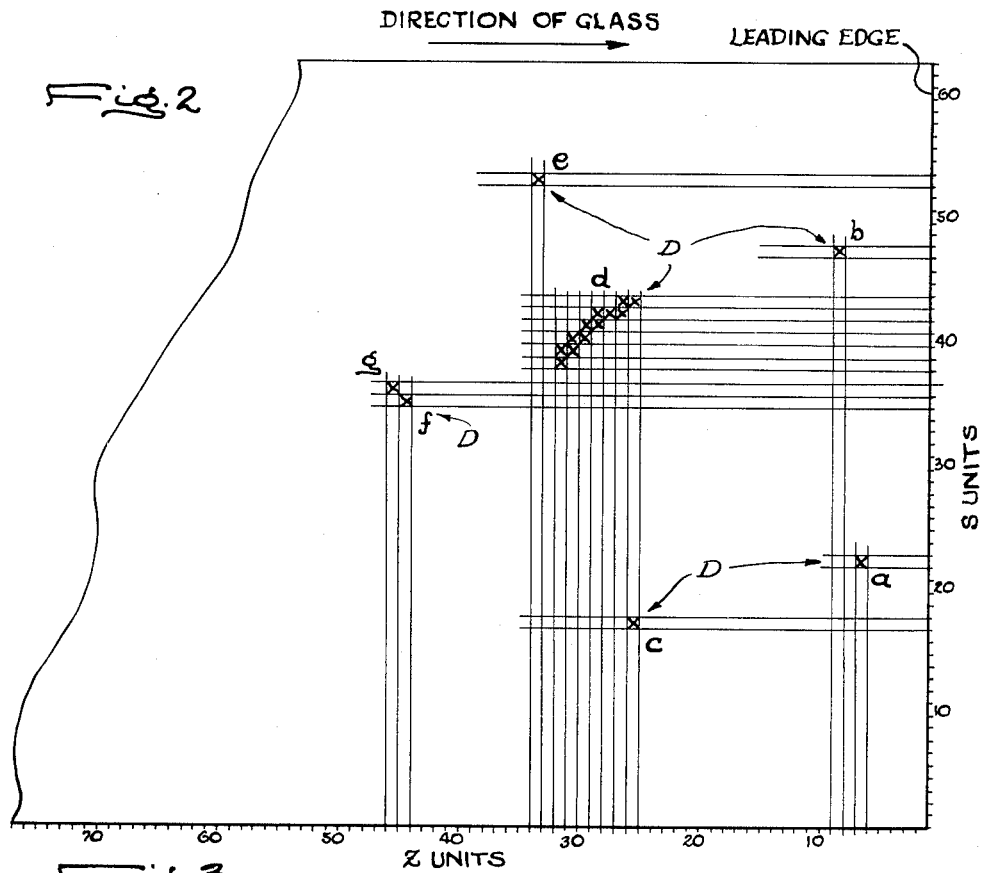
FIG. 2 is an example of a leading portion of a glass sheet with particular defect pattern located thereon.
FIG. 3 is a table of the defect pattern example locating the defective unit squares (mosaics) of FIG. 2.
FIG. 4 is a table of exemplary programmed sizes with rank and value to be cut from the glass sheet of FIG. 2.

In the present case different means are illustrated for providing defect data to the storage apparatus which accommodates either of such means. Thus what is called "Manual" operation may be carried out wherein the glass ribbon or plates may be manually, visually inspected for defects, and marks placed on the glass representing such defects by skilled inspectors. Photosensitive defect detection apparatus over the glass responds to the marks providing defect data which is supplied to the storage apparatus and recorded. Alternatively, what is called "Automatic" operation may be carried out wherein inspection apparatus over the glass detects the defects directly without previous manual inspection. With either type of operation, for the purpose of usefully relating the defect locations to given desired sizes of the glass, a basic dimensional unit is established in which all the length and width requirements of programmed sizes are integral multiples. With a ribbon 124 inches wide, as shown in FIGURE 1, a unit of 2 inches (FIG. 2) has been chosen, giving the glass an effective width dimension of 62 units (S dimension). The glass is measured in units back from the leading edge along the length or Z dimension, and the width or S dimensions are measured from one of the side edges. The glass thus is measured, and the defects located, as shown in FIG. 2, by means of the mosaics or 2 inch unit squares on the glass. A defect on the glass is designated according to the Z by S location of the mosaic in which it appears.

Defect location information on the record made in the defect storage apparatus, is transferred to means for calculating or piecing out the required sizes from the defect-free areas of the glass, herein described as a computer, the details of which are found in the copending application previously referred to. The information required by this means for making the calculations to partition the glass is in the location of the leading edge of the glass ribbon or plate, the S locations of defects in any trial Z length with respect to the leading edge of the ribbon or plate, and the program of sizes to be cut. Moreover, programming more than one useful grade or quality is possible by classifying defects according to severity level and providing, for example, a mirror storage record which locates as defects all unit squares unacceptable for mirror grade, and a glazing quality defect storage record which locates as defects the usually lesser number of squares unacceptable for glazing grade (and usually remelted as cullet glass).

While the computer construction and operation is described in detail in the above referred to application, a brief description is given at this point of the logical process carried out by the computer and of the basic features of the computer, to complete the illustration of how the defect storage unit of this invention will operate as part of an industrial apparatus capable of accommodating the output of a plate glass factory.

Size programming as applied to the operation of the computer is the quantitative demand description covering both the absolute sizes of glass and of the relative demand for them. As to the sizes themselves, the lengths and widths of the various rectangles to be cut are arranged to group the respective width dimension, sharing a common length dimension, as illustrated in the chart of FIG. 4. All of the length dimensions are thus grouped, each associated with one or more width dimensions. The relative demand for the different length by width sizes is preferably presented in a two-part analysis. Thus a numerical value is established for each size so that values of groups of sizes can be accumulated and compared. Further, a rank or order of priority is established for the respective width dimensions associated with each length dimension.

In accordance with the two-cut logic, the trials for the first cut (FIGS. 5 and 6) correspond to the different programmed lengths as measured from the leading edge of the glass. Thus for each programmed length a trial length of the glass ribbon or plate is considered for which either all or part of the total width are available for partitioning as defect-free spans between defects, depending upon the number and location of the defects. Each defect will be contained in a defect strip having a dimension of the programmed length being considered.

Next the programmed widths for that particular programmed length are fitted into the available widths according to an assigned rank. The waste, which includes unfitted portions of the defect-free widths as well as the defect strips themselves, is minimized by choosing the number and variety of programmed widths that best partition the available defect-free widths. For each programmed length and corresponding width thus tried, the values of the programmed sizes utilized are accumulated as to value per crosscut.

The steps of fitting the programmed available defect-free widths and subsequent value accumulations, is repeated for each programmed length before any cutting decision is made. In effect, a number of trial first cuts across the width of the glass are made by this logical process; the cut for which the best fit is provided, i.e., that for which the value of the fitted programmed size is highest, is chosen. After the chosen cut determination has been made, commands for cutting that programmed length and subsequently cutting the fitted widths of that programmed chosen length, are issued.

After a cutting determination has been made, starting from the edge of the cut which, in effect, is a new leading edge, the steps are repeated. Thus each programmed length is again considered but with respect to the new leading edge. Where the glass is produced in the form of a ribbon, all the programmed sizes are considered with respect to each new leading edge. The defect locations with respect to the leading edge are changed, of course, and the available widths are redetermined. Where the glass production consists of plates, to avoid left-over lengths, a Z is always chosen which is part of an exact fit of the various programmed Z dimensions of the total remaining length of the sheet. After again fitting the programmed widths into the available widths for each programmed length and accumulating the value of the sizes which would be cut, the next programmed length representing the best value is selected as the second crosscut in the repeated procedure. The widths for that second cut are slit and the fitting procedure is initiated again with respect to the newly created leading edge. The process continues, a decision at a time, for the lengths of the individual sheets, or endlessly for the ribbon.

A defect-spotted section of a sheet or ribbon of glass is shown in FIG. 2. The defect areas D are intended to be random since in actual production their number and location cannot be predicted. The defects are located on the glass with reference to the leading edge and one side edge in the manner shown.

The table of FIG. 4 illustrates a simplified program of sizes to be cut in which eight sizes are listed which may be reduced to three different lengths or Z dimensions, each having a group of two or three width or S dimensions (35, 20, 9), associated with them. For simplicity, a program of sizes for only one grade of glass is listed, although it will be understood that another series of sizes may be programmed for a different glass grade. Considering the example shown, for any given Z cut along the length of the glass from the leading edge there may be a choice of S cuts. In the table of FIG. 4, the larger of each S in a family of S dimensions for a particular Z ranks over each smaller S. Furthermore, each Z by S size is assigned a value which, in this particular case, corresponds to its S dimension of that size. This means, for the example indicated, that different areas having the same S dimension are of equal value, but this is not necessarily anamolous as will be seen.

To partition the glass ribbon having the defects in areas D, as shown in FIG. 2, each of the Z dimensions as shown in the table of FIG. 4 is made the basis of a trial or tentative first cut as measured from the leading edge of the glass. Then, as measured from the reference side edge of the glass, each defect is marked off as a strip one unit wide leaving particular available defect-free widths. In fitting the S dimensions into an available width, the minimum waste partition is resolved by employing the highest ranked S's wherever a choice occurs. If there is no exact partition, the available width is decreased by one and the fit again tried. This process is repeated until a perfect partition is gained or the defect-free width is exhausted. FIG. 5 graphically portrays the S fits for the three Z trials tabulated in FIG. 4; the cross-hatched area CH (FIGS. 6–8) in each case represents the defect strip; the single hatched areas SH (FIGS. 6–8) represent the glass discarded as cullet with a defect strip, if the Z cut is elected due to the impossibility of making an initial fit.

By totaling the assigned values of the utilized sizes for each trial Z, the Z choice is dictated by the highest accumulation. In this case the Z of 20 is chosen since the value is 58—on two unit defect strips plus two additional unit strips of unfitable waste glass are involved. In the long run (i.e., a day's, a week's, a year's production), the waste is by definition minimal since the programmed sizes have been cut in programmed order to meet the demand thus analyzed.

In the preferred computer (so labelled in the figures), a clock and trial stepper time and order the different operations during each computer cycle. The clock (so labelled in FIGS. 10 and 14) as such provides trains of timed impulses synchronized with the defect record, the glass conveyed along the glass line, and the location of the glass sheets on the line as well as their successive leading edges as cutting decisions are made.

The stepper, timed by the clock, establishes a series of twenty trials after which a selected trial is repeated as a twenty-first trial. During the twenty-first trial, the computations for the selected Z trial length are repeated, the results are accumulated or issued as commands, or both, and the apparatus is reset to complete the computer cycle for the next twenty trials with respect to the leading edge. In the present case, twenty electrical channels are sequentially energized by the trial stepper, and the computer includes a converter to provide a binary representation for the particular Z length associated with each of the twenty trials. Separate inputs to the computer also supply commands as to the severity grade record to be interrogated for each of the twenty trials.

The Z program panel and the S by Z programmed panel together define the size aspect of the computer demand program. A value is assigned to each programmed Z by S as mentioned above in connection with FIGS. 2b and 2c, in a value program panel. This information, together with the quality or grade choice, completes the demand for the program.

The other portion of the computer input program is the defect information from the defect storage apparatus. This information must be related to the leading edge of the glass, and to each new leading edge established by each chosen Z cut of stored cutting decision. Moreover, programming more than one useful grade or quality is provided by storing defect information according to the severity level on the drum surface. How this may be achieved is described in the following sections.

B. *Glass inspection for defects*

Referring to FIGURES 1 and 9, in the apparatus there depicted provision is made for examining the glass flowing along the glass line for defects either directly by optical scanning devices (A scanners, B scanners) or by photosensitive elements which are responsive to marks previously placed on the glass by skilled inspectors to indicate defective mosaics. Thus, for illustrative purposes, the defect detection devices (A scanners, B scanners) are arranged on a plurality of transverse inspection lines L1 to L4 to scan the glass as it passes beneath from the grinding apparatus upstream to the Z and S cutting apparatus downstream of the inspection lines. The inspection line L4 furthermost downstream in the present instance comprises a bridge positioned over the glass and carrying photosensitive defect detection apparatus arrange to respond when a defect mark, previously placed on the glass by a skilled inspector following manual visual inspection of the glass, passes the location of the photosensitive apparatus of lines L1 to L4. Such photosensitive defect detection apparatus is described in the copending application of William F. Galey and George W. Misson, Serial No. 850,460, entitled "Glass Partitioning Process and Apparatus." As described therein, the detection apparatus includes a row of photosensitive elements on the bridge and facing the glass on the conveyor. Such elements are preferably arranged so that a single photosensitive detection element is mounted over each of the sixty-two, two inch unit S widths across the width of the glass ribbon. Each photosensitive detection element, therefore, is arranged to respond to a defect mark on glass mosaics at a given S dimension from the reference side edge.

To distinguish between the severity of the defects present in the glass in a manner that will be registered by the photosensitive elements, crayon marks of different color and hence effect on the photosensitive elements are applied to the glass at the time of inspection to designate different grade defects. For example, a red crayon mark may be used for indicating mirror defects, and a black mark for indicating a glazing (total) defect, and the photosensitive elements and circuit so arranged as to be discriminate between the colors of the marks to designate severity grade. The defect data is supplied to the defect storage apparatus in the form of voltages on a pair of conductors which lead from each photosensitive element to the defect storage apparatus; a voltage pulse on one such conductor represents a mirror grade defect; a voltage on the other conductor represents a glazing grade defect.

While the inspection line L4 furthermost downstream includes photosensitive detection elements which are arranged to respond to marks made on the glass after manual inspection, in the other inspection lines of FIGURES 1 and 9, means are provided for inspecting the glass directly for defects without prior manual inspection and marking. For this purpose on lines L1 to L3 devices are mounted capable of optically scanning the glass for defects. For convenience, the scanning devices are arranged on these different transverse inspection lines according to types of defects in the glass to which they are particularly responsive. Referring to FIG. 9, the A scanners on line L1 furthermost upstream, in the present case, are devices optically responsive to defects in the glass hereinafter called Type A defects. As shown in this FIG. 9, such devices are arranged to scan 16 mosaic wide bands, such an arrangement being entirely illustrative and forming no part of the present invention. The brief description which follows of the inspection apparatus is included to show one variety of inputs accommodated by the defect storage unit; however, it will be understood other inspection apparatus may be used or different arrangements of the present apparatus, as required or desired. The scanning devices of line L1 are carried by suitable support means such as a bridge (not shown) which reciprocates so as to pass each of the scanning devices, which are fixed, over a 16 mosaic wide band of glass while the glass moves 2 inches in the Z direction. In the present case the bridge moves so that the four A scanners (FIG. 9) carried thereby sweep the entire 62 mosaic width of the glass on the line. The rate of reciprocation of the bridge is adjusted according to the conveyor speed so that each two inch mosaic is scanned by one of the four A scanners on the bridge. Such Type A defects are microscopic surface defects which are not localized, but are distributed over relatively wide areas of the glass surface. Such defects susceptible of discernment are sweep, peel and short finish. Reference may be made to the copending application of Hugh E. Shaw, Jr., Serial No. 850,347, entitled: "Inspection of Glass," now forfeited, for a complete description of the A scanner apparatus. For present purposes, however, a brief description of this inspection apparatus will serve to explain those features of its construction and operation which affect the other components of the glass inspection and partitioning system. Thus each A scanner head includes a light source on one side of the ribbon of glass which shines a beam of light through the glass to be intercepted by the Type A defects. The light beam is received by the A scanner optical system which is responsive to modulating effects on the light beam due to any Type A defects. The relative movement of the beam is utilized in detecting defects since the unit responds to the changing modulation of light intensity due to defects intercepting the light beam.

On the bridge at inspection line L2, four B scanner heads are mounted as shown in FIG. 9. The bridge is also reciprocable so as to cause the four B scanner heads to sweep the full glass width, each B scanner head covering a 16 mosaic wide band of glass as the case of the A scanners on line L1. In the present case, a B scanner is responsive to defects of Type B, which exist within the body of polished plate glass and result from incomplete blending of the various batch ingredients during the glass melting and refining operations and extend generally in the direction of the draw of the glass. These defects are strings, striae, and ream. A more complete definition of such type defects, and a B scanner apparatus may be found within copending application of George B. Sleighter and Joseph S. Zabetakis, Serial No. 850,312, entitled: "Inspection of Glass" filed November 2, 1959.

As described more completely in the applications referred to above, such A and B scanners indicate both presence and severity level of defects. For this purpose pairs of conductors are connected to each scanner head, a voltage on one conductor indicating a mirror grade defect, and a voltage on the other conductor indicating the more severe glazing or total defect.

To locate the S dimension of a mosaic found defective by one of the A or B scanners, a signal is supplied to the defect storage apparatus representing bridge position. This is achieved herein by a voltage on one of sixteen conductors each corresponding to one S width of the band of sixteen covered by a single scanner head. Thus as the bridge moves to shift the A1 scanner from the first into the second mosaic, for example, a voltage pulse on the first bridge position conductor is shifted to the second bridge position conductor. To combine the signals on the bridge position conductors with the defect indicating signals from the four A scanners and the four B scanners in the defect storage apparatus, the 62 write heads are divided into four groups of sixteen each. One set of sixteen such bridge position conductors, as represented in FIG. 18, is provided for each of lines L1 and L2, and each such set is connected to operate all four groups of write heads.

In addition to the A and B scanners which reciprocate in timed relation with the movement of the glass ribbon or sheets, the inspection station also includes on line L3, CD scanners which are aligned with the glass on a substantially fixed bridge. In this respect, such CD scanners are similar to the photosensitive defect detection elements of the manual inspection line L4, and include a full set of 62 such devices, one over each glass mosaic in the S direction and numbered to correspond therewith as shown in FIG. 9. CD scanners are responsive to Type C and Type D defects. Type C defects are those of the point type, which may be within the glass, i.e., of the inclusion type, or may be present at the surface of the glass. Inclusion type defects include stones, boils, blisters and seeds. Type D defects are gross linear surface defects, broadly classified into scratches and sleeks.

It has been discovered that with defects of Type C present in and on the glass, when light from a source is passed through glass having such defects and intercepted by an objective lens to form a projected image of the glass, Type C defects will show as dark spots on a light field because they absorb light or of extremely short focal lengths. On the other hand, defects of Type D, while they also show in this field, are in much reduced intensity contrast because they affect the rays producing the projected image to a significantly lesser extent. Type D defects deviate or scatter some of the light, thus acting as secondary light sources on the glass surfaces. To distinguish Types C and D defects, the principal rays of light are separated and, when thus separated, the objective lens can be made to simultaneously present images of the glass representing Type C and Type D defects, respectively. The Type C and Type D defects detection apparatus is described in detail in the copending application of George E. Sleighter, Hugh E. Shaw, Jr., and William F. Galey, Serial No. 850,304, entitled: "Inspection of Glass" filed November 2, 1959, to which reference may be made for a more detailed description thereof. In the present case, two conductors lead from each fixed CD scanner to the defect storage apparatus. A pulse on one conductor indicates the presence of a mirror grade defect in the strip of mosaics at the S dimension of the respective scanner, and a pulse on the second conductor indicates a glazing or total grade defect in the strip of mosaics at that S dimension. The Z location of the defective mosaic is determined by means of signals corresponding in the drum cell which time the operation of the write heads to print the defect signals on the drum.

C. Storage of defect information

After the preliminary step of inspecting the glass, either directly by means of optical scanning devices on lines L1 to L3 over the conveyor, or manually followed by detection of marks by photosensitive defect detection element scanning on line L4, according to the present invention, the defect location information so obtained is recorded in such form as to be available for making the partitioning calculations. First considering the form in which defect information is required, as previously pointed out, in fitting the programmed sizes into defect-free areas and comparing the results of successive trials so as to choose the best fit, the defect location information is required in the form of S dimensions of defects in a given Z length of glass. Moreover, information in this form is repeatedly required to make a partitioning calculation and must be available upon command. In carrying out this invention, therefore, a record is provided of the defect location information produced by the inspection apparatus so that this information is readily and repeatedly available for computation purposes within the minimum time requirement imposed by the continuous flow of the glass and the speed in which cutting determinations can be made. While, in the present case, the storage means is described as being physically separated from both the inspection apparatus and the computing apparatus, such is so functionally related to both that, it will be understood, the arrangement in any installation may be suited to its particular requirements.

With the apparatus illustrated in FIGURE 1, storage is provided of defect location information to supply the latter upon command to a computer, details of which are shown in the copending application previously referred to. Such computing apparatus feasibly provides for making cutting calculations with the requisite speed to accommodate on-line requirements associated with the glass production line illustrated in FIGURE 1. With such computing apparatus, cutting and marking commands are issued to the Z cutter and S marker apparatus, respectively, avoiding storage of such Z cutting and S cutting decisions.

Still referring to FIGURE 1, the defect storage means includes a rotatable magnetic drum having a magnetic coating adapted for erasable storage of signals read-in by flux produced by write heads, and read-out by read heads constructed to respond to signal flux from a recording track on the drum surface. A head of the type providing all three functions—write, read, and erase—is shown adjacent each recording track although it will be understood that such is illustrative only and other arrangements may be used depending on equipment considerations and availability. Such heads are numbered in all figures corresponding to the recording track on the drum.

In the case of glass sheet production in the form of rectangular sheets, i.e., glass plates, to provide defect location information storage capacity for the production line shown in FIGURE 1, where the Z cutter is located approximately 430 inches (215 mosaics) downstream from inspection line L1, and keeping in mind the limitation that cutting commands issue directly without storage, the defect storage means of this invention provides for defect storage of information as to the glass between the Z cutter and line L1 as well as the glass being inspected and being cut. In terms of rectangular sheets of glass 220 inches in length (110 mosaics) storage capacity is provided for at least two glass sheets between the first inspection line and the Z cutter. Additionally, since all defect information is retained until Z cut determinations have been made for a full sheet and the Z cut commands issued, storage capacity is additionally provided for the sheet being cut. In-storage capacity of three sheets is thus provided.

According to the present invention where the glass on the line is in the form of a continuous ribbon, storage capacity is provided for defects in the glass ribbon between the first inspection line L1 and the last inspection line L4, plus the maximum programmed Z. With a maximum programmed Z of 220 inches or 110 mosaics (the full length of a glass sheet), and a magnetic drum with a peripheral track of five hundred cells for mosaic storage, the inspection zone can be up to 290 mosaics or 580 inches. In practice all inspection lines can be accommodated within a shorter length, for example, 190 mosaics.

As previously described, defects, whether in individual, rectangular glass sheets or in a continuous glass ribbon, are located by the inspection apparatus according to the Z by S coordinates of the defective mosaics with respect to the reference leading and one side edges (FIG. 2). Using the two-cut logic followed in partitioning the glass, the defects are excluded by successive Z and S cuts, the defect-containing strips between defect-free spans being discarded as cullet. In calculating the preferred fits, the defect pattern in the glass is examined using a Z by Z procedure in which defects appear at the S locations. The S locations of the defects in any given Z length is thus the information provided for calculation purposes.

To store the defect location information in a manner that makes it available in such requisite form for calculation purposes, referring to FIGURES 1, 9–11 and 14, the surface of the magnetic drum (FIG. 11) is divided into a minimum of sixty-two side-by-side defect recording tracks each extending the full periphery of the drum. Each track corresponds to an S strip of glass one unit square or mosaic wide and is numbered according to its S dimension on the figures. A defect signal recorded in such a track when read out indicates a defective mosaic at that particular S dimension.

With particular reference to FIG. 11, to provide the foregoing storage capacity in terms of Z lengths of glass, each recording track on the surface of the drum is divided circumferentially into five hundred cells by means of a pre-recorded reference track on the drum, herein called the drum cell clock track.

In preparing a record on the drum of defects in the glass on the line, each drum cell represents a two inch unit square of glass and is 33.3 microseconds in length, that is, 33.3 microseconds is required with the drum rotating at 3600 r.p.m. for one drum cell to pass a fixed recording head. With respect to a given point on the drum, representing the glass leading edge, storage capacity in terms of drum cells is thus provided for defects in a continuous ribbon 500 two inch mosaics in Z length.

Still referring to FIG. 11, the magnetic drum surface may also be divided circumferentially into four separate quadrants (125 cells each) by means of a pre-recorded reference track called the quadrant clock track, having four equally spaced signals in 360° of track, such that the defect information as to an individual plate, which is 110 mosaics in length, may be stored in one quadrant. For plate production, with this arrangement, defect information may be stored for four individual plates. With the apparatus and conveyor line shown in FIGURE 1, only one section or quadrant of the drum is required at a time, for read-out of the stored information. The other three quadrants may be in the unused state or the read-in state depending upon other factors, such as location of the glass plates on the conveyor and conveyor line speed.

When used for defect storage for continuous glass ribbon production, the entire drum surface is used without dividing the same into quadrants, thus providing 500 cells and in-storage capacity for 500 mosaics or unit squares of glass in the Z direction. The maximum required for the inspection apparatus with the arrangement shown in FIGURE 1, given above as 190 mosaics, is thus accommodated. A reference track, however, is provided in which is recorded a signal representing the point on the drum corresponding to the leading edge of the glass ribbon. Such leading edge track signal is shifted as each Z cut is made producing a new leading edge. An imaginary line on the drum coinciding with the leading edge signal represents the transverse reference edge relative to which drum cells are located in the Z direction.

Further according to the present invention, separate records are made of glass defects according to severity level or grade. In achieving this result, each cell on the drum surface is divided into forward and rearward parts (Z direction), the forward portion being reserved for mirror grade and the rearward portion being reserved for glazing grade defect information. The location of a defect signal within the drum cell thus serves, when the defect signal is read out, to identify the severity grade of the defect in the glass. Completely separate "mirror" and "glazing" defect records are thus stored on the drum.

One of the principal features of the defect storage means of the present invention is its effectiveness in accommodating inputs from different types of inspection apparatus at the glass line despite the asynchronous operation of the defect storage means and the glass line.

In connection with this important feature, provision is made for relating the motion of the glass on the conveyor to the motion of the magnetic drum. In carrying out the foregoing, means are provided for locating a particular drum cell and area on the surface of the drum utilizing signals produced by the plurality of pre-recorded reference clock tracks on the drum shown in FIG. 11. Thus the drum cell clock track, previously mentioned, locates the 500 cells into which each recording track on the drum surface is to be divided by providing a pulse from the read-out head 50 corresponding to each cell as the drum rotates. For "plate" production, the quadrant track (FIG. 9), also previously mentioned, locates the quadrants into which each recording track is divided by providing a pulse from a read-out head 300 (FIG. 20) at the beginning of each quadrant of the drum.

In the present case, referring to FIG. 10, to locate drum cells relative to the leading edge on the drum, a drum cell register is supplied with signals derived from the drum cell clock track, in the form of a train of pulses at the rate of 500 per drum revolution. A cell divider circuit supplies the drum cell register with pulses at the requisite rate. Such drum cell register is a binary register which is reset each drum revolution to its reference state coincident with the passing by the write heads of the leading edge signal on the leading edge track on the drum. Thus the drum cell register registers the progression of drum cells past the row of write heads starting with the leading edge, each drum revolution.

For locating a particular unit square or mosaic of glass in the Z direction with respect to a transverse reference edge, appreciating that there are no physical markings on the glass, now referring to FIGS. 14 and 26, a timing device operated directly by the glass on the conveyor, herein called a glass clock, is provided. This glass clock, illustratively a pulse generator operated by a wheel (63, FIG. 15) contacting the surface of the glass and rotated thereby to cause the generator to produce pulses at a frequency related to glass speed, provides a means by which a particular unit square or mosaic of glass may be located in a longitudinal sense from a transverse reference edge. In plate production, where the glass on the line is in the form of plates of fixed length, the transverse reference edges employed to locate the unit squares in the Z direction are the leading edges of each rectangular glass plate. Leading and trailing edge switches are provided as shown in FIG. 26 at each inspection line L1 to L4 on the conveyor to be tripped by the glass sheet. In continuous ribbon production, the transverse reference edge is the leading edge of the ribbon, with a new leading edge being produced upon each cutting operation of the Z cutter.

Referring now to FIGS. 9, 10 and 14, the defect storage unit of the present invention provides means for defect information as to a continuous glass ribbon on the production line. Moreover, such information may be provided by apparatus on a plurality of inspection lines, herein shown as automatic inspection lines L1 to L3, or the manual inspection line L4. In achieving this result, to locate the rank of drum cells corresponding to the rank of glass mosaics under any inspection line L1 to L4, means are provided associated with each inspection line, herein shown as binary registers called glass mosaic registers, for registering the progression of glass mosaics past the inspection lines L1 to L4, respectively. Moreover, means are provided for comparing the states of all such glass mosaic registers with a single drum cell register which, as previously mentioned, is a binary register for registering the progression of drum cells past the row of recording heads each drum revolution. By comparing the registers in a suitable comparer circuit, an output signal is produced each drum revolution which represents the drum cell corresponding to the glass mosaic at the associated inspection line.

The drum cell locating output signal from each registers comparer shown in FIG. 14 for inspection lines L1 to L4, is conveyed to a severity grade gate in which such drum cell locating signal occurring once each drum revolution, is divided into separate signals representing the allotted halves respectively for printing defect signals according to severity grade in the located drum cell.

Such separate signals are conveyed to individual write head gates for each "write" or recording head, such gates being numbered corresponding to the S dimension of the respective recording head in FIG. 14. For convenience only a few of the total of 62 recording heads are shown in FIG. 14, however, it will be understood that an individual write head gate is included for each recording head.

Each write head gate is also connected to the defect inspection apparatus on every inspection line so as to combine defect signals from all inspection lines and record such signals in the drum cells marking the defective mosaics. With the unit set for automatic inspection, when a defective mosaic passes the A scanner head on line L1, for example, the latter produces a defect signal which is combined in the write head gate numbered the same as the S dimension where the defective mosaic is located, with the drum cell locating signals from the severity grade gates, to activate the same S recording head. Defect signals from the B scanners and the fixed CD heads are likewise accepted in the write head gates and combined with the drum cell locating signals. Where the defect storage unit is set for manual inspection, the photosensitive elements on line L4 are connected to the write head gates at the same S dimension, and defect signals supplied thereto are combined with drum cell locating signals from the severity grade gates to activate the write head. Depending on the severity of the defect, the defect signal will be recorded in the forward or the rearward part of the drum cell, the function of suitably placing the defect according to severity being also achieved by the write head gates.

With the defect storage unit set to read out defect information for continuous glass ribbon, the procedure followed is to open each of the read gates, which are connected to each of 62 read heads over the recording track, once each drum revolution as the imaginary longitudinal line on the drum corresponding to the glass leading edge arrives at the read heads, and to close such gates when the trial Z length being interrogated is past such heads. In the present case this is achieved by combining a signal from the leading edge track on the drum, with an interrogation command signal, by suitable means in the circuit located in the block labelled "Start Read Comparer" of FIG. 22. Such circuit produces an output pulse which represents the start of the read period, which pulse is conveyed to open the read gates.

The termination of the read period is represented by a pulse produced by means of the block labelled "Stop Read Comparer." The latter circuit compares the states of the drum cell register with a binary representation from the computer over conductors leading therefrom, representing the trial Z length to be interrogated. Thus when the state of the drum cell register matches the binary number supplied from the computer, an output pulse is conveyed to the read gates representing the drum cell at which the interrogation period will terminate. Such pulse is produced once each drum revolution that the drum makes during the interrogation period.

Still referring to FIGS. 22 and 23, interrogation of the magnetic drum for defect storage information is achieved through the control stage of the S defect per Z interrogator of the computer. Also shown in FIG. 22 are the connections between the control stage of the S defect per Z interrogator and the magnetic drum defect storage unit. Such connections include separate channels representing successive powers of two, to provide the interrogating comparer with a binary representation for each trial Z up to and including the largest programmed trial Z. Where the maximum trial Z length is 110 mosaics, a total of seven channels will be provided.

A pair of conductors M, G are shown in FIG. 22 leading from the computer to quality selector gates of the defect storage unit for selecting defect information according to quality grade. A voltage on conductor M of said pair designates mirror grade interrogation while a voltage on the conductor G designates glazing grade defect interrogation. A similar arrangement is used in both continuous ribbon and glass plate operation. During the trial Z steps an interrogating relay for each quality selector conductor is operated to direct glazing or mirror defect record read-out. As a matter of desirable practice, if the Z's are programmed in order of size, a computer cycle can start with the highest number (or lowest number) Z interrogating relay energized and the trial stepper may successively energize lower (or higher) Z interrogating relays in order.

Referring to FIG. 22, read-out of defect information stored on the magnetic drum is achieved by energizing read head gates, as hereinbefore described, so that defect signals produced by the read heads during the period each drum revolution that the trial Z length under interrogation passes such heads, are conveyed to energize computer relays shown as S relays in FIG. 22. As also shown in FIG. 22, each read-out head is connected to a read-out relay in a set of sixty-two of the latter in the computer, called S relays, through the read gates. These read gates thus serve to transfer a signal from a read-out head to its associated S relay when a defect appears at the S location in a given trial Z length under interrogation. A recorded defect in a trial Z length produces a signal via the read head at the S dimension of the recording track in which the defect signal appears. Such signal actuates the associated S relay. Thus in the read operation, the S relays of the computer are energized and designate the S dimensions of defective glass mosaics in the trial Z lengths, which is the form in which defect information is required by the computer for computation purposes.

Now turning to a consideration of the defect storage unit when set for recording defects with glass plates on the line, a block diagram showing the requisite components for recording is found in FIG. 25, the block diagram of FIG. 10 illustrates the components of the defect storage unit for recording defects with continuous glass ribbon on the line. Comparing these block diagrams it will be seen that the unit for storing defect information as to glass plates includes, in addition to the components shown in FIG. 10, means for locating the quadrant each drum revolution in which defect information is to be placed as to a glass plate on the line, herein shown as a plate register; a quadrant register; and a plate-quadrant registers comparer. Such registers are suitably compared in the comparer circuit so as to provide a signal representing the period each drum revolution when the quadrant in which the defects are to be recorded is under the write heads. Such signal in the form of a quarter revolution output pulse each drum revolution is conveyed to the severity grade gates, also shown in FIG. 25, which include suitable means for combining such pulses with the drum cell locating pulses from the drum-glass registers comparer located in the block diagram so labelled. The severity grade gates together with the write head gates activate the write heads to print defect signals from the apparatus on the inspection lines: (1) in the selected quadrant; (2) in the quadrant drum cells corresponding to the defective glass mosaics; and (3) in the forward or rearward halves of the selected drum cells according to the severity of the defects.

In interrogation operation where the drum contains defect information for glass plates, components are used as illustrated in the block diagram of FIG. 31. The components for reading defect information as to a continuous glass ribbon are shown in FIG. 20. By comparing these figures it will be seen that with plate operation (FIG. 31) means are also provided for locating the quadrant on the drum for read-out purposes corresponding to the plate on the glass line at the Z cutter. This is achieved by means of a plate register which is activated by leading and trailing edge switches at the Z cutter, the drum quadrant register, and a plate-quadrant registers comparer as shown in FIG. 31. The latter comparer produces a signal representing the drum quadrant corresponding to the plate at the Z cutter and by means of this signal, conveyed to the read gates, interrogation is limited to this quadrant of the drum. The drum quadrant is interrogated for defects by considering each of the programmed trial Z lengths relative to the leading edge of the quadrant. The Z cut decision by the computer, based on the chosen fit, when executed, cuts off the Z length beginning with the leading edge of the quadrant. The programmed series of the trial Z lengths are then considered with respect to the new leading edge and the Z decision is made. The plate length which remains is reduced by each new Z cut until the cuts accumulate to 220 inches, i.e., the full length of a glass plate. When the full plate has been partitioned and a new plate arrives at the Z cutter, the plate register changes state which causes the interrogation of a new quadrant to begin. The recording, read-out, and erasing process is continuous. As a new plate, for example plate #1, arrives at the inspection station upstream of the Z cutter, defect information as to that plate #1 is placed in quadrant #1; defect information as to plate #2 is placed in quadrant #2; plate #3 in quadrant #3; and plate #4 in quadrant #4. By this time plate #1 is at the Z cutter. By means of the plate register the arrival of plate #1 at the Z cutter is registered and defect information from quadrant #1 is read out for such plate. When plate #1 is fully partitioned, as previously mentioned, the plate register records the arrival of plate #2 at the Z cutter and quadrant #2 is read-out for such plate.

Means are provided for producing a start read signal at the new leading edge as Z cuts are made in a plate. In the present case a Z cut accumulator receives each Z cut decision from the computer and stores the binary number representing Z cuts. Responsive to an interrogation command, the states of this accumulator and the drum cell register are compared in a "Start Read Comparer" to produce a signal each quadrant which is conveyed to the read gates to start the read period. The read gates serve to restrict the read operation to the quadrant corresponding to the plate at the Z cutter and also direct read out of the selected severity grade.

To terminate the interrogation period, a binary representation of the trial Z length from the computer is added to the binary number stored in the Z cut accumulator, in a Read Accumulator, and the states of the latter and the drum cell register are compared in a Stop Read Comparer to produce a signal which is conveyed to the read gates.

Once a plate is partitioned, means are provided for erasing the quadrant in which such defect data appears.

II. MAGNETIC DRUM DEFECT STORAGE UNIT

A. *Continuous ribbon operation*

1. EXEMPLARY PRODUCTION REQUIREMENTS AND EQUIPMENT CONSIDERATIONS

In accordance with the present invention there is here described means for storage of defect information provided by inspection devices located at the glass production line. This defect information is supplied from the storage means to the computer for glass Z by S partitioning. As a preferred apparatus embodiment of the present invention, the defect storage means includes a recording apparatus, herein shown as a magnetic drum with associated mechanism and electrical circuits for read-in and read-out of the defect information. The complexity of such apparatus is determined primarily by the types of defect information that are to be stored, the speed with which the defect information must be read-in and read-out, and the variations in glass production that can be accommodated. In the illustrated case, the magnetic drum unit accommodates either automatic or semi-automatic inspection of the glass for defects which provides both location and severity grade defect information. It further accommodates the asynchronous system in connection with which the invention is described wherein the glass production speed is variable and may be maintained in the vicinity of 200 lineal inches per minute, while the drum speed remains at a fixed r.p.m. It further provides defect information to the computer at a speed sufficient to supply defect data for a demand program accommodating the output of a large glass factory. Such output may be in the form of a continuous ribbon of glass 124 inches wide, or in full sheets 124 inches wide by 220 inches in length on a glass line operating at speeds up to 200 lineal inches per minute. The unit provides storage capacity sufficient to permit the computer to make partitioning calculations and command the glass cutting in pace with its production for either ribbon or spaced glass sheets.

In order to describe the components of the defect storage unit in a logical order, the unit is described in this section in connection with recording (FIGS. 9–19) and then in the following section with read-out (FIGS. 20–24) of defect information for continuous glass ribbon production. Such defect information may be provided either by direct inspection by optical devices on inspection lines L1 to L3, or by photosensitive detection on line L4 of defect marks previously manually placed on defective mosaics of glass by skilled inspectors. The modifications or additions to the defect storage unit which provide for recording (FIGS. 25–30) and read-out (FIG. 31) of defect information for glass production in the form of rectangular plates are described in subsequent sections.

It is well to keep in mind throughout this description that the defect data required by the computer for computation purposes, whether the system is operating with a continuous ribbon on the line or plates on the line, is the S dimension of defects in a given trial Z length. In achieving this end, control means are provided to discriminate between defect signals lying in and those lying out of the particular length Z under interrogation. Moreover, defect signals are recorded in either the forward or rearward half of a drum cell according to the severity of the defect. The forward half of each cell is reserved for mirror defect signals, and the rearward half is reserved for glazing defect signals. Therefore, means is further provided to discriminate between signals in the forward and those in the rearward portions of the drum cells according to the interrogation requirement.

In recording defects for glass plates, the surface of the drum is divided into quadrants so that defect information as to a single plate is recorded in a single quadrant. In the recording process, therefore, a particular quadrant on the drum is located for storage of defect information concerning one plate at the inspection line. Defective glass mosaics are located by their Z by S coordinates relative to the lead and one side reference edges of the plate. The particular drum cell in that quadrant corresponding to a defective glass mosaic in that plate is located according to its Z by S location in that quadrant. Similarly, for read-out purposes, the quadrant with defect information for a particular plate as well as the drum cells containing recorded signals must be located to read-out defect information for such plate.

In recording defects for continuous ribbon glass, defects are similarly located according to the Z by S location of the defective mosaics relative to reference edges. In this case, however, the reference edges comprise the ribbon leading edge, and one side edge. It will be understood that each Z cutting operations provides a new leading edge which serves as one reference edge until the next Z cutter operation.

In the defect storage unit about to be described, the electrical components, for the most part, are constructed using commercially available logical circuits. A great number of modifications to fit systems and apparatus requirements may be made without departing from the broader aspects of the invention as will become apparent to one skilled in the art, in reading the following description of a full scale industrial apparatus embodiment. Reference is first made to the drawings for the logical circuit symbols used therein:

heads are mounted adjacent the surface of the drum to accommodate space requirements imposed by the required sixty-two defect recording tracks and additional reference drum clock tracks.

The numbered set of write and read heads suitably mounted adjacent the surface of the magnetic drum, are the S heads and the number assigned to each is the number of its unit as counted from a reference side edge of the glass.

2. DRUM REFERENCE TRACKS

In order to provide means for locating particular portions of the drum surface while the drum is rotating, reference signals are recorded on separate reference tracks on the surface of the drum. Such tracks, for example, may be located at one end of the drum and adjacent the sixty-two, side-by-side recording tracks as shown in the view of the drum found in FIG. 11.

| Logical Circuit | Symbol | Definition |
| --- | --- | --- |
| AND Gate | | A circuit or device whose output is energized only when every input is in its prescribed state. |
| OR Circuit | | A circuit or device whose output is energized when one or more of the inputs is in its prescribed state. |
| Flip-Flop | | A device such as a bi-stable multi-vibrator having two stable states with a complementing input which allows it to act as a single stage binary counter. The complement input circuit responds to a positive change in potential, which causes the flip-flop to change state. |
| Pulse Amplifier | | A device such as a triggered blocking oscillator which responds to positive changes and produces two outputs: a normal pulse of which the leading edge is coincident with the input pulse, and a delayed pulse, the leading edge of which is coincident with the fall of the normal pulse. |
| Inverter Amplifier | | An amplifier circuit which inverts the polarity of an input pulse. |
| One-Shot Multi-Vibrator | | A multi-vibrator with one stable state and one quasi-stable state; a finite time after it is set in a quasi-stable state by an external signal, it returns to the stable state. |
| Binary Register | | A register, of serially connected flip-flop devices each having two distinguishable states, capable of changing from one to the next of a sequence of discreet states upon receipt of each of a series of pulses. |
| Binary Accumulator | | A device which stores a number and, upon receipt of another number, adds it to the number already stored and stores the sum. |

An industrial apparatus embodiment of a magnetic drum defect storage apparatus constructed in accordance with the present invention includes, for example, a suitably constructed conventional drum having a coating of magnetic material. This drum will be driven at 3600 r.p.m. and may be suitably mounted in a console adjacent the computer installation. The recording, writing and erasing heads may also be commercially obtained. Such

*Drum cell clock track.*—A pre-recorded, permanent reference track having 1,000 signals in 360° is termed herein the drum cell clock track. A read head 50 adjacent said track, upon rotation of the drum produces a train of pulses, shown in line 1 of FIGURE 12, at the rate of 1,000 per drum revolution or one each 16.6 microseconds. By means of this train of pulses, 360° of recording track is divided for defect recording purposes into 500 cells of 33.3 microseconds length. Defect data as to a single two-inch glass mosaic is placed in a single corresponding drum cell by the means hereinafter described.

*Drum quadrant clock track.*—Another pre-recorded reference track, termed the drum quadrant clock track, includes four equally spaced signals per drum revolution. A read head 52 adjacent such track produces four pulses per drum revolution, spaced 4.166 milliseconds as shown in FIG. 17, line 2. Such signals are employed, where the defect storage system is operated in connection with glass production in the form of plates, to divide the drum surface into quadrants so that defect data as to a glass plate may be placed in one quadrant with the leading edge of the plate coinciding with the start of the quadrant and the succeeding drum cells of the quadrant corresponding Z by Z to the mosaics of the glass sheet, the defect data of which is recorded in that quadrant. Defect information for successive plates of glass on the conveyor is recorded in a predetermined order of drum quadrants so as to provide a means of identifying the quadrant having defect information as to a particular plate. Picturing the drum stopped at any instant, referring to FIG. 9 which is illustrative although a development of the drum surface without division into quadrants, the defects in a glass plate located according to their Z by S coordinates by the defect detection apparatus at the inspection lines over the glass conveyor, are recorded in a single quadrant in drum cells at corresponding Z by S dimensions from the start of the quadrant, and the reference side edge, respectively. Since the present section describes the defect storage unit components utilized for continuous ribbon production as distinguished from production in the form of individual glass plates, it will be recognized that the quadrant track is not employed in the recording or reading process.

After defect data as to a glass plate is read out, and cutting commands are issued by the computer, the recorded data in that quadrant is erased so that new defect data may be recorded for a new plate in the predetermined quadrant order. The process is essentially continuous; however, the drum quadrant clock track comprises a permanent record which is not periodically erased.

3. DRUM CELL REGISTER

In the means for locating drum cells for recording and reading purposes, there is, according to this invention, included a drum cell register, found in the block so labelled in FIG. 10, which provides a means for counting the progression of drum cells passing the row of recording heads 54 each revolution of the drum.

In carrying out this function, the drum cell register receives an input signal from a circuit, herein called a cell divider, which supplies a train of pulses (FIG. 12, line 2) to the register at the rate of one every 33.3 microseconds which is the length of a drum cell. The drum cell register changes state as each pulse is received from the cell divider until the drum has made a complete revolution and the register is in the state representing the 500th drum cell, the period of each state representing the period a rank of drum cells remains under the row of recording heads. The register is then reset to its reference state. Thus the drum cell register is reset each drum revolution and is actuated suitably during each drum revolution by the train of pulses from the cell divider.

As previously described, the drum cell clock track, a reference track on the drum, produces a train of pulses at the rate of 1,000 per revolution of the drum, that is, one every 16.6 microseconds. Such 1,000 pulses are supplied to a divider circuit, identified in the block labelled "cell divider" in the block diagram of FIG. 10, which supplies a positive output pulse to the drum cell register for alternate recorded signals on the drum cell clock track, that is, a total of 500 positive pulses per drum revolution—one every 33.3 microseconds.

Further in keeping with this invention, defect signals are recorded in different halves of a drum cell according to the severity of the defect. In the present case the forward halves of the drum cells are reserved for "mirror" grade defects while the rearward halves of the drum cells are reserved for "glazing" grade defects. The pulses supplied from the cell divider to the drum cell register, and shown in FIG. 12, line 2, represent the forward half of each drum cell which is that half of a drum cell in which a mirror grade defect will be recorded. A second output of the cell divider, as shown in FIG. 12, line 3, provides a complementary pulse at the same rate. This complementary pulse represents the rearward half of a drum cell which is reserved for recording a glazing or "total" defect.

A drum cell register is illustrated in FIGS. 15 and 16. This register includes a chain of nine flip-flop stages, each such flip-flop comprising, for example, a bi-stable multivibrator with a complementing input which allows each flip-flop to act as a single stage binary counter. The drum cell register thus includes nine stages representing successive places of the drum cell binary Z number as successive powers of 2. Nine flip-flop stages provide a means of counting, in binary, up to 512 drum cells (2 to the 7th power), i.e., more than 500 cells maximum per drum revolution. Referring to FIG. 13, line 4 represents diagrammatically the changes of state of output terminal O of the first stage, and line 5 represents changes of state of terminal 1 of that stage, which, in both cases, is one pulse every 66.6 microseconds. The voltage pulses on terminal O are transferred to the input terminal of the succeeding register stage. The changes of state of terminals O and 1 of the second stage are represented on lines 6 and 7 by one pulse every 133.3 microseconds, and so on for the succeeding stages.

Means are provided, connected to each register stage, to reset the same to the zero reference state once each drum revolution coincident with the arrival of the leading edge signal at the row of recording heads. The drum cell register flip-flops are reset once each revolution of the drum by a signal representing the leading edge of the glass ribbon in the form of a pulse from the read head 50 adjacent the leading edge clock track which is conveyed to the reset terminals R of all register flip-flops. It will be noted that this leading edge signal on the drum representing the glass ribbon leading edge is shifted as each new Z cut is made. A more detailed description of the leading edge track is found later in Section II-A-6.

*Cell divider.*—The cell divider function may be served by various known circuits. By way of example, reference is made to FIG. 15, which illustrates a cell divider circuit including a flip-flop device, such as a bi-stable multivibrator with a complementing input. Thus the input to the cell divider flip-flop is derived from the signals on the drum cell clock track which produces a train of pulses, via the read-out head 50, at the frequency of 1,000 per drum revolution, or spaced about 16.66 microseconds, the duration of each drum cell half. Referring to FIG. 12, a cell is represented by a pulse (coinciding with every second 1,000 bit clock pulse) appearing at the output terminal O of the cell divider flip-flop. Such pulse appears as a positive voltage at the O output terminal which is transferred to the input terminal of the drum cell register. The second, and every other input pulse changes the cell divider flip-flop to its other state. In the said other state of the divider flip-flop, the other output terminal 1 is driven positive and the voltage is removed from output terminal O.

In order to record defect signals in the front or rear half (according to severity grade) of the drum cell corresponding to the glass mosaic in which the defect appears, means are provided for this purpose including the severity grade gates located in the block so labelled in FIG. 10. In carrying out their function, the severity grade gates, as shown in FIG. 15, include a pair of AND gates 56, 58 supplied respectively with signals representing the distinct cell halves over separate conductors connected to terminals O and 1 of the cell divider. A voltage on conductor 60, for example, activates the severity grade AND gates 58 during the interval that the forward part of each drum cell appears under the recording heads so that "mirror" defects may be printed, while a voltage on conductor 62 activates the severity grade AND gate 58 during the complementary rearward half of each drum cell period. The operation of these AND gates 56, 58 will be described more in detail in subsequent sections.

In order to discriminate as to grade between defect signals read out of the same cell (i.e., whether such recorded signals lie in the forward or rearward part of the drum cell) such signals are passed through a read gating circuit located in the block labelled "Read Gates" in FIG. 21. The cell divider outputs from terminals O and 1 activate these read gate circuits, as will be described in detail later.

Other components receive signals from one or both of the cell divider output terminals, as will also be described.

4. GLASS MOSAIC REGISTER

Also included, according to this invention, in the means for locating drum cells corresponding to glass mosaics in glass on the conveyor line, is a glass mosaic register (FIG. 10) for each inpection line. Each such register provides a means for continuously registering the procession of mosaics of glass passing an inspection line, and its state serves as a representation of the particular rank of mosaics at that inspection line at any given time, in terms of the Z number of the mosaic rank upstream from the leading edge of the glass ribbon. With a continuous ribbon of glass on the conveyor lie, all glass mosaic registers are reset at each cutting command issued by the computer so as to identify the particular rank of mosaics at the inspection station with respect to the new leading edge formed by the Z cutter in response to such cutting command.

*Lines 1 or 4 register.*—In achieving this function, referring to FIGS. 10, 14 and 15, one register is provided for registering in binary the glass mosaic procession along the conveyor past either inspection line L1, an automatic inspection line, or inspection line L4—the line having photosensitive elements responsive to manual inspection marks on the glass—depending on the type of inspection being used reflected by the position of the manual-automatic (MA) switches. In the present case a number of MA switches are shown in the drawings, and it will be understood that the defect storage unit may be set to accommodate one or the other types of defect signals by setting the switches on one position or the other. Suitable means will be provided, which is not shown, for operating all such switches simultaneously.

For operating this glass mosaic register, a glass clock 63, operated by the glass ribbon, provides a signal synchronized with the glass movement, in the form of a train of pulses at the rate of about one every half-second, to the input terminal of the register. Each pulse represents the movement of two inches of glass: that is, the width of a glass mosaic.

With the defect storage unit in operation to record for continuous ribbon production, reset means are provided, shown in FIG. 15, to reset the register as each Z cut command decision is issued by the computer and a new leading edge is produced at the Z cutter. Such register is reset by this means to a fixed value constituting the distance in terms of two-inch mosaics from the Z cutter to the inspection line L1 or L4, depending on whether the unit is set for automatic or manual inspection. Subsequent pulses received by the register and representing two inches of glass movement, raise the value stored in the register above the reset value, thereby providing a representation of the movement of the glass from upstream of the inspection lines into the inspection area.

This glass mosaic register is similar to the drum cell register and includes a chain of nine flip-flops, each flip-flop comprising such as a bi-stable multi-vibrator with complementing input, thereby to operate as a single stage binary counter. Each flip-flop includes a pair of output terminals, O, 1, the voltages on which are complementing. To reset the register, each time a new Z cut is made a voltage is supplied to the reset terminals R of each register flip-flop such that the register is reset (in binary) to the Z distance between the Z cutter and inspection line L1 or L4. Since inspection line L1 is a different distance upstream from the Z cutter than inspection line L4, the reset value is different for each type of operation—manual or automatic. In the apparatus arrangement illustrated in FIG. 9, the distance to line L1 (automatic) is 430 inches or 215 mosaics, while the distance to line L4 (manual) is 268 inches or 134 mosaics. Following is the corresponding binary members:

| Production | Reset | |
|---|---|---|
| | Decimal | Binary |
| Continuous manual | 134 | 010000110 |
| Continuous automatic | 215 | 011010111 |

Still referring to FIG. 15, the resetting circuit shown in the lower left portion includes provision so that the register is reset at a time that will not interfere wtih printing of defect signals. In accordance herewith, the register is reset coincident with a signal from the leading edge reference track on the drum. Accordingly, at the time of operation of the Z cutter a pulse is transmitted from the computer to the defect storage unit, which pulse is received at the C terminal of the PC switch 64 and conveyed through a pulse amplifier 66 to trigger a one-shot multi-vibrator 68. The output terminal of this multi-vibrator remains energized for 20 milliseconds, which is longer than the 16.6 milliseconds required for the drum to make one revolution. The 20 millisecond output pulse from the multi-vibrator 68 is combined in an AND gate 70 with a pulse representing the leading edge pulse on the drum synchronized with a glass mosaic pulse from the glass mosaic clock 63. The latter synchronized pulse over conductor 72, which is produced by a gate circuit described hereinafter in section entitled Glass Clock Gate, is supplied to the reset circuit so that the reset of the register flip-flops is in synchronism with one of the train of glass mosaic pulses supplied to the register.

The output from the reset circuit AND gate 70 shifts the flip-flop device 74 from its reference state, and this flip-flop, until reset, blocks further pulses. This flip-flop is reset directly from the computer by a voltage to its reset terminal R upon the 26th step of the computer cycle. In such state the output conductor from the flip-flop conducts a voltage to the OR gate 76 which is included to receive pulses from the manual reset button to initially set the glass mosaic register. The output voltage of the OR gate is amplified and inverted and applied to the reset terminals of each flip-flop device of the glass mosaic register according to the reference state desired, as given in the above chart. With the system in continuous manual operation, for example, such reset pulse is used to set the flip-flop for the second, third, and eighth binary places to "one" and the other flip-flops to "0," as shown on the chart.

*Lines 2 and 3 registers.*—To reduce the complexity of the diagrammatic FIG. 10, the system illustrated in this figure only includes the single glass mosaic register for inspection lines L1 or L4. It will be understood, however, that in order to record defect signals derived from the apparatus on inspection lines L2 and L3, a similar arrangement of components is required for each inspection line. In the present case, referring to FIG. 14, separate glass mosaic registers, in form similar to the register shown in detail in FIG. 15, are provided for each of lines L2 and L3 for registering (in binary) the passage of glass mosaics past these glass inspection lines, respectively. Some apparatus efficiencies may be effected by utilizing the same components, where possible, so that components are not unnecessarily duplicated.

It will be understood that the reset binary value for each register is different since lines L2 and L3 are at different distances from the Z cutter. The reference binary values are as follows:

| Inspection line | Decimal | Binary |
| --- | --- | --- |
| 2 | 410 | 110011010 |
| 3 | 165 | 010100101 |

Since all inspection lines are at two inch intervals, when in continuous ribbon operation the registers for all lines L1 and L4 are driven by pulses from the same glass clock 63 and gate circuit shown in FIG. 15 connected to the register for lines L1 or L4. Similarly, the registers for lines L2 and L3 are reset by the same pulse from the reset circuit that is used to reset the register for line L1 or L4. Reference may be made to the preceding description of the reset circuit and the following description of the gate circuit for details of such circuits and their operation. It will be understood that from the standpoint of the logic involved, it is contemplated to provide a separate register arrangement for each of the inspection lines, which register is supplied with pulses from the glass clock and is reset as each Z cut command is issued by the computer to the fixed value representing the distance of the particular inspection line from the leading edge of the glass.

*Glass clock gate.*—Because of the completely asynchronous character of this system, pulses produced by the glass clock 63 at a rate representing a two-inch movement of the glass on the line, normally do not coincide precisely with any particular position of the drum or phase of the drum rotation. This becomes significant in connection with the means used herein for locating drum cells for writing purposes by means of register comparison, to be described in following Section 5. Since the glass mosaic register input (lines L1 or L4) is a train of pulses produced by the glass clock 63 at the rate of about one each one-half second, this register changes state once for every thirty revolutions of the drum. During a single drum revolution, the drum cell register changes state at the faster rate of 500 times per cycle after which this latter register is reset to its zero reference state by a pulse produced by the leading edge signal on the drum clock track. In order to synchronize the drum cell register and the glass moisaic register so as to avoid missing or misplacing defect pulses occurring in the periods when these registers are changing state, the change of state of the glass mosaic registers is made to coincide with the reset of the drum cell register to its reference state. This may be achieved by means of the circuit which is supplied with a glass mosaic clock pulse, and combines the same with a pulse coinciding with the leading edge pulse from the leading edge track on the drum to produce an output pulse coinciding in time with the latter. A suitable circuit for this purpose is shown in FIG. 15, supplying the glass mosaic register for line L1 or L4. It will be understood that the same circuit may be also used to operate the glass mosaic registers for all inspection lines L2 to L4, since all inspection lines are spaced at exactly two-inch multiples and one mosaic clock 63, therefore, may provide the input to all glass mosaic registers. Still referring to FIG. 15, the circuit at the lower left portion is seen to be supplied by pulses from the glass mosaic clock 63 and includes a pulse amplifier 78, which receives the glass clock pulses at the rate of about one every one-half second and triggers a one-shot multi-vibrator 80 connected to its output to produce a 20 microsecond output pulse. As shown in line 8 of FIG. 17, the 20 microsecond pulse is combined with a pulse produced by the leading edge signal on the leading edge drum clock track, by means herein shown as a logical AND gate 82 to produce an output pulse. This latter output pulse is supplied to the input flip-flop of the register and, since it is timed to coincide with the leading edge pulse, shifts the state of the glass mosaic register at a time coinciding with the resetting of the drum cell register.

5. REGISTERS COMPARER

Further included, in carrying out this invention, in the means for locating drum cells corresponding to glass mosaics of glass on the conveyor line, is means for comparing the states of the drum cell register and the glass mosaic registers. Such means in the present case is shown as a comparer circuit located in the block labelled "Registers Comparer" in the diagram of FIG. 10, which matches the state of the drum cell register with the state of the glass mosaic register for lines L1 or L4, and produces an output pulse when the states are the same to locate a rank of drum cells for recording defects detected by the apparatus on lines L1 or L4 in the corresponding rank of glass mosaics. Since the state of the drum cell register matches the state of the glass mosaic register once each drum revolution for a particular rank of mosaics, such output signal from the comparer occurs once each drum revolution and represents the rank of drum cells each revolution which are located the same Z distance from the leading edge signal on the drum as the rank of glass mosaics in the inspection area from the leading edge of the glass ribbon. Referring to FIG. 12, there is graphically depicted in this figure the 16.6 microsecond rate signals on the drum cell clock or timing track, the 33.3 microsecond rate train of pulses produced by the cell divider, and the total number of drum revolutions (30), per two-inch glass mosaic. This figure graphically portrays that the drum revolves about thirty times during the period a two-inch glass mosaic passes the inspection area at a glass ribbon lineal speed of about 200 inches per minute. A glazing defect appearing in a two-inch mosaic, as shown at the left of this figure, if present for recording purposes for better than fifty percent of the time that a glass mosaic is at the inspection station, may be recorded on the drum during any of the revolutions 7 to 27. This figure also graphically portrays that the 1 to 62 recording tracks on the drum are divided into drum cells for timing purposes, and each drum cell is further divided into halves so that glazing grade defects, shown on the left-hand side of FIG. 12, may be recorded during the second portion of each cell, while the first portion of the cell is reserved for storage of mirror grade defects.

A suitable means for comparing the states of the drum cell and glass mosaic registers is shown in FIG. 15. In achieving this end, each flip-flop stage of the drum cell register is compared with the corresponding flip-flop stage of the glass mosaic register by means of a pair of logical AND gates 84, 84′ in the first comparer stage. Since each register flip-flop includes a pair of output terminals O, 1, a pair of AND gates is associated with each register flip-flop involving a chain of eighteen (2 x 9) AND gates in this first comparer stage. When both AND gates 84 connected between one stage of the drum cell register and the same stage of the glass mosaic register, are conducting, both stages are in the same state. Thus, the outputs of both AND gates associated with each register stage are connected through an OR gate 86, and all OR gates are connected to a multileg output AND gate 88. When all stages of the drum cell register, which is changing state at the fast rate of 500 per drum revolution, match the states of the glass mosaic register stages, all of such inputs to the multileg output AND gate will be conducting.

In carrying out the foregoing, the O output terminal at the first flip-flop stage in the drum cell register is connected through a bus bar to AND gate 84 together with the O output terminal of the first flip-flop stage in the glass mosaic register; the 1 output terminals of the first stages of the registers are similarly connected through bus bars to AND gate 84'; the O output terminals of the second stages of the registers are similarly connected through bus bars to AND gate 84''; and the 1 output terminals (second stage) through bus bars to AND gate 84''', and so on for higher numbered stages.

It has been found that with relatively slow responding flip-flop stages, a transient condition is encountered in the operation of the drum cell register when the latter is reset each drum revolution to its reference state. A small amount of time is required to change the state of a flip-flop device, in the present case approximately 3 microseconds. The maximum time required to insure that all nine flip-flop stages of this register are in the stable state is 2.7 microseconds (9 x .3=2.7). It has been found that such transient effects may be ignored with the provision of delay means for delaying the production of an output pulse from the comparer output gate 88 until after the period in which transients could occur.

Means, therefore, is provided in connection with the multileg output AND gate 88 of this comparer for producing a pair of output pulses from the comparer gate during the period (33.3 microseconds) that the states of the registers remain in coincidence during each drum revolution. These comparer output pulses are approximately centered in the respective 16.6 microsecond halves of the coincidence period. This will be made clearer by referring to FIG. 19 which illustrates the output pulses from the comparer multileg output gate 88 as 2.5 microsecond pulses delayed 7 microseconds from the beginning of each half of the coincidence period. The 7 microsecond delay covers the 2.7 microsecond transient period of the drum cell register. A second pulse is produced, delayed 7 microseconds from the beginning of the second cell half, so that the pulses appear approximately centered in the forward cell half and in the rearward cell half, respectively. In this manner, one registers comparer output pulse is approximately centered in the forward allotted space for writing a mirror defect, while the second output pulse is approximately centered in the rearward allotted space for writing a glazing defect.

To carry out the foregoing, a pair of pulses is provided to the tenth leg of the comparer multileg AND gate 88. This pair of pulses is supplied for each drum cell by connecting a one-shot multi-vibrator 96 to receive a train of pulses at the 16.6 microsecond rate from the read head 50 over the drum cell clock track. The one-shot multi-vibrator 96 produces an output pulse delayed 7 microseconds from the input pulse, and a pulse amplifier 98 connected to the multi-vibrator output amplifies, shapes and smooths the pulse to 2.5 microseconds.

6. LEADING EDGE TRACK CONTROL

Referring to FIGS. 9 and 11, and also to FIG. 20, in addition to the 62 defect recording tracks, and the reference pre-recorded drum cell clock and drum quadrant tracks, the drum also has a leading recording track on which a signal is recorded when the unit is operated to record defects in continuous glass production to locate a point on the drum representing the leading edge of the record and corresponding to a leading edge of the glass ribbon. Using the leading edge signal for a reference, as shown in FIG. 9 which shows a development of the drum surface, all drum cells are dimensionally located in the Z direction with respect to this reference by means of the drum cell register. In carrying out this feature, the drum cell register is reset each drum revolution to a reference state by a pulse produced by a signal on the leading edge recording track via the read head 99. The subsequent changes of state of the register thus identify successive cells for glass mosaic defect storage. The process is made continuous by erasing and re-recording at its new location the leading edge signal on the leading edge track as each cutting decision is made by the computer. The sequence of states of the drum cell register thus identifies the successive cells passing the row of write heads each drum revolution, in order to allow the recording of defect information in a recording track properly located in a cell numbered from the glass leading edge corresponding to the Z number of the glass mosaic containing a defect.

As defect information is read-out and cutting commands are issued, the portions of the drum surface containing such read-out data are erased. With glass ribbon production the entire program of trial Z lengths are considered with respect to each new leading edge. There is no requirement for data downstream of the new leading edge; however, as will be described, the recording tracks are erased just previous to entering the recording area. Furthermore, with the present arrangement a continuous record is kept on the leading edge drum track of the position of each new leading edge as it is cut by the Z cutter.

*Initial erasing and recording leading edge signal.—* Before recording defects, the defect storage unit is set for operation by means of reset circuits all responsive to the pressing manually of a reset or start button. For convenience, reset circuits and individual reset buttons therefor are shown throughout the drawings, although it will be understood that such circuits are connected for operation by a single reset device. Thus, as shown in FIG. 20, reset means are provided whereby the leading edge track is erased and a leading edge signal recorded on this track. This leading edge signal identifies the "zero" drum cell and the glass defects record is recorded starting at that point and progressing continuously around the drum. The initial leading edge signal erasing and recording operation is responsive to the pressing manually of a reset or start button. By pressing this button 102 shown in FIG. 20, a manual reset pulse is supplied to the one-shot multi-vibrator 104. The output of this one-shot multi-vibrator 104 is a 30 millisecond pulse which is transferred to an erase amplifier 106 for activating an erase head adjacent the leading edge track of the drum. The erase head which, for convenience, is shown combined with the write head 50, is activated by the 30 millisecond pulse for more than a complete revolution. In this manner the leading edge track is completely erased. For convenience, this same 30 millisecond pulse may be used to erase all sixty-two recording tracks to prepare the drum for receiving data. A connection from the multi-vibrator 104 may be used for this purpose.

After the leading edge track is erased a signal representing the glass leading edge is recorded on the track. So that the leading edge signal is recorded totally within the limited length of the drum cell which corresponds to the zero mosaic, means are provided for synchronizing the leading edge reset pulse with the drum rotation. In this case a 30 millisecond pulse emitted by a one-shot multi-vibrator 107 is transferred to a pulse amplifier 108 through an inlet conductor so that the trailing edge of this pulse, which is at the end of the erase period, triggers the pulse amplifier to produce a 2.5 microsecond pulse. This latter pulse, after delay for synchronizing purposes, is transferred through the pulse amplifier 109 as a leading edge recording signal. This delay is introduced so that the recording signal occurs in the time allotted for writing in the drum cell which happens to coincide with the reset pulse. In the present case, this is achieved by combining the reset pulse with pulses in the form of pairs of pulses in the cell halves of a single drum cell, which are conveniently produced by the registers comparer shown in FIG. 15. Accordingly, the circuit of this comparer is connected through a conductor 110 to an AND gate 111 incorporated to combine this reset pulse and the train of pulses from the comparer. In this case, the leading edge signal is recorded in the forward, rather than the rearward, half of the corresponding drum cell. Accordingly, a signal representing the forward or mirror half of the drum cell is also supplied to this AND gate 111. A source of such signals is suitably the mirror output terminal of the cell divider, also shown in FIG. 15, which is connected to this AND gate 111 through a conductor 112.

The output of the AND gate 111 produced in response to the reset pulse is a print signal in the forward half of the following drum cell. This AND gate output pulse is supplied to the pulse amplifier 109 which produces a delayed 2.5 microsecond pulse which is fed back to the flip-flop 116 in the previous stage of the leading edge control, thus preventing the passage of a second spurious pulse. The 2.5 microsecond write pulse is supplied to the leading edge signal write amplifier and head 50.

Since the drum cell register shown in FIG. 20 must be reset to its initial state to prepare the system for receiving a glass ribbon, provision is made in the leading edge control for transferring the 2.5 microsecond write pulse produced by the second stage of this control directly to the drum cell register. The connections are through a pulse amplifier 118 and inverter amplifier 120 which provide a pulse suitable for resetting the register. Referring again to FIG. 20, the read head 50 produces a reset pulse each subsequent revolution of the drum to reset the drum cell register to its initial zero state.

*Operational erasing and recording leading edge signal.*—Once the recording procedure begins with the recording of defects on the drum Z by Z relative to the leading edge signal, a record is available of glass defects for interrogation by the computer. After a Z cut decision is made, producing a new leading edge, the leading edge signal on the drum track is erased and re-recorded spaced from the original position the Z cut distance. Means for this purpose, referring to FIG. 20, operates responsive to the Z cut decision by the computer.

According to the present invention, the computer supplies the defect storage unit with a binary representation of the Z length constituting the cutting decision, which is compared to the states of the drum cell register in a leading edge comparer, to produce an output signal which causes a new leading edge to be recorded on the leading edge track spaced the Z cut distance from the original signal. The leading edge track is then erased, responsive to this new leading edge recording signal, for the full 360° of track stopping about five drum cells short of the new leading edge signal to avoid erasing the latter. This is depicted in FIG. 21.

In the present case (FIG. 20) the Z decision is represented in binary by voltages on pairs of conductors 126 to 138 energized by computer relays 139. Each conductor of a pair are complementing and carry zero voltage or a positive voltage representing the binary digts "zero" and "one" of one place of the Z cut decision binary number. Since the maximum Z length that might be programmed with the present system is 110 mosaics, the full length of a glass sheet, the maximum number of pairs of conductors required to represent such decimal number 110 is seven, to provide a seven place binary number.

Seven pairs of conductors 126 to 138, therefore, convey the Z decision in binary to the leading edge comparer circuit. The other input to this leading edge comparer circuit is from the first seven flip-flop stages of the drum cell register, excluding the final two flip-flop stages representing the least significant places of the drum cell binary number. This leading edge comparer circuit includes, in this case, seven pair of AND gates 140, one pair for each binary place. Each pair of AND gates 140 combines the output signal from one flip-flop stage of the drum cell register with the signals over the corresponding pair of Z decision conductors. The outputs of both AND gates 140 of each pair are connected together and through an OR gate 142 to a multileg AND gate 144 which combines the outputs of all seven pair of gates. With the present form of AND gates, a voltage is transferred to the output terminal of a gate only when positive voltages are presented at both input terminals of the gate. With the inputs to gates 140 of every pair being complementary, a voltage at the output of only one gate of a pair represents that the inputs are in the same states. A voltage, therefore, on all the input legs of the multileg AND gate 144 represents that the states are the same for all the Z decision conductor pairs and the drum cell register.

The Z decision signal over the conductor pairs 126 to 138 is maintained until the Z cutter operates and for present purposes is a continuous voltage. According to the present arrangement, a further input to the multileg gate 144 is in the form of spaced pulses in the forward and rearward halves of a single drum cell. Such is conveniently provided, referring to FIG. 15, from the output of the pulse amplifier 98 by means shown as a conductor 145 for connection to the circuit in FIG. 20. Thus the output of the multileg gate 144, representing when the input legs are all conducting and the same states of the drum cell register and the Z decision binary representation, is in the form of a pair of spaced pulses, one located in the forward and one located in the rearward half of a drum cell. The pair of pulses are located at the Z decision relative to the leading edge, and the output of the multileg gate is used for erasing the leading edge signal and re-recording the same at a new location.

In order to employ the output of the multileg gate 144 to shift the leading edge signal on the leading edge track, the spaced pulses produced by the leading edge comparer circuit each drum revolution are supplied therefrom to the input gate 150 of a leading edge control circuit, shown in FIG. 20. This circuit operates the write amplifier to print the new leading edge signal and starts the erasing operation just following the printing operation. This circuit stops the erasing operation after 495 drum cells have revolved past the erasing head. Thus, when the Z cutter begins operation a 20 millisecond pulse is transmitted from the computer over conductor 151 to another leg of this input gate 150 of the leading edge control circuit. The third leg of this input gate has a positive voltage appled from the output terminal of a flip-flop device 152 when the latter is in its initial state. Since the 20 millisecond pulse from the computer is present for longer than one drum revolution (16.6 milliseconds), when the spaced pulses are received from the leading edge comparer output gate 144 while the second input leg is energized by the 20 millisecond pulse, and the third leg is energized from the flip-flop 152, a pulse is transferred to a one-shot multi-vibrator 154, which latter pulse coincides with the first of the pair of pulses received from the leading edge comparer gate 144. The one-shot multi-vibrator 154 is arranged to produce a delayed positive signal which is transferred to the reset terminal R of the flip-flop device 152 which changes the state of this flip-flop, thereby removing the positive voltage from the third leg of the input gate 152 and blocking the recurrence of a pulse responsive to the following Z decision pulses upon the next drum revolution. This flip-flop device 152 is held in this other state until the end of the computer cycle, at which time the flip-flop device 152 is reset by a pulse over conductor 156 from the computer trial stepper on its twenty-sixth step.

The positive pulse from the one-shot multi-vibrator 154 is also employed to change the state of a second flip-flop device 158 so as to produce a positive voltage at its output terminal 1. This voltage is directed to the leading edge erase amplifier through a coupling circuit shown in FIG. 20 to start the erasing of the leading edge track about five mosaics after the relative position of the new leading edge placement. The erasing operation is stopped by resetting the flip-flop 158 by means of the AND gate 160. The latter gate is conducting when the drum cell register is in the state representing the 495th drum cell—binary 111101111, having been reset when the new leading edge signal was printed. For this purpose, the flip-flop stages of the drum cell register are wired to the inputs of the AND gate 160 such that all inputs are energized with the drum cell register in the state representing the 495th drum cell. The other input to the AND gate 160 is a suitable source of signal pulses in the form of delayed pulses in the center of each drum cell half from the output of the pulse amplifier 98 over conductor 145 (FIG. 15).

7. DEFECT DATA INPUT

As previously noted, the write gates, shown in the blocks labelled "Severity Grade Gates" and "Write Head Gates" in FIG. 9, receive input signals from two sources. One source of input signals is the registers comparers in the form of a pair of pulses once each drum revolution (line 1, FIG. 19) which represent the allotted times for printing in the drum cells corresponding to the glass mosaics at the inspection line. As shown in FIG. 16, the other source of input signals to the write gates is the inspection apparatus at the glass line, in the form of defect signals. In the present case the defect storage unit may be set, by means of the MA switches, to record defect signals from the direct "Automatic" inspection apparatus of lines L1 to L3 or to record defect signals from the apparatus which picks up defect crayon marks on inspection line L4.

The process of combining signals in the write gates is less complex when the source of defect signals is the so-called "Manual" inspection apparatus which uses the photosensitive elements of line L4 to locate defect marks manually placed on the glass by skilled inspectors. In "Manual" inspection, defect signals are produced responsive to defect marks on the glass by photosensitive defect detection elements 161 located at line L4 on a bridge spanning the conveyor. A set of sixty-two photosensitive elements are mounted on the bridge; each photosensitive element is aligned with the file of glass mosaics at the S dimension corresponding to the S number of the element and is effective to detect a mark within that file of mosaics. Still referring to FIG. 16, defect signals are supplied to the defect storage unit from each photosensitive element via a pair of conductors 162M, 162G and, in this arrangement, a voltage on one conductor indicates the presence of a mirror grade defect while a voltage on the other conductor indicates the presence of a glazing or total grade defect. Thus a pair of lines 162M, 162G lead from each photosensitive element 161 to a write head gate for the recording head over the recording track on the drum having the same S number as the defect detection element on the bridge over the conveyor line. The function of each write head gate, to be described in the following Section 8, is to pass such defect signals through from the inspection apparatus conductors to the same numbered recording head at a time that will record such signals in a drum cell located at the same mosaic in the Z direction with respect to the leading edge on the drum as the glass mosaic in which the defect appears.

A more complex situation is involved where "automatic" inspection is involved. In such case where lines L1 to L3 are in operation, timing considerations become more involved since each inspection line is located at a different lengthwise or Z dimension (FIG. 9) with respect to the Z cutting apparatus from every other inspection line. Thus defect signals produced at the same instant by apparatus on different lines indicate defects at different mosaics in the Z direction. One solution to the problem of reconciling these dimensional aspects is to provide a separate glass mosaic register, and registers comparer for each inspection line as shown diagrammatically in FIG. 14. This is the arrangement employed in the instant case although modifications may be adapted without departing from the present invention. It will be understood that the logic of the overall system is unchanged by adding additional inspection lines although certain components may become more complex.

Where the plurality of automatic inspection lines L1 to L3 are used, the defect data is transmitted from the inspection station to the gates in the form of voltages on conductors. For example, referring to FIGS. 9, 14 and 16, line L3 may include a row of fixed CD inspection elements 165, such elements being mounted on a bridge over the glass conveyor in a similar fashion to the manual-semiautomatic inspection elements on line L4. A single row of such devices is shown herein for simplicity, however, more than one row may be required to accommodate apparatus limitations. It will be understood that additional glass mosaic registers will be required for any additional rows of inspection elements. In the present case, referring to FIG. 16, a pair of conductors 164M, 164G from each CD inspection element leads to the write head gate for the same numbered recording head adjacent the drum surface. A voltage on one or both of said conductors indicates the detection of a defect in the unit square passing the detection element.

The automatic scanning devices to detect class A and B defects are, in the present case, located on lines L1 and L2. To satisfy the equipment limitations, such scanning devices individually cover a band of glass sixteen mosaics wide. The bridge carrying the A scanner heads moves at a speed such that each head covers the band of mosaics while the glass moves one mosaic in the Z direction. The B scanner bridge is synchronized with the A scanner bridge and the scanning pattern for the heads is shown on FIG. 18. Considering first the A scanners on line L1, as shown in FIGS. 16 and 18 a bridge position indicating conductor 166 leads from a commutating device 167 associated with each scanning ead A1 to A4 to each of the write head gates for the recording heads on the drum. Also, a pair of defect signal conductors 168M, 168G leads from every A scanner head to the sixteen write head gates for the S positions corresponding to the band of glass scanned by the respective head. The arrangement is such that defect indicating signals are conveyed to the write head gates over the defect signal conductors 168M, 168G. Moreover, a voltage representing the position of the A scanner head is transferred from one bridge position indicating conductor 166 to a second such conductor upon the movement of the scanning head from one mosaic to the next mosaic (S direction). For the latter purpose sets of sixteen bridge position conductors are connected to each commutating device 167. Thus when a defect signal is produced by one of the A scanner heads A1 to A4, such defect signal is conveyed to all sixteen write heads of the group connected to the respective A scanner head. The particular write head gate at the S position corresponding to the S position of the A scanner head at the time the defect signal is produced, is energized also by the voltage on the bridge position conductor 166 connected thereto—thereby causing the defect signal to be printed in the correct S track. In this case, the A1 scanner head is connected by defect signal conveying conductors 168M, 168G to write head gates numbered "one" to "sixteen"; the A2 scanner head is connected by conductors 170M, 170G to gates #17 to #32; the A3 scanner head is similarly connected by a pair of defect signal conductors to gates #33 to #48; and the A4 scanner head is similarly connected by conductor pairs to gates #49 to #62. Sixteen bridge position conductors are provided for each commutating device 167, one each for the sixteen glass mosaics of the band covered by an A head, and connected to the sixteen write head gates, respectively.

Now referring to the B scanner arrangement on line L2, for convenience the bridge on line L2 is shown synchronized with the bridge on line L1 so that the same bridge position conductors 166 may be used. The arrangement in other respects is similar, also; two defect conductors 172M, 172G connect the B1 scanner head to write head gates numbered "one" to "sixteen"; the B2, B3 and B4 scanner heads are connected by defect signal conductors to groups of sixteen write head gates. A voltage on one conductor 170M indicates a mirror grade defect and the voltage on the other conductor 170G indicates the presence of the more severe glazing or "total" grade defect. Details of the operation of the write head gates will be found in the following section.

8. WRITE GATES

Referring again to FIG. 9, which shows the drum surface in developed form, each drum recording track which is made by one of the sixty-two recording heads provides a record of defective mosaics starting with the leading edge in the same S numbered file of glass mosaics. In the present case, as described in the previous sections in connection with FIGS. 9, 16 and 18, defect information is produced by inspection elements mounted on transverse inspection lines so that elements are mounted to scan each S strip the full width of the glass. With this arrangement defective glass mosaics are located in the S direction according to the S dimension of the element of the inspection apparatus detecting the defect. Defect signals are supplied to each such recording head over separate conductors from all defect detection elements at the same S dimension as the recording head. On line L4, for example, there is provided a fixed set of sixty-two photosensitive elements 161, one such element over each mosaic across the glass. A similar arrangement of CD defect detectors 165 is mounted on line L3. In the case of these fixed elements on lines L3 and L4, defect signals are conveyed by conductor pairs from each element to each write head gate.

On lines L1 and L2 are found A and B scanner heads, which are mounted on reciprocating bridges so that each head covers a band of glass sixteen mosaics wide. In this case defect signals are conveyed by conductor pairs connected to each scanner head and groups of sixteen write head gates, as shown in FIG. 18. Means are provided, herein shown in FIG. 18, as bridge position conductors 166 and commutating devices 167 for continuously supplying signals representing the S dimension of the A and B scanner heads during each part of the scanning pattern to the defect storage unit. The bridge position conductors locate the S of defects detected by each scanner head at any point in the scanning pattern and direct the same to the recording head at the corresponding S location.

While the foregoing arrangement serves to locate defects in the S direction for recording purposes, defects are located in the Z direction as a function of the time defect signals are produced by the inspection elements on the lines and the speed of the glass. This is achieved by gating means combining defect signals received from the inspection apparatus on the plurality of inspection lines L1 to L4, and timing the passage of such defect signals to the recording heads so that such signals are recorded in the drum cells corresponding to the defective glass mosaics.

In achieving this result, referring to FIGS. 10, 15 and 16, the gating means includes first and second groups of gates. By means including the first group of gates, shown in FIG. 15, defect signals are recorded in the forward or rearward halves of the drum cells according to the severity grade of the defects, hence this group of gates are herein described as "Severity Grade Gates." The second group of gates, shown in FIG. 16, combines defect signals from all inspection lines and includes a gate circuit for each write head which is numbered to correspond, hereinafter termed the write head gate. Thus, an individual write head gate is provided for each of the sixty-two recording heads, the details of such gate for recording head number "one" being illustrated in FIG. 16. It will be understood the same circuit is used for the write head gate for every recording head. FIG. 16 depicts diagrammatically that each numbered write head gate is supplied with defect signals from different combinations of inspection lines, and, in the present case, each such gate includes means for accepting defect signals from the detection elements on all inspection lines which are over the same numbered A file of glass mosaics. Since the A1 and B1 scanner heads are connected to write head gates #1 to #16, as shown in FIG. 16 conductor pairs 168, 172 are connected from the A1 and B1 scanner heads to representative write head gates #1 and #16 of this group for write heads #1 and #16.

Turning first to the details of the severity grade gate, as shown in FIG. 15, the severity grade gates receive directly the output of the glass-drum registers comparer. This output, it will be recalled, is a pair of pulses each drum revolution together representing the drum cell rank which corresponds to the glass mosaic rank at one inspection line. By means of this pair of output pulses, the drum cell is located for printing a defect signal representing a defective mosaic. The severity grade gate of FIG. 10 is the gate associated with the unit components for inspection line L1 or L4 depending on whether the defect storage unit is set for use of the automatic (A) or manual (M) inspection apparatus. Since the apparatus receives data from lines L2 and L3 when set up for automatic inspection, a similar severity grade gate is provided, as shown diagrammatically in FIG. 14, for these other inspection lines L2 and L3. The function of a severity grade gate in each case is to receive the output of the comparer from the multileg output gate 88 of the latter, for the corresponding inspection line, shown in FIG. 19, line 1, as a pair of pulses occurring once each drum revolution, and to convert the same into a single pulse on each of separate lines 176M, 176G. Since the pair of pulses together represent the rank of drum cells corresponding to the rank of glass mosaics under the inspection line, the single pulses on separate conductors further represent the allotted times for printing mirror or glazing defects in such drum cells. Such separate conductors 176M, 176G are connected to the write head gates of FIG. 16 to convey the severity grade gate output thereto in the form of trains of pulses on each conductor.

In more detail, as shown in FIG. 15, each severity grade gate includes a pair of logical AND gates 56, 58 which receive the signal from the comparer multileg AND gate 88. One of these severity grade AND gates 58 combines this input pulse pair with a train of pulses (FIG. 12, line 2) from terminal 1 of the drum cell divider over conductor 60, representing the forward (mirror) halves of the drum cells. The output of this severity AND gate 58, therefore is a pulse each drum revolution representing the allotted time for writing a mirror defect in the drum cell corresponding to the rank of glass mosaics being inspected in line L1 or L4, and is shown in FIG. 19, line 2. The other severity grade AND gate 56, still referring to FIG. 15, combines the signal from the registers comparer multileg gate 88 with a train of pulses (FIG. 12, line 3) representing the rearward (glazing) halves of the drum cells, from the cell divider terminal O over conductor 62, and produces a pulse each drum revolution (line 3, FIG. 19) representing the allotted time for writing a glazing defect in the drum cells corresponding to the rank of glass mosaics being inspected at lines L1 or L4.

Accordingly, separate conductors 176M, 176G leading from the pair of severity grade AND gates 56, 58 to convey the output pulses after amplification by a pulse amplifier P to the write head gates shown in FIG. 16. FIG. 16 should be considered side-by-side with FIG. 15 to connect the conductors 176M, 176G leading to the right in FIG. 15 with the same numbered conductors leading in from the left on FIG. 16. The function of the write head gates, now referring to FIG. 16, is to combine the pulses over these separate conductors 176M, 176G from the severity grade gates with defect signals derived from the detection apparatus on the corresponding inspection line L1 or L4, and, further, to combine the pulses from the comparers for other inspection lines with the defect signals from the inspection apparatus of such other inspection lines so that a defect signal, no matter from what inspection line it is derived, is recorded in the drum cell corresponding to the Z by S location of the defective glass mosaic and positioned in the forward or rearward part of such cell according to severity grade. For this purpose an individual write head gate is provided for each of the sixty-two recording heads, the details of such gate for recording head number 1 being illustrated in FIG. 16. It will be noted that the write head gates are supplied with defect signals from different combinations of the inspection lines which is readily understandable since the four A and four B scanner heads on each of lines L1 and L2 scan different bands of glass mosaics and thus each scanner head will be connected to different sets of write head gates.

The simpler case is involved with manual inspection using the photosensitive devices of line L1 since defect signals from only this one line are involved and the photosensitive elements are fixed, not movable, as in the case of automatic inspection with the A and B scanners. By moving all the MA switches to the M position, the entire defect storage unit is set for manual operation which is the term used herein to describe manual glass inspection followed by defect mark detection by means of the photosensitive elements on line L4. Referring to FIG. 16, by moving the MA switch in the write head gate #1 to the M position, these write head gate components are connected in circuit to receive defect signals from the manual inspection line L4. Each write head gate includes a group of ten logical AND gates. Two of such AND gates, 1–9, 1–10, in the lower portion of the block labelled Write Head Gate #1 in FIG. 16, receive defect signals from the apparatus of inspection line L4 for combining the same suitably with drum cell locating signals to produce accurately timed write pulses which will be conveyed through the M terminal of the MA switch to the amplifier A for write head #1 to print defects on the drum surface recording track #1. The other eight AND gates 1–1 to 1–8, operate in conjunction with the inspection apparatus on line L1 to L3 capable of so-called "automatic" inspection. Defect pulses will be conveyed through the A terminal of the MA switch likewise to the amplifier A for write head #1 to print defects with the unit set for recording defect signals produced by "automatic" inspection.

It will be recalled that a pair of conductors 162M, 162G are connected to each photosensitive element 161 on the manual inspection line L4; a voltage pulse on one conductor 162M represents a mirror defect, while a voltage pulse on the other conductor 162G represents a glazing defect. In the present case such pair of conductors from S numbered "one" photosensitive element 161–1 lead to the write head gate #1 wherein they are connected to this pair of AND gates 1–9, 1–10. Thus one AND gate 1–9 of said pair of gates receives mirror defect signals from the photosensitive element 161–1 over the first file of glass mosaics (S direction) via conductor 162M, and the other AND gate 1–10 receives glazing (total) defect signals from the same photosensitive element via conductor 162G. As previously noted, each of such AND gates 1–9 and 1–10 are connected to receive pulses from the severity grade AND gates 56, 58 shown in FIG. 15 through conductors 176G and 176M, respectively. Since the severity grade gate functioned to separate the pair of pulses each drum revolution locating the drum cell to be printed, pulses on conductor 176M received by the write head gate are in the alloted time space in the drum cell for writing mirror defects, while the pulses on conductor 176G are in the allotted time space in the drum cell for writing glazing defects. By means of one AND gate 1–9, mirror defect signals from the photosensitive element 161–1 at the first unit mosaic of inspection line L4 are combined with suitably timed write signals so as to transmit an output pulse, when a mirror grade defect appears, to the first recording head and the defect is printed on the drum in the forward cell half. The other AND gate 1–10 similarly transmits a pulse to the same recording head when a glazing defect occurs and the defect is printed on the drum in the rearward cell half.

Now turning to the more complex case which involves automatic inspection: referring to FIGURES 16 and 18, in this case considering again the first mosaic in the S direction, the write head gate for recording head #1 as shown in FIG. 16, may receive defect signals to be recorded by this write head derived by (1) and A–1 scanner on line L1; (2) the B1 scanner on line L2; and (3) the first CD detection element on the bridge at line L3 over mosaic numbered "one" in the S direction. In this write head gate #1, means are provided for combining defect signals of types (1), (2) and (3) with drum cell locating signals from the system and with bridge position signals for lines L2 and L3 to activate the recording heads to print the defects accurately on the drum surface. This means is herein shown as the eight logical AND gates 1–1 to 1–8 of the gating group. Considering a write head gate for any numbered write head, a pair of such gates, 1–1, 1–2 is associated with the A scanner apparatus, and a pair, 1–7, 1–8 is associated with the CD defect detection apparatus, while the other four of such gates 1–3 to 1–6 are used by the B scanner inspection apparatus.

As described in the previous section hereof, separate conductors are used to convey defect signals of different severity grade from the defect detection elements. Thus the separate AND gates, 1–1, 1–2 of this group, are provided to receive signals of mirror and glazing severity grade, respectively, from the A1 scanner apparatus by means of conductors 168M and 168G connected to the A1 scanner on the bridge at line L1. The defect signals from the A scanners, referring to FIG. 18, are in the form of 20 millisecond pulses representing the level change into an area considered defective. In this case, a mirror defect pulse over conductor 168M is combined in the AND gate 1–1 with a train of pulses from the severity grade gate of FIG. 15 over conductor 176M representing the allotted time each drum revolution for writing in the mirror half of the drum cell corresponding to the mosaic in the inspection area at the first S position beneath the inspection line L1.

In a similar manner a glazing defect pulse over conductor 168G (FIG. 16) is combined in the AND gate 1–2 with a train of pulses over conductor 176G representing the allotted time each drum revolution for writing in the glazing half of the drum cell. Either of such AND gates 1–1 or 1–2 will be effective to transmit a defect write pulse to the write amplifier associated with the recording head #1 when the third legs of such AND gates are also energized. It is to be noted that the 168M and 168G conductors from the A1 scanner are connected to the AND gates 1–1 and 1–2 of each of the first sixteen write head gates since the A1 scanner head reciprocates across a band of glass sixteen mosaics wide. Thus the A2 scanner which covers the band of glass mosaics from S–17 to S–32 is connected to the AND gates 1–1 and 1–2 of write head gates for heads numbered 17 to 32 (FIG. 18). The A3 and A4 scanners on line L1 are connected to the AND gates 1–1 and 1–2 of write gates for heads numbered 33 to 48 and 49 to 62, respectively.

Provision is also made, therefore, for representing the shift of each A scanner head from mosaic to mosaic in the S direction and for activating the write head gates in succession accordingly. In the present case, this is achieved by means of the commutating devices 167 diagrammatically shown in FIG. 16 and the sets of 16 bridge position conductors 166 provided for each of the commutating devices. Thus the first bridge position conductor 166–1, which represents the position of the bridge on line L1 where the A1 scanner is over the first mosaic, is connected to AND gates 1–1 and 1–2 of write head gate #1. A voltage on this conductor 166–1 by the commutator 167A actuates the AND gates 1–1 and 1–2 to conduct a defect signal to the first write head. Since at that same bridge position the A2 scanner is over mosaic numbered 17, the A3 scanner is over mosaic numbered 3–3, and the A4 scanner is over mosaic numbered 4–9, bridge position conductors connected to the write head gates numbered 17, 33 and 49, respectively, are energized together. The second bridge position conductor 166–2 is similarly energized by the associated commutating device 167 together with the bridge position conductors for S mosaics 18, 34 and 50, and so on. The same set of bridge position conductors is used for the bridge at line L2 since, in the present case, the bridges are operated in synchronism.

In this manner, in addition to such inputs from the A1 scanner of the inspection apparatus and the severity grade gate for line L1, the write head AND gates 1–1 and 1–2, which are three-legged gates, receive on the third leg a signal representing bridge position in the S direction so as to transmit to the write amplifier for mosaic numbered "one" only during the period of 80 milliseconds that the A1 scanner scans the mosaic. As the A1 scanner moves from over the first to over the second glass mosaic, the voltage is transferred from the first bridge position conductor 166–1 connected to write head #1 AND gates 1–1 and 1–2 by commutating device 167, to the second bridge position conductor 166–2 connected to AND gates 1–1 and 1–2 of write head gate #2 for head #2 (not shown). As the A1 scanner moves from mosaic to mosaic, the 1–1 and 1–2 AND gates of each write head gate are energized by means of the bridge position conductors.

When all three input legs of either AND gates #1–1 or #1–2 for any numbered write head gate are conducting, a defect signal is conducted to the amplifier, thereby activating the write head.

It has been found that to reduce glass waste, the B scanner inspection apparatus on line L2 requires special provision in insure that the defect signal is printed in the correct drum cell in the S direction. It will be recalled that type B defects are of the line type lying in the direction of glass draw. Referring to FIG. 16, the conductors 172M or 172G from the B defect apparatus on Line L2 carry a 2 millisecond pulse which represents a defect appearing in a glass mosaic strip over which a B scanner head appears for 80 milliseconds during the scanning period. This short defect pulse accurately represents the position of a defect within a mosaic square, and is used in this case in preference to the longer 20 millisecond defect pulse which is the form of output signal produced by the A scanner. With the longer pulse a defect signal may not only appear in the correct S strip of drum cells but also may slop over into the adjoining drum cell because of the length of the pulse. While this may be tolerated in the case of the areal type A defects, substantial glass wastage may result if, in the case of line type B defects, more than the defective S strip is excluded by the partitioning process. Means are, therefore, included in the B scanner apparatus for producing a defect signal in the form of a shorter pulse, such as a 2 millisecond pulse. Such a pulse, depending on the severity of the defect, is supplied over either the mirror 172A or glazing 172G conductors from the B1 scanner to each of the write head gates #1 to #16. Similar pairs of defect pulse conveying conductor pairs are connected from each of the B2 to B4 scanners to sixteen of the write head gates covering the entire set of sixty-two such gate groups. Referring to the write head gate #1 shown in FIG. 16, 2 millisecond S defect pulses from the B1 scanner are combined with bridge position pulses over conductors 166–1 by first stage AND gates 1–3 and 1–4. An output pulse of 2 milliseconds is thus produced by the AND gate 1–3 or 1–4 of the write head gate numbered corresponding to the S position of the bridge. Such an output pulse from the first stage AND gates 1–3 or 1–4 triggers a one-short multi-vibrator M which widens the pulse to 20 milliseconds to insure that the recording head is activated for a period long enough to print the defect. This 20 millisecond pulse is transferred to the second stage AND gates 1–5, 1–6, of the same gating group which combine the pulse with the train of drum cell position pulses over conductors 180M, 180G derived from a registers comparer for line L2 and thus operate similar to AND gate #1–1 and #1–2. The pulses from this latter registers comparer represent the drum cell corresponding to the glass mosaic under line L2 which thereby places the defect signal in the proper drum cell.

The other input to the write head gates from the inspection apparatus is produced by the CD elements on line L3. Each CD element is connected by a pair of conductors 164M, 164G to the same numbered write head gate. Such conductors 164M, 164G, as shown in FIG. 16, are connected to logical AND gates 1–7 and 1–8, respectively. The other input legs of these AND gates are connected to the registers comparer for line L3, which is shown diagrammatically in FIG. 14, but is omitted from FIGS. 15 and 16 for convenience and simplicity. It will be understood that the output from the registers comparer for line L3 is conveyed over two conductors 182M, 182G. The signal over conductor 182M is a pulse in the forward part of the drum cell corresponding to the glass mosaic rank under line L3. Similarly, signal over conductor 182G is a pulse in the rearward part of the drum cell corresponding to the glass mosaic rank under line L3. Thus when a defect signal of mirror severity is conveyed from a CD element over conductor 164M to the AND gate 1–7, this defect signal is conducted to the automatic terminal of the A switch, and from there to the write head, at a time such that the signal is recorded in the drum cell corresponding to the defective mosaic under line L3. AND gate 1–8 is operated similarly for glazing grade defects.

9. OPERATION SUMMARY; CONTINUOUS RIBBON-WRITE

*Initial Condition.*—In order to prepare the defect storage unit shown in FIGS. 9–21 for recording defect data for a continuous glass ribbon on the glass line, it is necessary to assign components to serve the defect information received. Switches are provided for selecting either continuous ribbon operation or plate operation, herein called PC switches, and further switches are provided for selecting either automatic or manual operation according to the type of inspection apparatus on the line, herein called MA switches. In this case the PC switches are first set on the C position and the MA switches are set on the desired position depending on whether the operation is to employ automatic or manual inspection.

As a preliminary operation, certain components must be reset to a reference state. This is achieved by reset means illustrated in connection with each such component, which are actuated manually by a reset device such as a reset button. Accordingly, by pressing the reset devices 102, referring to FIG. 20, the leading edge reference track on the drum is erased and a new leading edge pulse is placed on the track in synchronism with the signals recorded on the drum cell clock track. At the same time the recording tracks are erased thus preparing the drum surface for new data as to a glass ribbon on the conveyor. The erasing operation is carried out as follows: to erase the leading edge signal, referring to FIG. 20, a pulse is supplied from the reset button 102 to the one-shot multi-vibrator 104. The output of this one-shot multi-vibrator is a 30 millisecond pulse which is transferred to an erase head to erase the leading edge track. The 30 millisecond pulse produced by the one-shot multi-vibrator 104 is also used to activate the sixty-two erase heads over the sixty-two recording tracks. Since a drum revolution requires 16.6 milliseconds, the complete drum surface is erased during the 30 millisecond period that the erase heads are activated. The trailing edge of a similar 30 millisecond pulse triggers a pulse amplifier 108 to produce a 2.5 microsecond pulse which is supplied to the leading edge track write head 50 and is used to print the new leading edge signal.

As a further operation in resetting the defect storage unit to prepare the same for recording defects, the glass mosaic registers for each inspection line must be reset to a reference state before glass reaches the inspection area. For this purpose, referring to FIG. 15, a 2.5 microsecond pulse produced by pressing the reset button is supplied through the OR gate 76 and inverted by the amplifier I to produce a 7.5 microsecond pulse of suitable polarity of reset the register flip-flops. This reset pulse is directed through a suitable switching network to the pins of the glass mosaic register flip-flop stages according to a desired reference state. The desired reference state for each glass mosaic register corresponds to the binary value representing the distance from the Z cutter to the respective inspection line. With the system set for manual inspection, the reference state corresponds to the binary value representing the distance from the Z cutter to inspection line L4. With the system set for automatic inspection, the reference state for each register is as set forth in the tables on pages 53 and 55.

*Operation.*—Referring to FIG. 9, the leading edge of the glass ribbon moves from the glass source along the conveyor toward the inspection station. Upon reaching the first inspection line L1, with the defect storage set to receive inputs from the automatic inspection apparatus, the glass starts the glass mosaic clock 63 (FIG. 15) to produce a train of pulses which are supplied to the glass mosaic register for inspection line L1. Referring to FIGS. 10 and 15, the drum cell register provides a representation of drum cells passing the row of write heads and is reset drum revolution as the leading edge signal on the drum passes the write head row. Accordingly, to locate drum cells on which to print defect signal from the inspection apparatus on line L1, the state of this glass mosaic register for the first two-inch length of glass passing inspection line L1, is compared with the state of the drum cell register in the registers comparer and during each of the 30 drum revolutions that occur while the first two inch glass mosaic remains under the inspection line, the registers comparer output gate 88 produces a pair of output pulses. The pair of pulses together represent the rank of drum cells for the first rank of glass mosaics and locate the drum cells for printing defect data. As the glass moves downstream and the second mosaic moves under line L1 the glass mosaic register changes state and the registers comparer produces an output signal each drum revolution at the time the second drum cell passes under the write heads, thus locating the second drum cell for receiving defect signals.

A defect detected by any one of the A scanner heads on line L1, produces a signal one of the conductors leading from each scanner head to the write gates of the system. Such a defect signal is printed by the same numbered write head as the S dimension of the mosaic in which the defect appears. And, depending on whether such defects are mirror or glazing grade, they are printed in the forward or rearward halves of the corresponding drum cell by means including the severity grade gates.

As the glass ribbon moves downstream the glass mosaic register for inspection line L1 shifts to successive states as each two inches of glass passes to cause defect signals to be recorded in successive drum cells. Moreover, as the glass ribbon progresses successive inspection lines are started opening. Defect signals detected by the inspection apparatus at any line L1 to L3 at a particular S dimension are transferred to write heads adjacent the magnetic drum at that particular S dimension. In this manner, defect data is detected Z by Z and stored on the drum as the flow of glass continues.

With the defect storage set for manual inspection, only the apparatus on line L4 is used, however, the system operates in the same manner as just described.

The read-out procedure and components for carrying it out are described in subsequent sections. Once such read-out has been completed for a section of the drum, no further need is required for the record thereon. Thus in the continuous recording process the glass mosaic record progresses around the drum with respect to a fixed point, and erasing of the record on the surface does likewise, so that unused portions of the drum are continuously being erased previous to entering the defect printing area. In the present case the erase period follows the printing of defect signals from the A scanners of inspection line L1. Referring to FIG. 15, the output gate 88 of the registers comparer for line L1 produces, as previously stated, a pair of pulses used in printing the defect signal. The pair of pulses from the output gate 88 of the comparer also represent the Z position of the inspection line L1 relative to the glass leading edge, which is the most distant inspection line from the Z cutter. This is also the point where the last defect is written, and no defects are printed each drum revolution after this point on the drum until the drum revolves to where the leading edge signal is under the write head. These pulses, therefore, are also used for defining the start of the erase period. For this purpose the registers comparer output gate 88 is connected to the series of one-shot multi-vibrators 186 and 188, shown in FIG. 20, producing a 100 microsecond pulse delayed 50 microsecond. This 100 microsecond pulse is used to activate the erase heads to erase approximately three drum cells each revolution. Once the erased drum surface reaches the row of write heads, defect signals may be printed therein identifying defective glass mosaics.

B. *Continuous ribbon operation (read)*

1. READ COMMANDS

Simultaneously with the continuous recording of defect data on the drum, the defect storage unit is interrogated for previously recorded data based on which the partitioning calculations are made in the computer. Therefore, now turning to FIGS. 22–24, the components used in the read operation are particularly illustrated in these figures.

In order to consider an illustrative case, reference is first made to the circuits of the computer, shown in FIGS. 22 and 23, which command the read operation. Such computer circuits include a set of nine relays 200 which represent the defect interrogator relays of the computer. The trial Z length is represented in binary form by selective energization of the nine defect interrogator relays 200. Thus the nine relays have sets of contacts 200–1 to 200–9 for energizing pairs of conductors 202 to 218 with complementing voltages, each pair of conductors representing one place of the trial Z length in binary. A trial stepper component of the computer establishes a series of twenty trials after which a selected trial is repeated as a twenty-first trial. During the twenty-first trial the computations for the selected Z trial length are repeated, the results are accumulated or issued as commands, or both, and the apparatus is reset to complete the computer cycle for the next twenty trials with respect to the new leading edge of the glass ribbon. In this instance the relays corresponding in binary number to the Z size programmed for the twenty steps are successively energized by a step voltage source. Also, included in the computer circuitry, as shown in FIG. 23, is a means for selecting defect information according to quality grade, herein described as an illustrative arrangement of mirror glazing quality selector relays 210M, 210G. In this arrangement, one quantity selector relay 210M or 210G is energized and its control contacts are closed for each trial Z step. The record interrogating signals on the conductors leading from the contacts of the defect interrogator relays 200 and the quality selector relays 210M and G are conveyed to the magnetic storage unit and are utilized to start and stop the reading cycle and to discriminate between recorded signals of different severity grade.

Now turning to the defect storage unit, provision is also shown in FIGS. 22 and 23 for read-out of the record on the drum. As herein shown, a set of sixty-two read heads are provided, one over each recording track and numbered to correspond; each read head is connected to an S relay 214 of the computer through individual read gates. A defect appearing on a recording track at a given S dimension and in a trial Z length, energizes the same numbered S relay. The defect data is thereby supplied to the computer in the form required for computation purposes.

In carrying out the foregoing, means are provided included in the read gates for starting the read operation as the leading edge of the record on the drum arrives under the row of read heads. Means are also included for stopping the read operation as the last drum cell of the trail Z length passes from under the read heads. Means are further included for discriminating between defect signals recorded in the forward and rearward portions of each drum cell in order to select mirror or glazing grade defect data.

2. START READ COMPARER

Still referring to FIGS. 22 and 23, the circuits included in the "Start Read Comparer" provide a signal representing the start of the read period each drum revolution (at the leading edge of the record). For this purpose, when the computer trial stepper commands interrogation of the first trial Z length and energizes the defect interrogator relays, a signal is derived from the terminals 200–1 of the first defect interrogator relay 200 through an OR gate 216. This signal is combined in an AND gate 218 with a signal from the read head 99 over the leading edge clock track, thereby providing a synchronized pulse representing the start of the read period. This pulse through a one-shot multi-vibrator 220, which introduces a 33.3 microsecond delay so that the read period starts in the first mosaic, sets the state of flip-flop 222 so that its output terminal, and conductor 224, is energized. By this means the read gates are opened. The foregoing is illustrated in lines 1 to 6 of the timing diagram, FIG. 24.

3. STOP READ COMPARER

Turning next to a detailed consideration of the stop read comparer, as previously noted the read period of any trial Z in the case of continuous ribbon production, starts the leading edge of the record on the drum, representing the leading edge of the glass ribbon, and terminates at the rank of drum cells corresponding to the trial Z length. A leading edge signal on the leading edge reference track on the drum by means of the start read comparer marks the arrival of the leading edge of the record under the read heads and is used to activate the read gates so that the latter open to pass signals from the read heads to the S relays. The termination of the read period is caused by a pulse produced by the stop read comparer which represents the drum cell at the end of the trial Z length. The control of the read gates by the stop read comparer is most easily explained by directing attention to the flip-flop 222. When a signal appears on the output terminal of this flip-flop and the conductor 224 leading therefrom, the read gates are open to pass signals from the read heads to the S relays. When the output signal on this flip-flop is cancelled, the read gates are closed. As previously noted, the flip-flop 222 is set by the start read comparer to the state where its output terminal conducts. The stop read comparer is used to reset the flip-flop 222 to its other state thereby blocking defect signals thereafter produced by the read heads until the drum revolves to move the leading edge again under the read heads.

As shown in the block diagram of FIG. 22, the stop read comparer compares the state of the drum cell register to an input signal from the computer. This computer-derived signal is in the form of a binary representation of the trial Z length. As shown in FIG. 23, the latter signal is supplied from the computer by suitable energization of the defect interrogator relays 200.

The operation of the drum cell register shown in FIG. 23 was described in detail in an earlier section. Such register provides a binary representation of the procession of drum cells past the row of read heads starting with the leading edge on the record on the drum and is reset to its reference state each revolution. The state of the drum cell register is continuously compared with the binary representation of the Z length to be interrogated in the stop read comparer for which a suitable circuit is also shown in FIG. 23. Referring to this figure, the stop read comparer comprises pairs of AND gates 226 in a like arrangement to that used in the registers comparer, also described in a previous section. Thus, the complementary outputs of each flip-flop stage of the drum cell register are connected to a pair of AND gates 226 which are also connected to receive signals representing the same place of the trial Z length binary number.

Each pair of AND gates 226 is connected through a logical OR gate 228 to the input terminal of a multileg AND gate so as to provide a voltage at that input terminal when one AND gate of the pair is conducting. By this means a pulse (line 7, FIG. 24) is produced at the output of the multileg AND gate 230 once each drum revolution when all inputs to this gate are conducting representing that the drum cell register matches the Z trial binary number. This output pulse from the gate 230 marks the end of the read period by locating the drum cell at which interrogation is to terminate. Such pulse is used to reset the flip-flop 222 as described hereinafter.

4. READ GATES

In the present case read gates are provided for gating pulses produced by the read heads and limiting the transposition thereof to the S relays to defect signals in the trial Z length being interrogated. Such read gates also serve to screen out pulses read out from the drum cells but representing one severity grade, such as mirror grade, for example, where the defect data required by the computer is glazing grade defects.

The read gates are shown in detail on FIG. 23. For description purposes, such gates may be considered to include three groups of gates. The first group of gates includes the flip-flop 222 previously described, on the output terminal of which a signal appears each drum revolution in the form of a long output pulse representing the read period or trial Z length under interrogation (line 11, FIG. 24).

The first gating group, therefore, also includes the one-shot multi-vibrator 220 which is supplied with a pulse marking the start of the read period from the AND gate 218. This first gating group also includes the AND gate 232 one leg of which receives the output signal from the multileg gate of the stop read comparer. This latter AND gate 232 combines the 33.3 microsecond pulse from the stop read comparer, representing the length of a full drum cell, with a delayed pulse supplied from a series of one-shot multi-vibrators 234, 236 which are actuated by a train of pulses from one output of the drum cell divider flip-flop. In this manner a pulse (line 8, FIG. 24) is produced timed to occur just after the start of the last cell of the trial Z length which pulse is used to close the read gates. Such one-shot multi-vibrators 234, 236 produce a 7 microsecond pulse delayed 5 microseconds from the beginning of each drum cell (herein where the system is set to record for glass ribbon production) to provide the desired signal which is conveyed to the AND gate 232. The output of this AND gate 232, accordingly, is a single 7 microsecond pulse delayed 5 microseconds from the start of the last drum cell of the trial Z length. This pulse is directed to the flip-flop device 238. The latter is included to introduce a delay (line 10, FIG. 24) in the transfer of the read stop pulse from the AND gate 232 to the flip-flop 222 so as to hold the read gates open for all of the last drum cell. Thus the pulse from the AND gate 232, shown on line 10 of FIG. 24, causes the output terminal of the flip-flop 238 to return to zero potential. But the succeeding positive going pulse from the cell divider over conductor 240 drives the output of the flip-flop 238 positive again. The result of this flip-flop output going positive is to reset the flip-flop 222 to its state where the output terminal and conductor 224 are deenergized.

5. READ GATING (QUALITY)

*Severity grade selection.*—While the read gates of the first gating group described previously provide a signal on the output terminal of the flip-flop 222 representing the length of the interrogation period, further means is provided herein described as a second gating group to distinguish the records on the drum according to quality grade.

It will be recalled that in recording defect signals, the latter are placed in the forward or rearward halves of a drum cell according to whether the defect is mirror or glazing grade, respectively. In interrogating the defect storage unit, by means of the quality selector relays 210M, 210G, the computer issues commands designating the quality grade defect information required. A voltage on conductor M (FIG. 15) commands interrogation of the mirror defect record which is in the forward halves of the drum cells while the voltage on conductor G commands interrogation of the glazing defect record which is positioned as a complement to the mirror defect record in the rearward halves of the drum cells.

A suitable circuit arrangement included in the read gates to discriminate between such records responsive to computer command is also shown in FIG. 23. Thus, the conductors M and G from the computer lead to a pair of AND gates 242, 244. The other input to each such gates 242, 244 is a train of pulses (lines 13, 14; FIG. 24) from separate outputs of the cell divider flip-flop, the operation of which is described above in the section entitled "Cell Divider," Thus the mirror AND gate 242 receives a train of 16.6 microsecond pulses from the M terminal of the cell divider flip-flop representing the forward or mirror halves of the drum cells while the glazing AND gate 244 receives the complementary train of 16.6 microsecond pulses from the G terminal of the cell divider flip-flop representing the rearward or glazing halves of the drum cells. When one of such pair of gates 242, 244 is supplied with a command voltage by either the M or G conductor from the computer, such AND gate transfers a train of pulses to a subsequent AND gate 246, such train of pulses representing the forward or rearward halves of the drum cells, that is, the particular record on the drum to be interrogated (mirror or glazing).

Such severity grade record identifying train of pulses, for example, as shown in FIG. 24, line 13, representing the mirror record, is combined in the subsequent AND gate 246 with a long signal defining the read period from the flip-flop 222. Using for illustration, a trial Z length of 30 mosaics, the AND gate 246 transfers a train of pulses, shown on line 15 of FIG. 24, continuing for 30 drum cells after the leading edge of the record, to a subsequent gating group.

This third gating group includes sixty-two AND gates 248–1 to 248–62, each one of which receives (1) defect signals over the conductor 250 from the same numbered read head of the set adjacent the drum, and (2) the output of AND gate 246 in the form of a train of pulses in the forward or rearward drum cell halves continuing each drum revolution for the read period. Thus each AND gate 248 is pulsed open for one half and closed for the other half of each drum cell during the length of the read period. Any defect signal received by the AND gate 248 on one leg, which lies in the drum cell half represented by the train of pulses also received by this AND gate 248 on its other leg, is transferred through to its output and the S relays connected thereto. A conventional driver may be included in the S relay circuit to latch the S relay once energized. In this manner defect information is stored in the S relays which may be released after each trial Z step.

6. OPERATIONAL SUMMARY

*Initial condition.*—With the system set for continuous ribbon production where the defects are recorded on the drum continuously as the leading edge of the ribbon progresses downstream past the inspection apparatus to the Z cutter, the interrogation of the record on the drum begins after the leading edge reaches the Z cutter when the computer directs interrogation for a programmed series of trial Z lengths. Assuming that such are programmed in the order of increasing Z lengths, the record will be interrogated by the computer trial stepper first energizing the defect interrogator relay numbered according to the shortest trial Z length. The minimum Z length that may be cut is determined by limitations imposed by the cutting apparaus and herein is set at nine mosaics or 18 inches. It is noted that the time for the continuous glass ribbon to move the minimum Z cut of 18 inches on the conveyor also imposes the time limitation within which the computer must complete the programmed Z trials and compute the cutting decision. In the present case, with a lineal glass speed in excess of 200 inches per minute, such time limit is about 4½ seconds.

Taking, for example, a first programmed trial Z length of 18 inches, the computer defect interrogator relays are energized to provide the binary representation of the decimal number 18—010010—along with the mirror or glazing severity grade selector relays 210M or 210G to designate the quality grade record to be interrogated for this trial Z. Assuming that mirror grade is programmed for this trial Z, the quality grade selector relay 210M is closed applying a voltage through mirror grade command conductor M to the defect storage unit.

A signal representing the trial Z read-out command from the computer is transmitted to the start comparer gates of FIG. 23 including the OR gate 216 and AND gate 218, such signal being synchronized in the latter gate with a signal from the leading edge track on the drum to start the interrogation period as the leading edge of the record on the drum moves under the read heads.

To stop the read operation, the binary representation of the trial Z length is compared, in the stop read comparer, continuously with the changing states of the drum cell register. When the register appears in the state for the ninth drum cell, in the present case, the read period is terminated.

The length of the read period for a trial Z is between 26 and 40 milliseconds permitting one complete pass over the drum surface and possibly a second pass. During each of the read passes of a trial Z, the read AND gates 246 and 248 are energized to pass defect signals produced by the read heads at any S location where defects appear. Such defect signals energize the same numbered S relays. Since the read gates are closed when the ninth rank of drum cells is past the read heads, for the remainder of each drum revolution each read pass any defect signals that may be produced are blocked out and prevented from reaching the S relays. The S relays are actuated by defect signals appearing in the trial Z lengths to provide the defect data output.

In order to selectively read out either the mirror or glazing grade defect record during each trial Z interrogating period, the read gates are closed for half of each drum cell in the trial Z length to screen or block the transfer to the S relays of defect signals recorded in that particular drum cell half. In this manner the gates discriminate between defect signals and pass signals read out of (1) the forward (mirror), or (2) the rearward (glazing) halves of the drum cells, according to the computer command for mirror or glazing defect information.

After each trial Z inspection period is completed, the S relays are reset to deenergize the S relays that contain the defects in preparation for interrogation of another trial Z. Since the read-in of defect information as to new glass and the read-out of previously recorded defect information is essentially a continuous process, the erasing of portions of the drum surface containing defect data also is a continuous operation. As previously described in Section IIA9, in the present case the defect data is erased from the portion of the drum corresponding to the glass on the line just upstream of the inspection line L1. Each drum revolution previously recorded defect signals are erased from the band of about three ranks of drum cells previous to the rank corresponding to the mosaics under inspection line L1. In this way an erased drum surface is provided to record defect signals from a new rank of glass mosaics as the latter passes into the inspection area under inspection line L1.

Continuing with the present example, where the computer includes means for programming a total of twenty trial Z's, the computer trial stepper in a full cycle provides a series of twenty-six steps. In the first twenty steps the defect interrogator relays of the computer are set in binary according to the trial Z lengths, after which a cutting decision is made. During each successive step this interrogation period starts as the drum glass leading edge moves under the read heads and terminates after the rank of drum cells has been read corresponding to the Z length. If, for example, in the second step the trial Z length is 20, the read period starts at the glass leading edge and ends after the twentieth drum cell moves past the read heads, and so on for each step and trial Z length. Selective read-out of either the mirror or glazing defect record for each trial Z is accommodated by the present arrangement wherein a new quality grade command is issued for each trial Z length according to the programmed quality.

C. *Plate operation (write)*

1. GENERAL ORGANIZATION

The preceding sections IIA and B have described the magnetic storage unit applied to recording and read-out of defect data for a continuous glass ribbon on the conveyor line. According to the present invention, means are provided for the storage of defect information, and for read-out of such information to a computer for the calculation of partitioning solutions for plates of glass (as distinguished from a continuous ribbon of glass) on the production line. Accordingly, this invention will be described in this and the following section in connection with the output from a glass factory in the form of rectangular plates illustratively 124 inches wide and 220 inches in length, although as will become evident, the defect storage unit may accommodate other glass plate sizes.

FIG. 25 is a block diagram of the storage unit components for recording the defects from plates on the line. As in the preceding case of continuous glass ribbon production, defect information is provided in the form of the Z by S locations of defects from inspection apparatus on combinations of four inspection lines L1 to L4 over the conveyor. A further refinement retained in this case is to discriminate between lower grade mirror defects and the more severe glazing or "total" defects. Signals designating defects are supplied through M or G conductors from the inspection station to write gates which operate to transfer such defect signals from defect detection devices at particular S dimensions to the same numbered S defect recording heads adjacent the drum.

It will be recalled that the defect storage unit is shown in block diagram for continuous ribbon operation in FIG. 10. Comparing the block diagrams of FIGS. 10 and 25, it will be noted that the unit components are substantially the same for ribbon production as those shown for plate operation except that the present unit for plate operation also includes means for relating the plates on the line to particular quadrants on the drum surface, in the present case shown as a quadrant register and plate register and a plate-quadrant registers comparer therefor. Such, of course, is provided for plate production according to the preferred form of this invention, but is not required with continuous glass ribbon production.

It will be further understood that for convenience and clarity in this description, the defect storage unit for plate operation shown in FIG. 25 is described independently of the unit previously described for continuous ribbon operation. It is contemplated that the units will be combined to allow the maximum use of logical circuit components in any operating system. To this end the PC switches shown throughout the figures are provided to connect the required components in the system when setting it up for either P (plate) operation, or C (continuous) ribbon operation.

Similar equipment considerations to those stated hereinbefore for the unit for continuous glass operation relate to the unit for plate glass operation, as concerns the defect detection apparatus found on the inspection lines, the construction of the drum, and the construction of the combined recording, read-out, and erase heads.

2. DRUM REFERENCE TRACKS

For locating particular portions of the drum surface while the drum is rotating, reference signals are recorded on separate reference tracks on the surface of the drum. Such tracks, for example, referring to FIG. 11, may be located at one end of the drum adjacent the sixty-two side-by-side recording tracks.

*Drum cell clock track.*—Still referring to FIG. 11, the pre-recorded, permanent record track having 1000 signals in 360° of drum tracks, termed herein as the drum cell clock track, is used to produce a train of pulses, as shown in line 1 of FIG. 30, at the rate of 1000 per drum revolution, or one each 16.6 microseconds. By means of this train of pulses, 360° of recording track is divided for defect recording purposes into 500 drum cells of 33.3 microseconds in length, line 4, FIG. 21, and each drum cell is further divided into 16.6 microsecond halves so that the glazing defects may be recorded in the second portion of each cell while the first portion of each cell is reserved for storage of mirror defects. Defect data as to a single two inch glass mosaic is thus placed in a single corresponding drum cell by the means hereinafter described.

*Drum quadrant clock track.*—Another pre-recorded reference track, termed herein the drum quadrant clock track, is also used in operation of the defect storage unit for plate production on the line. This track includes four signals spaced at 90° and thus defining the four quadrants of the surface of the drum. A reading head adjacent such quadrant track produces four pulses per drum revolution, spaced 4.166 milliseconds as shown in FIG. 30, line 3. Such signals are employed in the present case of plate operation to divide the drum surface into quadrants so that the defect data as to a glass plate may be placed in one quadrant with the leading edge of the plate coinciding with the start of the quadrant and the succeeding drum cells of the quadrant corresponding Z by Z to the mosaics of the glass sheet of which the defect data is recorded in that quadrant.

Such signals are also used for identifying the quadrants for read-out and erasing, it being understood that recording, read-out and erasing of defect data, according to this invention, is essentially a continuous process.

*Drum revolution clock track.*—A further reference track used in plate operation includes one recorded signal in 360° of track, such signal coinciding with one of the four signals on the quadrant track. This track is termed herein the drum revolution clock track and produces, via the read head 300 associated therewith, a train of pulses at the rate of one per drum revolution, i.e., every 16.6 milliseconds.

3. DRUM CELL REGISTER

The same drum cell resgister described previously for counting the procession of drum cells passing the row of write and read heads, is used in plate operation. The states of the register are compared continuously with the states of the glass mosaic registers for all inspection lines, referring to FIG. 25, thereby to locate drum cells corresponding to the glass mosaic at these inspection lines.

A suitable drum cell register is hereinbefore described as comprising a chain of nine flip-flop stages representing successive places of the drum cell binary number as successive powers of 2. In plate operation, the drum cell register flip-flops are set to a zero reference state four times each drum revolution by signals derived from the quadrant clock track so that the drum cell register is reset as the leading edge of each quadrant moves under the write and read heads. In this manner the drum cell register provides a count in binary of the drum cells passing the heads on the drum starting with the leading edge of each quadrant and continuing for the one-quarter drum revolution, or 125 drum cells, that each quadrant remains under the heads. Since the length of a plate is 110 mosaics, a quadrant of 125 drum cells will receive the defect record for a full 110 mosaic length plate. Moreover, only seven register stages are required to represent $2^7$ in binary (decimal 128) and, therefore, the first seven stages are reset in plate operation by signals from the quadrant clock track.

The electrical circuitry of the drum cell register is described in detail earlier, which description may be referred to as required.

*Cell divider.*—The input of the drum cell register, as in the previous case with ribbon operation, is the circuit termed herein the cell divider, comprising a flip-flop one-output terminal M of which is connected to the drum cell register. The input to the cell divider is a train of 1000 pulses per drum revolution (one every 16.6 microseconds) while the input therefrom to the drum cell register is at the 33.3 microsecond rate representing drum cells. The cell divider is described in detail in a previous section, to which reference may be made.

4. GLASS MOSAIC REGISTER

Referring again, therefore, to FIGS. 15, 24 and 25, as depicted in these figures a separate glass mosaic register, shown in FIG. 15, is provided for each inspection line, as shown on FIG. 26. Each such glass mosaic register provides a means for continuously registering in binary the procession of mosaics of glass that pass Z by Z past one inspection line. The state of the register thus represents the rank of mosaics that happens at the moment to be under the inspection line.

*Lines L1 or L4 register.*—Since it is not contemplated that both the photodetection apparatus on inspection line L4 used in conjunction with manual inspection, and the automatic inspection apparatus on the other lines L1, L2 and L3 will be in operation at the same time, provision is made for employing the same glass mosaic register device in connection with lines L1 and L4. MA switches and connections made therethrough connect the leading edge and trailing edge switches at line L1 or line L4 selectively to this glass mosaic register to synchronize its operation with the arrival and leaving of a glass plate at one or the other of such lines. Therefore, such register provides a count in binary of glass mosaic progression past inspection line L1, when the defect storage unit is set up for automatic inspection, or past inspection line L4, when the defect storage unit is set up for manual operation.

With the defect storage unit in operation to record for glass plate production, this glass mosaic register is operated, referring to FIG. 15, by pulses produced by a glass clock 63, and reset by a reset pulse produced by the subsequent plate engaging the leading edge switch 302 at line L1 or a similar leading edge switch at the manual inspection line L4. The input to the glass mosaic register, in the form of a train of pulses at about one every ½ second, represents the movement of two inches of glass: that is, a single glass mosaic. Such train of pulses is produced by a mechanical device, hereinbefore termed a glass clock 63, which may be physically contacted and operated by the glass as it moves along the conveyor. In this manner a measure of glass speed is automatically provided.

Still referring to FIG. 15, each glass mosaic register includes, as previously described in detail, a chain of nine binary counter stages each with a pair of output terminals "0" and "1." Since the highest number registered in plate operation is 110 mosaics, representing the Z length of one plate, seven of such binary counter stages provide a sufficiently high count for plate production.

The register must be reset to "one," when the unit is in plate production, as the first mosaic of the plate moves under the inspection line. For the purpose of supplying suitably timed reset signals to the seven flip-flop stages of the register, in the present case a reset circuit is provided the details of which are shown in the lower left-hand portion of FIG. 15. As shown in this figure, the input to the reset circuit is from the leading edge switch 302 at the inspection line. The pulse produced when this switch is tripped by the plate leading edge is synchronized with the quadrant clock signal on the drum, and converted to a proper form to reset the flip-flops of the register stages.

Suitable means for synchronizing is provided by the pulse delay circuit shown in FIG. 15 and previously described in detail. In this case the synchronization is with a signal from the quadrant track rather than the leading edge track as earlier described. The pulse delay circuit operation is substantially the same, but the input to the circuit is from the read head 300 over the quadrant by setting the PC switches on the P position.

Suitable switching, which is not shown in detail, may be included to reset all flip-flops to zero except the left flip-flop representing the first binary place which is reset to "one." Thus as a new plate arrives at inspection line L1, the pulse produced by the leading edge switch 302 at that line resets the glass mosaic register to the binary number 000000001. It will be noted that a manual reset pulse admitted to the OR gate 76 of the reset circuit also resets the register to its reference state.

*Lines 2 and 3 registers.*—Glass mosaic registers for each of lines L2 and L3 are diagrammatically depicted in FIG. 26. Such registers may be constructed as shown in FIG. 15, of a chain of flip-flops, seven of which are operative in plate operation. In order to avoid duplication of circuit components, as far as practical the same components are used in connection with the operation for recording defect signals from the inspection apparatus on lines L2 to L3 as are used in connection with the apparatus shown for lines L1 and L4. Thus, for example, the same cell divider and drum cell register may be employed in connection with the glass mosaic register for any one of the inspection lines. Individual reset means are provided for the register for each line, so that the states of such register are related to the movement of a plate under that line. Thus each register is reset by a leading edge switch associated with each line such that the register starts operating as a plate arrives at that line.

*Glass clock gate circuit.*—In order to synchronize the glass mosaic register with the operation of the drum cell register so as to avoid missing or misplacing defect pulses occurring in the periods when the registers are changing state, the change of state of the glass mosaic register occurring about every ½ second, is made to coincide with the reset to its reference state of the drum cell register, occurring about every 4.166 milliseconds. This may be achieved for the register for any inspection line by means of a gate circuit, shown in the lower left hand portion of FIG. 15, which is supplied with a pulse from the leading edge switch or detector at the inspection line, and combines the same with the quadrant clock track pulses from the reference track on the drum to produce an output pulse coinciding in time with one of the latter pulses. Thus, the quadrant pulses are conveyed from the read head 300 through the PC switch (on the P position) to the AND gate 82. The glass clock pulses trigger a one-shot multi-vibrator 80 to produce a 20 millisecond pulse combined with the first quadrant pulse in the AND gate 82. The output of this AND gate 82 triggers another one-shot multi-vibrator M to supply an input pulse to this glass mosaic register. In the present case, a separate input means including a glass clock and gate circuit is used to supply the glass mosaic register for each inspection line since the glass plates on the conveyor line may be spaced at other than two inch increments.

5. REGISTERS COMPARER

Means are provided, herein termed a glass-drum registers comparer, for comparing the state of the drum cell register with that of the glass mosaic register to produce an output signal four times each drum revolution representing the rank of drum cells corresponding to the rank of glass mosaics under one inspection line. This output signal is used to time the printing on the drum of defect signals produced by defect detection apparatus on that one inspection line. Referring to FIG. 20 it will be noted that a separate comparer is provided for each glass mosaic register operated in conjunction with each inspection line. A suitable circuit for the registers comparer is described hereinbefore in detail in connection with the defect storage unit for continuous ribbon operation. In the present case, the circuit is shown in FIG. 15 to include a first stage of fourteen logical AND gates 84 comprising seven pairs of such gates associated with the seven active stages of each register, respectively. By means of such pairs of AND gates each flip-flop stage of one register is compared with the corresponding flip-flop stage of the other register. The outputs of each pair of AND gates 84 are connected to a common conductor through a logical OR gate 86. Such common conductors convey the outputs from each pair of first stage gates to one leg of a multileg AND gate 88. It will readily be noted that all fourteen AND gates 84 are conducting only when all flip-flops of both registers are the same. Such occurs four times each drum revolution and causes the output multileg gate 88 to pulse the output conductor of the comparer, which pulse represents the rank of drum cells in all four quadrants corresponding to the rank of mosaics under inspection at that inspection line. As previously described, the tenth leg of this multileg output gate 88 is supplied with signals provided by the one-shot multi-vibrator 96 and pulse amplifier 98, in the form of a pair of pulses each centered in a drum cell half. The output signal of the multileg gate 88, accordingly, is a pair of pulses together representing the drum cell rank to be printed and so timed.

6. QUADRANT REGISTER

Further according to this invention, means are provided for selecting the quadrant on the drum in which to print a defect signal from the detection apparatus on any one of the inspection lines. In the present case such means includes quadrant and plate registers associated with each inspection line, and a comparer, which operate in a similar fashion to the drum cell and glass registers and registers comparer, previously described.

Referring particularly to FIGS. 25 and 27, it will be seen that a quadrant register is provided the input to which is a train of signals representing the leading edges of each succeeding quadrant from the quadrant clock track on the drum. Such register is reset to its reference state each drum revolution by a signal from the revolution clock track on the drum. This register thus is shifted successively through four states which is repeated each drum revolution. A representation of the voltages on the output terminals of the quadrant register is found in FIG. 30, lines 4 to 7. Such output terminals, referring now to FIG. 27, are connected to two pair of AND gates 310 of a suitable comparer. The other input to each comparer is from a plate register which will be described in detail in a later section.

The circuit details of a quadrant register are shown herein in FIG. 27 as including two logical circuits herein shown as flip-flop devices such as bi-stable multi-vibrators arranged with a complementing input so as to operate as single stage binary counters. A reset terminal on each flip-flop is connected to the read head 312 over the drum revolution clock track so as to receive a reset pulse, resetting the flip-flop to its zero reference state, which reset pulse is in synchronism with one of the pulses on the quadrant clock track. Thus the quadrant register provides a means for registering the quadrants passing the write heads adjacent the drum surface and the state of the register serves as a means for representing the particular quadrant (1, 2, 3 or 4) at the write heads at any given time.

It will be recalled that in the case of plate production, the plates pass downstream on the conveyor line past the inspection apparatus to the Z cutter as a continuous process. In accordance with the present invention, the defect data for the first plate passing into the inspection apparatus is placed on one quadrant, the defect data for the second plate in the next quadrant, the defect data for the third plate in the following quadrant, and so on. With the distance limitations imposed by the inspection apparatus lying upstream at a maximum 215 mosaics from the Z cutter, there may be as many as three plates in process between inspection and cutting at any given time. With the surface of the drum divided into four quadrants means are thus provided for storage of defect information for four plates. Once the defect data for a plate has been read out and the partitioning calculations made and executed, the defect data in that particular quadrant is erased and that quadrant thus made available for recording defect signals indicating defects in the next plate to move into the inspection area.

7. PLATE REGISTER

The other input to the comparer for relating the drum quadrants to the plates on the line, is a plate register. This plate register, referring again to FIGS. 24-27, provides means for storing the number (1, 2, 3 or 4) of the plate glass sheet passing each inspection line. Such plate register conveniently includes two serially connected flip-flops supplied with input pulses from leading and trailing edge detectors at the inspection line at which the plate register is in association. Thus the plate register flip-flops are set successively to each of four states. The states of the flip-flops are changed to the original state upon the receipt of the fifth and each successive fifth input pulse. Thus the flip-flops change successively to one of four states and return to the original state and provide a representation of succeeding plates on the conveyor line. The registers comparer to which the outputs of the quadrant register and plate register are connected, compares the flip-flop stages of the plate register with the flip-flop stages of the quadrant register to produce an output which is equivalent to one quadrant for each revolution of the drum and represents the location of the plate on the conveyor line, on the drum.

*Pulse delay.*—Again because of the completely asynchronous character of the system, the pulses from the leading edge switches at each inspection line over the conveyor normally do not coincide precisely with any quadrant pulse produced from the quadrant clock track on the drum. In order to avoid the possibility of missing a defect pulse in the first glass mosaic, the plate register and quadrant register are reset in synchronism. Suitable means for accomplishing this is shown in FIG. 27. Referring to this figure, a leading edge switch 302 is included for line L1 and a trailing edge switch 316 for the same line. Similarly, for operation of this unit to record defect data from the "Manual" inspection line L4, a leading edge switch 317 and trailing edge switch 318 are provided for this line. The MA switches are on A position now. Accordingly, referring particularly to FIG. 30, a pulse from the leading edge switch 302, for example, of line L1 is combined with a pulse from the quadrant clock track for synchronizing the operation of the plate register. To this end, a pulse produced when the leading edge of a plate trips the switch 302 (line 10, FIG. 30) triggers a pulse amplifier 320 which sets the state of a flip-flop device 322 connected to its output (line 11, FIG. 30). The output terminal of the flip-flop 322 is connected to a one-shot multi-vibrator 324. This flip-flop is also connected to the trailing edge switch 316 at the inspection line for resetting the state of the flip-flop. With this arrangement, only one pulse from the plate leading edge switch 302 can trigger the one-shot multi-vibrator until a trailing edge pulse resets the flip-flop through its reset terminal. Thus chipped or broken glass is prevented from producing false inputs. The one-shot multi-vibrator 324 outputs is a five millisecond pulse (line 12, FIG. 30) which is combined in an AND gate 326 with pulses derived from the quadrant clock on the drum (line 13, FIG. 30). The output pulse of AND gate 326 coincides in time with the latter, and is used to set the state of the flip-flop 328 (line 14, FIG. 30), the output of which is connected to the plate register (line 16, FIG. 30).

Resolving the more complex situation where defect signals produced simultaneously by defect detection apparatus on the different lines indicates different defects having, of course, different Z dimensions, separate plate binary registers are provided for each inspection line, as shown in FIG. 26, diagrammatically. The logic of each of these systems for each inspection line is the same. While four inspection lines are depicted in the drawings, it will be understood that a larger or a smaller number of inspection lines could be employed depending on the type of defect detection apparatus that is available.

Provision is also made, as shown in FIG. 27, for resetting each plate register to a reference state manually. Such is required to prepare the unit for receiving defect information. Thus a connection is shown from a manual reset device to a pulse amplifier and inverter amplifier to the reset terminals of the plate register.

It will be recognized that similar circuit arrangements are provided for each register, for supplying synchronized input pulses to the plate register and to reset the same.

8. PLATE-QUADRANT REGISTERS COMPARER

As shown in the block diagram of FIG. 26, a plate-quadrant comparer for each inspection line matches the state of the plate register for the respective line with the state of the quadrant register and produces an output pulse when the states are the same to locate the plate at that inspection line and to relate the same to a particular drum quadrant. Such output signal from each comparer locates the particular quadrant corresponding to the particular plate under that inspection line, and, as shown in FIGS. 26 and 14, is for this purpose supplied to the severity grade gate for that line to be combined therein with drum cell locating signals. Referring to the diagram of FIG. 29, the voltages carried by the flip-flop stages of the output terminals of the quadrant register are shown in lines 2, 5, 8 and 11 of the diagram. Lines 3, 6, 9 and 12 depict the voltages appearing at the output terminals of the flip-flop stages of the plate register. A comparison between the flip-flop stages is shown in lines 4, 7, 10 and 13 while a total comparison on line 14 represents the output pulse from the comparer to the write gates.

A suitable circuit for making comparison between such register devices is depicted in FIG. 27. In the present case such comprises a pair of AND gates 344 between the output terminals of each flip-flop stage. The states of both registers are the same when one of each pair of AND gates 344 is conducting, and such is represented by an output pulse from the multileg AND gate 346. This output pulse is applied to the write gates, as will be described in detail hereinafter.

9. WRITE GATES

As previously described in connection with the operation of this system for continuous ribbon glass production, the write gates, shown in the blocks labelled "Severity Grade Gates" and "Write Head Gates" in FIG. 10, and in detail in FIGS. 15 and 16, receive input signals from a glass-drum registers comparer in the form of a pair of pulses once each drum revolution, and defect signals from the inspection apparatus over the conveyor line, and combine the same to produce suitably timed write signals. In the present case of plate production, the input to the gate circuits likewise includes defect data input from the inspection lines. The gates, moreover, receive inputs from two comparers: the glass-drum comparer, supplying signals identifying the allotted times for printing in the drum cells corresponding to the mosaics under the inspection lines, and also from the plate-quadrant comparer designating the quadrant in which the drum cell to be printed is located corresponding to the particular plate under inspection.

Referring to FIGS. 15, 16 and 27, the components herein identified as write gates include severity grade gates for each inspection line and individual write head gates for each write head which receive signals for the severity grade gates and actuate the write heads to print the defect signals. As described previously in connection with ribbon operation, a severity grade gate shown in FIG. 15 functions to separate the pulse pair representing the drum cell corresponding to the glass mosaic under the inspection line, into a train of single pulses centered in the mirror halves of the drum cells on one output conductor 176M, and a train of single pulses centered in the glazing halves of the drum cells on the other output conductor 176G. It will be recalled that the comparer in FIG. 15 is illustrated as operating with the glass mosaic register for lines L1 or L4 depending on whether the unit is set for automatic or manual operation. When set for automatic operation the glass mosaic register is reset by a signal from the leading edge switch 302 at line L1 as the leading edge of the new plate arrives at the inspection line. When set for manual operation the glass mosaic register is reset by a signal from the leading edge switch (not shown) at line L4. Similarly, the drum cell register is reset four times each drum revolution by signals derived from the quadrant clock track. Thus four signals, each comprising a pulse pair, are produced by the comparer each drum revolution representing the single drum cell in each drum-quadrant corresponding to the mosaic under the inspection line L1 or L4 depending on the type of inspection.

Similar pulse pair signals four times each drum revolution but time spaced according to the distance between inspection lines, are produced by the comparers for line L2 and line L3, shown in FIG. 26.

Referring again to FIG. 15, a severity grade gate is shown therein to include a pair of three leg AND gates 56, 58. One input leg of each is connected to the multileg output gate 88 of the registers comparer. A second leg of the mirror AND gate 58 is connected to the drum cell divider flip-flop terminal M, to receive a train of pulses in the mirror halves of the drum cells, as shown on line 3, FIG. 13. The corresponding second leg of the glazing AND gate 56 is connected to the G terminal of the cell divider flip-flop to receive pulses in the glazing halves of the drum cells, as shown on line 2, FIG. 13. The third leg of both AND gates 56, 58 is shown in FIG. 15 connected to a fixed voltage, for continuous ribbon operation; in the case of plate operation, with the PC switch 390 on the P position, this third AND gate leg is connected to receive quadrant identifying pulses from the plate-quadrant comparer as shown, for example, in FIG. 27. Referring to the latter figure, the AND gates 56, 58 are shown with the inputs wired for plate operation. Since the plate-quadrant comparer output signal represents the quadrant corresponding to the plate just arrived at the inspection line associated with the comparer, the AND gates 56, 58 are opened to pass only the drum cell locating signal occurring in that one quadrant. Such signals from the AND gate 56, 58 for each severity grade gate are conveyed to the write head gates, shown in FIG. 16, for all write heads.

The same write head gates, shown in FIG. 16 and also described earlier, are used in the present case of plate operation. In brief, referring also to FIG. 18, each of such gates include pairs of AND gates #1 to #10, for receiving signals from the defect detection apparatus on all inspection lines L1 to L4. Such pairs of AND gates #1 to #10 combine the defect signals with the drum cell and quadrant locating signals from the severity grade gates to print defects on the drum. Printing of defects according to severity grade is achieved by the use of one AND gate of each pair in the set of ten in each write head gate for receiving defect signals of one severity grade. The separation in the severity grade gate of the drum cell locating pair of pulses from the registers comparer into single mirror and glazing pulses on separate lines, also serves in the means for recording of defect signals according to severity grade.

Erasing of the drum-quadrant after read-out is achieved by means also shown in FIG. 27. When a quadrant of defect data has been completely interrogated, and the Z cuts of the plate corresponding thereto sum to the 220 inches of a full plate, a circuit in the computer which continuously sums the Z cuts produces a pulse used in the erasing operation. Referring to FIG. 27, such a pulse triggers the one-shot multi-vibrator 392 to produce a 100 millisecond pulse which is supplied through an AND gate 394, and OR gate 396 to the erase amplifiers for all the write heads. The other input to the AND gate 394 is from the plate-quadrant comparer, in the form of a quarter drum revolution pulse representing the quadrant with defect data for the plate that has just been cut. The quadrant locating pulse does not shift to locate the quadrant for the subsequent plate until the latter arrives at the associated inspection lines. In the present erasing operation, therefore, the output pulse to the erase amplifiers is limited by the action of the AND gate 394 to one quadrant, causing the proper quadrant to be erased.

Manually operated reset erase means for erasing the full drum surface is also shown on FIG. 27, comprising the manual reset button 398 and the pulse amplifier 399 to provide a long erase pulse to the erase amplifier through the OR gate 396.

D. *Plate operation (read)*

1. GENERAL ORGANIZATION

For partitioning purposes the computer requires the S locations of defects in a given trial Z length. In the present case the drum recording tracks numbered according to their S dimension contain defect signals representing defective mosaics in the S strips of several plates measured in each case from one side reference edge of the plate. Such tracks are divided circumferentially into quadrants so that the read-out operation for a record of defects in plates on the line entails interrogation for periods limited to each trial Z length of the quadrant on the drum corresponding to the plate just arriving at the Z cutter. The read-out period is started for the first programmed series of Z trials, until a Z cut is made, as the leading edge of the quadrant arrives under the read heads, and is terminated after the trial Z length in drum cells is past the read heads. After Z cuts are made in the plate, the read-out period is started for each trial Z in the drum cell following the last Z cut.

A row of read heads is provided over the recording tracks, numbered to correspond to the S dimensoin of the associated track. Each read head is connected to an S relay of the computer through read gates. A recorded defect in a trial Z length produces a signal via the read-out head which energizes the associated S relay. In this respect the arrangement is the same as described previously for continuous ribbon operation.

To read out a defect record on the drum plates on the line responsive to computer command requires the components described earlier for read-out of a drum record for a continuous ribbon of glass on the line plus additional components to restrict the read operation to the quadrant corresponding to the plate at the Z cutter. These additional components may be identified by comparing FIG. 22, which is a block diagram of the defect storage unit components to read a defect record for a continuous ribbon of glass, with FIG. 31 which illustrates the defect storage unit components to read for plate operation.

Referring to FIG. 31, as a means for relating the plates upon arrival at the Z cutter to the drum quadrants, means are provided shown as plate and quadrant registers and a comparer therefor. The output signal from such comparer is conveyed to the read gates in restricting the read operation to the proper quadrant.

While in continuous ribbon operation means are provided for maintaining a signal in the leading edge reference track which continuously records the position of the leading edge of the record as Z cuts are made, in this case of plate operation no such leading edge track is utilized to record the progression of Z cuts. In the present case, this function is served by means herein located in the block labelled the Z cut Accumulator in FIG. 31. This means shown as a binary accumulator, is provided upon each Z cut execution with a signal from the computer representing the Z cut decision in binary, and accumulates the binary numbers until the full 220 inch plate is cut when it is reset. In the read-out operation the binary number stored in the Z cut accumulator is compared with the drum cell register in a start read comparer to provide a signal each drum revolution which represents the drum cell just after the transverse Z cut. Since this signal marks the start of the read period, such is used to open the read gates.

The termination of the read period is caused by closing the read gates responsive to a signal representing the trial Z length after the read period starts. To provide such a signal, the trial Z length is supplied in binary form to the read accumulator from the computer, and added therein to a binary representation of the previously accumulated Z cuts made in the plate, from the Z cut accumulator.

2. Z CUT ACCUMULATOR

Referring to FIGS. 31 to 33, as previously noted, to open the read gates to read-out the record of the portion of the glass following the last Z cut, the Z cut decisions are accumulated by means herein shown as a binary accumulator, and the states of the latter compared with the drum cell register to provide a signal which is conveyed to the read gates.

As shown in FIG. 32, a suitable accumulator comprises a chain of seven flip-flop devices, one for each binary place, the circuit arrangement of the accumulator being such that the input connection to the accumulator is in the form of conductors 400 in parallel and connected to each flip-flop stage. Such conductors are energized to provide a binary representation of a Z cut from circuits in the computer, and the function of the accumulator is to sum the Z cuts and to store the binary number representing such sum.

Still referring to FIG. 32, the input connections 400 to the accumulator lead from AND gates 402 which serve to transfer the Z cut number from the output terminals 404 of the computer upon the 26th step of the computer cycle. Thus the Z cut decision is placed in binary form on the output terminals 404 of the computer by selectively energizing the Z cut decision relays 406 in the computer. The second leg of each AND gate 402 is suitably connected to receive a signal over conductor 408 upon the 26th step of the computer trial stepper.

In the present case the Z cut accumulator flip-flop stages each have a pair of output terminals, "0," "1," for connection to the start read comparer. A binary representation of the accumulated Z cuts in terms of two inch mosaics is thus provided by the voltages on the terminals "0" and "1" of all flip-flop stages, each stage corresponding to one of seven binary places, providing means for storing the largest number which is 110, i.e., the length of a plate in two inch mosaics.

In the operation of the defect storage unit as a component of the partitioning system herein described, as a new plate arrives at the Z cutter, the computer directs reading the drum record for the first series of programmed trial Z lengths. At this time since no Z cuts have been made in the new plate, the Z cut accumulator is in its zero reference state. To place the Z cut accumulator in its zero reference state, the latter is reset either manually, by means of the reset button 410, or automatically from the computer due to the action of an accumulator stage of the computer which accumulates Z cuts, and when such accumulated cuts are equal to 220 inches, i.e., the length of a plate, produces a reset voltage on the conductor 412 which is conveyed to the reset terminals of the Z cut accumulator flip-flops to reset the same. For each such trial Z length the read period begins each drum revolution at the leading edge of the quadrant having the record for the new plate, and terminates at the drum cell in that quadrant corresponding to the end of the trial Z length. After the first Z cut is made, the Z cut decision is thereupon stored in the Z cut accumulator. Since the immediately following computer-directed reading of the drum for a series of programmed trial Z lengths involves the record from the portion of the drum quadrant following the previous Z cut, the state of the Z cut accumulator is compared with the drum cell register in the start read comparer to provide a signal representing the point at which the reading period begins each drum revolution.

3. START READ COMPARER

Referring to FIG. 32, a suitable circuit for the Start Read Comparer is shown as including a pair of logical AND gates 414 between the corresponding flip-flop stages of the drum cell register and the Z cut accumulator. Both AND gates 414 between each stage are connected through an OR gate 416, to a multileg output gate 418. Since during plate operation the drum cell register is reset to its reference state four times each drum revolution by signals derived from the quadrant clock track, the signal conveyed from the output gate 418 of this comparer is in the form of a train of pulses at the rate of four per drum revolution. Such pulses occur during each quadrant when the state of the drum cell register matches the state of the Z cut accumulator which stores the sum of the Z cuts. The pulses from the output gate 418 are conveyed to open the read gates component of the unit.

Since the signal from the start read comparer occurs during every drum quadrant, means are also provided for limiting the interrogation to the particular quadrant storing the record for the uncut sheet at the Z cutter, herein shown in detail in FIG. 33 as including the plate register, quadrant register, and registers comparer, the output of which is a signal representing the quadrant for interrogation and is also employed to open the read gates.

4. READ GATES

Still referring to FIG. 32, the operation of the read gates may be most easily understood by considering the read period as defined by a positive voltage on the output terminal of the flip-flop 420. Such flip-flop 420 corresponds to the flip-flop 222 shown on FIG. 23 and described previously in connection with continuous ribbon-read operation. Referring now to FIG. 33, a voltage on the output terminal of this flip-flop 420 is transferred as a read signal through the conductor 421 and AND gate 422 to the read head gates 424, associated, respectively, with the set of sixty-two read heads. The latter gates 424, when opened by such signal, pass defect signals derived from the read heads to drivers 425 for the S relays. Suitable holding means may be included to hold the S relays energized after being fired from the read heads.

In carrying out this function, again referring to FIG. 32, the read gates include a three leg AND gate 426 for the introduction of a suitable time delay in the transfer of the output signal from the start read comparer to the flip-flop 420. By means of this AND gate 426 the output signal of the start read comparer is combined with signals from two other sources. One such source is a signal centered in the forward, mirror, half of each drum cell produced by the action of a pair of one-shot multi-vibrators 428, 430. The latter receive a signal from the mirror pulse output terminal of the cell divider flip-flop and provide a 2.5 microsecond pulse delayed 7.5 microseconds from the arrival of the pulse, which is conveyed over conductor 432 to one leg of the AND gate 426.

The signal on conductor 432, from the one-shot multi-vibrators 428, 430, is shown in line 4, FIG. 24.

The other source of signals supplied to the AND gate 426 is a one-shot multi-vibrator 434 in the circuit labelled "Plate Read Control" in the block diagram FIG. 31, and in FIG. 32. This one-shot multi-vibrator 434 produces a 20 millisecond pulse over the conductor 426, responsive to each command from the computer to read the record for each of the series of programmed trial Z lengths. The 20 millisecond signal is long enough to insure one complete revolution of the drum past the read heads, requiring 16.6 milliseconds, so that the particular drum quadrant containing the record is sure to be read.

When all three input legs of the AND gate 426 are energized by (1) the start read signal from the start read comparer gate 418 indicating the drum cell corresponding to the leading edge of the glass plate, or the previous Z cut; (2) the 2.5 microsecond pulse centered in the mirror half of the drum cell from the one-shots 428, 430; and (3) the revolution pulse from the plate read control one-shot 434; the AND gate 426 conveys an output signal, delayed 33.3 microseconds or one drum cell length by the action of the one-shot multi-vibrator 437 (line 5, FIG. 24) to shift the state of the flip-flop 420 so that its output terminal and the conductor 421 connected thereto is energized to actuate the read head gates 424.

The flip-flop 420 output terminal remains energized until this flip-flop changes state due to a reset voltage on its other input terminal 438. This reset voltage is obtained from the circuit herein described as the stop read comparer. Referring again to FIG. 31, the stop read comparer is employed to compare the states of the read accumulator and the drum cell register to provide a signal identifying the point on the drum having the drum cell at which the read period should terminate for a given trial Z length. Before describing the details of a suitable circuit means for the read accumulator and stop read comparer, reference is made to FIG. 33 which illustrates the means, herein shown as a circuit including the severity grade selector gate for selecting from the computer the record on the drum according to its severity grade.

*Severity grade selection.*—For this purpose, the computer illustratively includes quality selector relays 210M, 210G which may be selectively energized depending on whether the mirror (M) or glazing (G) record is to be used.

The outputs of these relays 210M, 210G are connected to conductors 442, 444, respectively, leading to AND gates 446, 448. The first of these AND gates 446, is connected to the M terminal of the cell divider flip-flop while the other AND gate 448 is connected to the G terminal of this flip-flop. By means of these connections, and the selective energizing of the other input legs of the AND gates 446, 448, a train of 16.6 mirosecond signals is conveyed through the OR gate 450 representing the mirror or alternatively, the glazing, halves of the drum cells, according to which of the quality selector relays is energized. This train of signals is transmitted from the OR gate 450 to the AND gate 422 where it is combined with the output pulse from the flip-flop 420, and a signal from the plate quadrant registers comparer circuit, also shown in FIG. 33, which latter signal identifies the quadrant of the drum to be interrogated.

*Quadrant selection.*—The selection of the particular quadrant to be interrogated is achieved, accordingly, by comparing the states of the quadrant register and plate register and providing an output signal to the AND gate 422 when these register states are the same, representing the plate at the Z cutter. A signal representing the glass plate on the line is produced by the leading edge switch at the Z cutter, which is tripped by each uncut sheet as it reaches the switch. The plate register, herein shown as a binary register in FIG. 33 comprised of two flip-flop stages, is thus supplied with an input pulse as each glass plate reaches the Z cutter and successively changes through its four states, automatically resetting to its reference state after four plates have passed. The quadrant register, also shown as a binary register in FIG. 33 comprised of two flip-flop stages, is supplied with pulses derived from the quadrant track on the drum. The quadrant identifying pulses are supplied at the fast rate of four per drum revolution while the plate identifying pulses are produced at the relatively slow rate of one every couple minutes, depending on the glass conveyor speed. Thus the state of the plate register is matched by the quadrant register once each revolution while one of the four quadrants passes the row of heads adjacent the drum.

In order to synchronize the slow rate plate pulse from the leading edge switch, with the fast rate pulses from the quadrant track, a circuit is incorporated for delaying the signal from the leading edge switch until the next quadrant pulse is emitted, including a flip-flop 452 and AND gate 454. A synchronized pulse is supplied to the flip-flop 456 which blocks subsequent spurious pulses and transfers a voltage on its output terminal to the input stage of the plate register. The conductor 457 is used to supply a reset voltage to the flip-flop 452, from the computer, after the uncut at the Z cutter is completely partitioned.

The states of the plate register and quadrant register are compared in a comparer circuit including a pair of AND gates 458 between the corresponding stages of the registers, arranged such that when the stages are in the same state both AND gates transfer a signal to an output AND gate 460 through OR gates 459. The output leg of this latter AND gate thus provides a signal representing the quadrant on the drum corresponding to the plate at the Z cutter, and is 4.4 milliseconds in length representing the length of time required for the one quadrant to pass the read-out heads.

5. READ ACCUMULATOR

Referring now to FIGS. 31 and 32, the circuit therein labelled the read accumulator illustratively includes seven flip-flop stages, as shown in FIG. 32, connected to accumulate binary numbers supplied in the form of voltages from the defect interrogator relays of the computer and from the Z cut accumulator. In this manner the states of the read accumulator flip-flop stages represent, in binary, the successive trial Z lengths under interrogation. For example, assuming that the first three programmed trial Z's are as shown in FIGS. 5, 35, 20, 9 the defect interrogator relays will be selectively energized to provide binary representations of these trail Z lengths. Where no cuts have been taken in the sheet at the Z cutter, so that the state of the Z cut accumulator represents zero, the flip-flop stages of the read accumulator are first driven to represent 35 the first trail Z in our example. After the programmed S glass sizes have been fitted in this trial Z length and the accumulated value has been calculated by the computer, the flip-flop stages of the read accumulator are then driven by the defect interrogator relays to the states representing the second trial Z length 20, and so on for subsequent trail Z lengths.

After Z cuts have been made, the read accumulator flip-flops are driven successively to the states representing the total of the trial Z lengths plus the accumulated Z cuts, so that the state of the read accumulator provides a representation of the value of the last Z that is being inspected in binary form regardless whether the trial Z starts at the leading edge of an uncut or where the previous Z cut was made.

*Plate read control.*—To time the transmission of signals to the read accumulator, which signals are both from the computer and from the Z cut accumulator, means are included herein shown as a plate read control circuit in FIG. 32. The computer trail stepper illustratively initiates the interrogation by closing the contacts 462 which provides a pulse for each trial Z that is considered. This pulse is applied by the pulse amplifier 464 to the circuit in the box labeled plate read control in FIG. 32 where it triggers an inverter amplifier 466 and a one-shot multivibrator 468. The output of the of the inverter amplifier 466 is connected to reset all the flip-flop stages of the read accumulator to binary zero so that the accumulator is ready to receive the signals representing the Z trial length from the computer and the accumulated Z cuts from the Z cut accumulator.

The one-shot multi-vibrator 468 produces an output pulse delayed 50 microseconds from the trigger. Thus, the read accumulator flip-flops are reset when the output pulse from the one-shot multi-vibrator 468 is transferred to open a set of AND gates 470 which serve as a shift gate for transferring the binary value stored in the Z cut accumulator to the read accumulator. This same one-shot 468 output pulse triggers a second one-shot multivibrator 471 which provides an output pulse delayed 50 microseconds from the trigger, permitting the read accumulator to reach a stable condition before the binary value of the trail Z length is transferred to the latter. Such is achieved by opening the set of AND gates 472 to permit the trial Z lengths in binary number, provided by selectively energizing the defect interrogator relays, to be transferred over the conductors 474 to the read accumulator to be added to the binary number representing the accumulated Z cuts already in the accumulator.

In further achieving the result of timing the sequence Z of operations in reading the drum for defect data as to plates on the glass line, the output pulse produced by the second one-shot 471 in the plate read control circuit is also transferred to a third one-shot multi-vibrator 476 which provides a 50 microsecond delay and, by means of triggering a fourth one-shot multi-vibrator 434, produces a 20 millisecond pulse conveyed over the conductor 436 to the three-leg AND gate 426 to control the "reading" time, permitting at least one complete pass over the drum surface. This plate control circuit, by means of the fifth one-shot multi-vibrator 482 produces a further 20 millisecond pulse which is used to reset the S relay drivers of the computer by removing the voltages from the energized S relays. This is shown diagrammatically in FIG. 32 which has the S relay drivers connected for resetting purposes to the one-shot multi-vibrator 482 through an inverter amplifier 484 and OR gate 486, the latter permitting a manual reset signal to be conveyed from the pushbutton switch 488. The S relays may be energized at any time after the start of the read period, marked by the leading edge of the reading period pulse from the one-shot multi-vibrator 434. Thus the total time such S relays are energized will vary from 24 milliseconds to 40 milliseconds, depending upon relative position of the drum with respect to the reading time pulse from the one-shot multi-vibrator 434. In the foregoing manner, after each inspection period for a trial Z length is complete, the S relays that are energized, designating the S locations of defects, are reset in preparation for another examination of the drum surface for defects in the next trial Z length. This sequence determines the total time required for reading the drum for one trial Z length. After this time has elapsed, the trial stepper of the computer again produces a stepper pulse, diagrammatically shown herein as a pulse from the switch contacts 462, which triggers the inverter amplifier 466 and the first one-shot multi-vibrator 468 to start the reading sequence. The defect interrogator relays are energized to provide a different binary number representing the new trial Z length and thus the value stored in the read accumulator will be different; otherwise the sequence is the same.

6. STOP READ COMPARER

Now considering the details of the stop read comparer and its operation in the case of plate glass production, it has been heretofore noted that the read period of any trial Z starts (1) for an uncut plate, at the leading edge of the quadrant in which the record is stored for the particular plate at the Z cutter, or (2) where one or more Z cuts have been made, at the point on the drum in that quadrant representing the drum cell just after the accumulated Z cuts. It has also been observed that the reading period is fixed by the duration that the output terminal of the flip-flop 420 has a positive voltage and that this flip-flop is shifted to such state by an output gating pulse from the start read comparer which opens the read gates thereby transferring a pulse from the one-shot multi-vibrators 428, 430 through the three-leg gate 426 to the flip-flop 420. In this case, the reading period is terminated by closing the read gates and thereby shifting the flip-flop 420 to its other state by transferring a pulse from the one-shots 428, 430 through a reset AND gate 492 and flip-flop 494 to the reset terminal of the flip-flop 420. An output pulse from the stop read comparer opens the AND gate 492 at the end of the reading period.

For producing such a pulse, a comparison is made by means herein shown as a stop read comparer between the states, during each trial Z period, of the read accumulator and the drum cell register. As shown in FIG. 32, the stop read comparer circuit is like that employed for the start read comparer described previously. Thus a pair of AND gates 496 are provided between each of the corresponding stages of this accumulator and register, so that with the corresponding flip-flop stages in the same state one of the AND gates transfers a positive pulse through a connected OR gate 498 to the output AND gate 502. When all input legs of this latter AND gate are energized, representing that the accumulator value is the same as the register value, an output gating pulse is conveyed to the reset AND gate 492. The function of the flip-flop 494 is to delay the transfer of a pulse to the flip-flop 420 (representing the close of the read period) the time of one drum cell. It will be observed that the pulse conveyed from the one-shot 430 through the reset AND gate 492 (FIG. 24, line 4) is at the beginning of the drum cell representing the final cell in the Z length to be read. While other means could be used for this purpose, the flip-flop 494 introduces a delay in the change of state of the flip-flop 420 so that the final cell is read.

We claim as our invention:

1. In apparatus for recording defect data for a glass sheet in pace with the continuous movement of the latter at various speeds along a glass line, the combination comprising, means providing defect data signals representing defective glass areas at various Z distances from the leading edge of said glass sheet, a magnetic drum, means for revolving said drum at a substantially uniform speed, means for recording defect data signals along recording tracks around the drum as said drum revolves, means timing the movement of said glass sheet along said line, and means including said timing means for operating said recording means to record said defect data at points in said recording tracks spaced from a longitudinal reference point common to said drum recording tracks and corresponding to the leading edge of the glass sheet with said spacing being time determined to account for asynchronous speeds of said glass line and said drum.

2. In an apparatus for recording on a storage medium signals representing defective areas in a glass sheet, the combination comprising, detection means laterally movable over the sheet for providing defect signals responsive to defective areas at various Z and S positions in the glass scanned by said detection means, means responsive to the lateral movement of said detection means providing signals representing the S position of said detection means from one reference side edge of the sheet, recording means for recording signals along a recording track in said medium at a given S dimension from a lateral reference point on the medium, means for combining said S position and defect signals, and means for operating said recording means responsive to a defect signal when a defective glass area is detected at the S position of said detection means corresponding to the S dimension of said recording track to record said signal at a Z position along said recording track with said Z position being time determined to account for asynchronous operation of said detection means and said recording means.

3. In an apparatus for recording on a storage medium signals representing defective areas in a glass sheet, the combination comprising, detection means laterally movable over a band of S strips of the glass sheet providing defect signals responsive to defective areas at various Z and S positions in the band of S strips scanned by said detection means, recording means for recording defect signals along each of a band of recording tracks in said medium, each said recording track corresponding to one strip of glass, means responsive to the movement of said detection means providing S position signals successively representing the S strips scanned by said detection means, means for combining said S position and defect signals, and means for operating said recording means responsive to a defect signal when a defective glass area is detected in one of said S strips to record said defect signal at a Z position in the recording track corresponding to the S position of said detection means with said Z position being time determined to account for asynchronous operation of said detection means and said recording means.

4. In an apparatus for recording on a revolving magnetic drum signals representing defective areas in a glass sheet moving slowly relative to the speed of the drum, the combination comprising, means for recording signals along a drum recording track divided into cells corresponding to increments of a longitudinal strip of said moving glass sheet, detection means over the moving glass sheet providing defect signals responsive to increments of defective glass in said strip passing said detection means, register means for registering the progression of increment in said strip past said detection means, drum cell register means for registering the progression of recording track cells past said recording means as the drum revolving, means for comparing said register means, and means responsive to said comparing means for operating said recording means to write defect signals received from said detection means in drum cells spaced the same Z distances from a reference point on said recording track as the Z distances of said defective glass increments in said strip from a transverse reference edge of the glass sheet with the Z spacing of said recorded defect signals being time determined to account for asynchronous speeds of said glass sheet and said drum.

5. In an apparatus for recording on a revolving magnetic drum signals representing defective areas in a glass sheet moving slowly relative to the speed of the drum, the combination comprising, means for recording signals along a drum recording track divided into time increments corresponding to longitudinal units of said moving glass sheet, detection means over the moving glass sheet providing defect signals responsive to defective units of glass passing said detection means, means for timing the relative longitudinal movement of the glass sheet and said detection means, means for registering the progression of recording track increments past said recording means as the drum revolves, and means for operating said recording means responsive to said registering and timing means to write defect signals received from said detection means in recording track increments spaced the same Z distances from a reference point on said recording track as the Z distances of said defective units of glass from a transverse reference edge of the glass sheet with the Z spacing of said recorded defect signals being time determined to account for asynchronous speeds of said glass sheet and said drum.

6. In an apparatus for recording on a revolving magnetic drum signals representing defective areas in a glass sheet moving slowly relative to the speed of the drum, the combination comprising, means for recording signals along a drum recording track divided into time increments corresponding to longitudinal units of said moving glass sheet, detection means over the moving glass sheet providing defect signals responsive to defective units of glass passing said detection means, means for timing the relative longitudinal movement of the glass sheet and said detection means to provide a signal representing the Z distances of said defective units of glass from a transverse reference edge of the glass sheet, register means providing a signal representing the progression of successive increments of said recording track past said recording means as the drum revolves, means for comparing said register and timing means, and means responsive to said comparing means for operating said recording means to write defect signals received from said detection means in recording track increments spaced the same Z distances from a reference point on said recording track as the Z distances of said defective units of glass from said transverse reference edge with the Z spacing of said recorded defect signals being time determined to account for asynchronous speeds of said glass sheet and said drum.

7. In apparatus for recording on a magnetic drum defect data as to spaced glass plates moving in continuous flow along a glass line, the combination comprising, means providing defect signals representing spaced defective areas in each of $n$ longitudinal strips totalling the full width of a glass plate at various Z distances from the leading edge of said glass plate, means for recording defect signals along each of $n$ drum recording tracks, each of said recording tracks corresponding to one strip of glass, a reference track on said drum having circumferentially spaced signals defining circumferential sections of said recording tracks, reading means over said reference track, and means connecting said reading means to said recording means for operating the latter to record defect signals received therefrom representing defective areas of successive glass plates in a predetermined order of said sections with the defect signals located in each said recording track relative to the leading edge of a section according to the Z distances of the defective areas in the corresponding glass strip relative to the leading edge of the corresponding plate.

8. In apparatus for partitioning spaced glass plates moving in continuous flow along a glass line, the combination comprising, means providing defect data in the form of signals representing defective areas of a glass plate moving along said glass line past an inspection station, a revolving magnetic drum, means for recording defect data signals along recording tracks around the drum, means defining circumferential sections of said recording tracks, means for operating said recording means to record defect data for successive glass plates moving past said inspection station in a predetermined order of said recording track sections, means for registering the movement of plates past a station downstream of said inspection station, means operated by said registering means for locating a recording track section on said revolving drum corresponding to the plate at said downstream station and for reading the defect data therefrom, and means for erasing said last named recording track section after the corresponding plate moves below said downstream station to prepare the section to receive defect data for a subsequent plate moving along said glass line.

9. In apparatus for partitioning spaced glass plates moving in continuous flow along a glass line, the combination comprising, means providing defect data in the form of signals representing defective areas of a glass plate moving along said glass line past an inspection station, a revolving magnetic drum, means for recording defect data signals along recording tracks around the drum, means defining circumferential sections of said recording tracks, means for operating said recording means to record defect data for successive glass plates moving past said inspection station in a predetermined order of said recording track sections, means for registering the movement of a plate past a cutting station downstream of said inspection station, means operated by said registering means for locating a recording track section on said drum corresponding to the plate at said downstream station and for reading the defect data therefrom, means operable in response to said reading means to partition the plate at said downstream station by transverse Z cuts severing the plate into lengths according to a preferred fit of sizes, and means for completely erasing said last named recording track section after the corresponding plate is completely partitioned and moves below said downstream station to prepare the section to receive defect data for a subsequent plate moving along said glass line.

10. In apparatus for partitioning a glass sheet in pace with the continuous movement of the latter along a glass line, the combination comprising, means producing defect data representing defective areas at various Z distances from the leading edge of said glass sheet, a revolving magnetic drum having a leading edge signal in a reference track around the drum designating the leading edge of said sheet moving along said line, means connected to said data producing means for recording said defect data on said drum in recording tracks separate from said reference track and relative to said leading edge signal, means for reading out said leading edge signal for locating defect data in said recording tracks as to said sheet and for reading out said data from said recording tracks, means receiving said defect data from said reading means for partitioning the glass sheet, said glass sheet being partitioned by directing a transverse Z cut separate from the glass leading edge according to a preferred fit of sizes thereby forming a new glass leading edge, and means for erasing said leading edge signal and rerecording a new leading edge signal in said reference track spaced the Z cut distance from the erased leading edge signal.

11. In apparatus for partitioning glass sheet in pace with the continuous movement of the latter along a glass line, the combination comprising, an inspection station, a cutting station downstream of said inspection station, detection means at said detection station providing defect data responsive to defective areas of said glass sheet passing said detection means, a revolving magnetic drum, means for recording defect data signals along recording tracks around the drum, a leading edge signal in a reference track around the drum, means for recording said defect data in said recording tracks relative to said leading edge signal, means for locating defect data in said recording tracks as to said sheet responsive to said leading edge signal and for reading out defect data from said recording tracks, means receiving said defect data from said reading means for partitioning the glass by directing a transverse Z cut adjacent the glass leading edge according to a preferred fit of sizes thereby and means for erasing said leading edge signal and rerecording a new leading edge signal in said reference track spaced the Z cut distance from the erased leading edge signal.

12. In apparatus for partitioning glass plates in pace with the continuous movement of the latter along a glass line, the combination comprising, means providing defect data representing defective areas at various Z distances from the leading edge of one of said glass plates, a revolving magnetic drum, means for recording defect data signals along recording tracks around the drum, means dividing said tracks into sections to receive defect data for individual plates, means for reading defect data from a section corresponding to said one plate relative to the leading edge of the section, means receiving said defect data from said reading means for partitioning said one plate by making transverse Z cut decisions, means for accumulating said Z cut decisions, and means operated by said accumulator means for controlling said reading means to read defect data from the section corresponding to said one plate relative to the leading edge formed by the preceding Z cut decision.

13. In apparatus for partitioning glass plates in pace with the continuous movement of the latter along a glass line, the combination comprising, means providing defect data representing defective areas at various Z distances from the leading edge of one of said glass plates, a revolving magnetic drum, means for recording defect data signals along recording tracks around the drum, means dividing said tracks into sections to receive defect data for individual plates, means for reading defect data from a section corresponding to said one plate relative to the leading edge of the section, means receiving said defect data from said reading means for partitioning said one plate by making transverse Z cut decisions, means for accumulating said Z cut decisions, means operated by said accumulator means for controlling said reading means to read defect data from the section corresponding to said one plate relative to the leading edge formed by the preceding Z cut decision, and means responsive to the accumulating means totalling Z cuts equal to the full length of the plate for erasing said read-out section.

14. In apparatus for partitioning glass plates in pace with the continuous movement of the latter along a glass line, the combination comprising, means providing defect data representative defective areas at various Z distances from the leading edge of one of said glass plates, a revolving magnetic drum having a surface speed substantially greater than the speed of said plates along said line and further having recording tracks around the drum, means for circumferentially dividing said tracks into sections with each section being adapted to receive defect data for an individual plate, means for recording defect signals as to one plate along said recording tracks in one of said sections and spaced corresponding Z distances from the section leading edge, means for reading defect data for a series of trial Z lengths starting each reading period upon succeeding drum revolutions at the leading edge of said one section and terminating at a point in said one section corresponding to the end of each trial Z length, means receiving said defect data from said reading means for partitioning said one plate by making transverse Z cut decisions according to a preferred fit of sizes, means for accumulating said Z cut decisions, and means operated by said accumulator means for reading defect data from the same section for a subsequent series of trial Z lengths starting each reading period upon succeeding drum revolutions at the leading edge formed by the preceding Z cut decision and terminating at a point in said section corresponding to the sum of (1) accumulated Z cut decisions and (2) each trial Z length.

15. In apparatus for partitioning a glass sheet in pace with continuous movement of the latter along a glass line, the combination comprising, means producing defect data representing defective glass areas at various Z distances from the leading edge of said glass sheet, a revolving magnetic drum having a leading edge signal in a reference track around the drum designating the leading edge of said sheet moving along said line, means connected to said data producing means receiving said defect data for recording defect data as to said sheet on said recording medium in recording tracks separate from said reference track relative to said leading edge signal in said reference track, means for reading out said leading edge signal in said reference track for locating defect data in a section of said recording tracks as to said glass sheet, and means for reading out defect data from said located recording track section.

16. In apparatus for partitioning a glass sheet in pace with a continuous movement of the latter along a glass line, the combination comprising, means producing defect data representing defective glass areas at various Z distances from the leading edge of said glass sheet, means providing a magnetic recording medium having a leading edge signal in an elongated reference track designating the leading edge of a plate moving along said line, means connected to said data producing means receiving said defect data for recording defect data as to said sheet on said recording medium in elongated recording tracks separate from said reference track relative to said leading edge signal in said reference track, means for reading out said leading edge signal in said reference track for locating defect data in a section of said recording tracks as to said glass sheet, means for reading out defect data from said located recording track section, means connected to said last-named read-out means for partitioning the glass sheet responsive to said defect data, said sheet being partitioned by directing the transverse Z cut spaced from the glass leading edge according to a preferred fit of sizes thereby forming a new glass leading edge, and means responsive to said partitioning means for erasing said leading edge signal and for recording a new leading edge signal in said reference track spaced the Z cut distance from the erased leading edge signal.

17. In apparatus for recording defect data for a glass sheet in pace with continuous movement of the latter at various speeds along a glass line, the combination comprising, defect detection means adjacent the glass line providing defect data signals representing defective glass areas as such areas pass said means, a magnetic drum, means adjacent said drum for recording said defect data signals along recording tracks around said drum, means for revolving said drum at a uniform rate so as to move said recording tracks past said recording means at a substantially greater speed than the speed of said glass line past said defect detection means, means timing the movement of said glass sheet past said defect detection means, and means including said timing means for operating said recording means to record said defect data signals each revolution of the drum at points in said recording tracks, said points being progressively advanced along said recording tracks in accordance with the movement of said glass sheet past said defect detector means with the rate of progressive advance being time determined to account for asynchronous speeds of said glass line and said drum.

18. In an apparatus for recording on a magnetic storage medium signals representing defective areas in a glass sheet, the combination comprising, defect detection means having relative movement longitudinally of a glass sheet at a rate which may vary and providing defect signals representing longitudinally spaced defective areas in a longitudinal strip of glass, recording means including a magnetic transducer for recording signals along a recording track in said medium, means for moving said medium and said transducer relatively along said recording track at a rate which is uniform and substantially higher than the relative rate of movement of said defect detection means and glass sheet, and means responsive to the relative rate of movement of said glass sheet and defect detection means for timing the operation of said magnetic transducer to record said defect signals spaced along said recording track according to the longitudinal spacing of the defective areas on the glass, the spacing of said recorded signals being time determined to account for asynchronous operation of said defect detection means and said recording means.

19. In apparatus for recording on a magnetic storage medium signals representing defective areas in a glass sheet, the combination comprising, defect detection means having relative movement longitudinally of a glass sheet at a rate which may vary and providing defect signals representing defective areas in a longitudinal strip of glass at various Z distances from a transverse reference edge of the glass sheet, recording means including a magnetic transducer for recording signals along a recording track in said medium, means for moving said medium and said transducer relatively along said recording track at a rate which is uniform and substantially higher than the relative rate of movement of said defect detection means and glass sheet, and means responsive to the relative rate of movement of said glass sheet and defect detection means for timing the operation of said magnetic transducer to record said defect signals along said recording track spaced from said longitudinal reference point according to the Z distances of the defective areas in the defective areas in the glass, the spacing of said recorded signals being time determined to account for asynchronous operation of said defect detection means and said recording means.

20. In apparatus for recording on a magnetic storage medium signals representing device areas in a glass sheet, the combination comprising, defect detection means having relative movement longitudinally of a glass sheet at a rate which may vary and providing defect signals representing longitudinally spaced defective areas in each of $n$ longitudinal strips totalling the full width of the glass sheet, recording means for recording signals along each of $n$ recording tracks, each said recording track corresponding to one strip of glass, including a transducer for each of said tracks and means for moving said medium and said transducers relatively along said tracks at a rate which is uniform and substantially higher than the relative rate of movement of said defect detection means and glass sheet, and means responsive to the relative rate of movement of said glass sheet and defect detection means for timing the operation of said recording means to record said defect signals spaced along said recording tracks according to the longitudinal spacing of the defective areas on the glass, the spacing of said recorded signals being time determined to account for asynchronous operation of said defect detection means and said recording means.

21. In apparatus for recording on a magnetic storage medium signals representing defective areas in a glass sheet, the combination comprising, defect detection means having relative movement longitudinally of a glass sheet at a rate which may vary and providing defect signals representing defective areas in each of $n$ longitudinal strips totalling the full width of the glass sheet at various Z distances from a transverse reference edge of the glass sheet, recording means for recording signals along each of $n$ recording tracks in said medium, each said recording track corresponding to one strip of glass, means for locating a common longitudinal reference point for said recording tracks corresponding to said transverse reference edge of the glass sheet, and means responsive to the relative rate of movement of said glass sheet and defect detection means for timing the operation of said recording means to record said defect signals spaced from said longitudinal reference point according to the Z distances of the defective areas in the glass, the spacing of said recorded signals being time determined to account for asynchronous operation of said defect detection means and said recording means.

22. In apparatus for recording on a high speed, rotating magnetic drum, defect data as to spaced glass plates moving in continuous flow along a glass line, where the peripheral speed of the drum is uniform and substantially higher than the linear speed of the glass plates, the combination comprising, means providing defect signals representing defective areas of a glass plate moving along said glass line, means for recording defect signals along recording tracks around the drum, means defining circumferential sections of said recording tracks, and means responsive to the movement of the glass plates along the line for timing the operation of said recording means to record defect signals representing defective areas of successive glass plates in a predetermined order of said sections with the leading edge of a record of defective areas in a plate coinciding with the leading edge of a section, the recording of said signals being time determined to account for the asynchronous operation of said magnetic drum and the glass line.

23. In apparatus for recording on a high speed, rotating magnetic drum having a recording track, defect data as to spaced glass plates moving in continuous flow along a glass line, where the peripheral speed of the drum is uniform and substantially higher than the linear speed of the glass plates, the combination comprising, means providing defect signals representing defective areas of a glass plate moving along said glass line, a reference track on said drum having circumferentially spaced signals defining circumferential sections of said recording track, reading means over said reference track, and means timed responsive to the movement of the glass plates along the line and coordinated by said reading means for recording defect signals representing defective areas of successive glass plates in a predetermined order of said sections of said recording track, the recording of said signals being time determined to account for the asynchronous operation of said magnetic drum and the glass line.

24. In apparatus for recording on a high speed, rotating magnetic drum having a recording track, defect data as to spaced glass plates moving in continuous flow along a glass line, where the peripheral speed of the drum is uniform and substantially higher than the linear speed of the glass plates, the combination comprising, detection means over the glass line providing defect signals representing defective areas of a glass plate moving past said detection means, a reference track on said drum having circumferentially spaced signals defining circumferential sections of said recording track, reading means over said reference track, and means timed responsive to the movement of the glass plates along the line and coordinated by said reading means for recording defect signals representing defective areas of successive glass plates in a predetermined order of said sections of said recording track, the recording of said signals being time determined to account for the asynchronous operation of said magnetic drum and the glass line.

25. In apparatus for recording defect data for a glass sheet in pace with continuous movement of the latter at various speeds along a glass line toward partitioning means, the combination comprising, means providing defect data signals representing defective glass areas as such areas pass a station along said line, a magnetic drum, means for recording said defect data signals along recording tracks around said drum, means for revolving said drum at a uniform rate so as to move said recording tracks past said recording means at a substantially greater speed than the speed of said glass line past said station, means timing the movement of said glass sheet past said station, means including said timing means for operating said recording means to record said defect data signals each revolution of the drum at selected locations in said recording tracks, said selected locations being progressively advanced along said recording tracks in accordance with the movement of said glass sheet past said station with the rate of progressive advance being time determined to account for asynchronous speeds of said glass line and said drum, and means for continuously reading out and erasing for re-recording successive portions of said recording tracks as the corresponding portions of the glass sheet move downstream of said station and are partitioned.

26. In apparatus for recording defect data for glass sheet in pace with continuous movement of the latter at various speeds along a glass line toward partitioning means for the glass, the combination comprising, means providing defect data signals representing defective glass areas as such areas pass a station along said line, a magnetic drum, means for recording said defect data signals along recording tracks around said drum, means for revolving said drum at a uniform rate so as to move said recording tracks past said recording means at a substantially greater speed than the speed of said glass line past said station, means timing the movement of said glass sheet past said station, means for dividing said tracks into cells to receive defect signals representing defective area of said glass sheet, means including said timing means for operating said recording means to record said defect data signals each revolution of said drum in selected cells of said recording tracks, the locations of the selected cells being progressively advanced along said recording tracks in accordance with the movement of the glass sheet past said station with the rate of progressive advance being time determined to account for asynchronous speed of said glass line and said drum.

27. In apparatus for recording defect data for glass sheet in pace with continuous movement of the latter at various speeds along a glass line toward partitioning means for the glass, the combination comprising, means providing defect data signals representing defective glass areas of different severity grade as such areas pass a station along said line, a magnetic drum, means for recording said defect data signals along recording tracks around said drum, means for revolving said drum at a uniform rate so as to move said recording tracks past said recording means at a substantially greater speed than the speed of said glass line past said station, means timing the movement of said glass sheet past said station, means for dividing said tracks into cells to receive defect signals representing defective areas of said glass sheet, said cells having separate portions for recording separate signals distinguishing the severity grade of the defective areas of glass, means including said timing means for operating said recording means to record said defect data signals each revolution of said drum in selected cells of said recording tracks, the locations of the selected cells being progressively advanced along said recording tracks in accordance with the movement of the glass sheet past said station with the rate of progressive advance being time determined to account for asynchronous speed of said glass line and said drum.

References Cited by the Examiner

UNITED STATES PATENTS

| 2,614,169 | 10/52 | Cohen | 340—174.1 X |
|---|---|---|---|
| 2,700,148 | 1/55 | McGuigan | 340—174.1 X |
| 2,909,660 | 10/59 | Alexander. | |
| 2,930,228 | 3/60 | Lawrence et al. | |
| 2,994,863 | 8/61 | Trapnell. | |
| 3,049,697 | 8/62 | Slattery | 340—174.1 |

FOREIGN PATENTS 795,284   5/58   Great Britain.

ANDREW R. JUHASZ, *Primary Examiner.*
CARL W. TOMLIN, *Examiner.*